United States Patent
Helmrich et al.

(10) Patent No.: US 10,770,084 B2
(45) Date of Patent: Sep. 8, 2020

(54) ENCODER, DECODER AND METHODS FOR SIGNAL-ADAPTIVE SWITCHING OF THE OVERLAP RATIO IN AUDIO TRANSFORM CODING

(71) Applicant: Fraunhofer-Gesellschaft zur Förderung der angewandten Forschung e.V., München (DE)

(72) Inventors: Christian Helmrich, Berlin (DE); Bernd Edler, Fürth (DE); Tobias Schwegler, Nürnberg (DE); Florian Schuh, Zirndorf (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 139 days.

(21) Appl. No.: 15/933,149

(22) Filed: Mar. 22, 2018

(65) Prior Publication Data

US 2019/0103120 A1 Apr. 4, 2019

Related U.S. Application Data

(63) Continuation of application No. PCT/EP2016/072739, filed on Sep. 23, 2016, which
(Continued)

(51) Int. Cl.
*G10L 19/00* (2013.01)
*G10L 21/00* (2013.01)
(Continued)

(52) U.S. Cl.
CPC ............ *G10L 19/022* (2013.01); *G06F 17/11* (2013.01); *G06F 17/147* (2013.01);
(Continued)

(58) Field of Classification Search
CPC ..... G10L 19/008; G10L 19/022; G10L 19/02; G10L 19/26; G10L 19/20; G10L 25/18; G10L 25/45; G10L 221/04
See application file for complete search history.

(56) References Cited

U.S. PATENT DOCUMENTS

| | | | | |
|---|---|---|---|---|
| 8,036,903 B2 * | 10/2011 | Grill | .................. | G10L 19/0212 704/500 |
| 8,954,321 B1 * | 2/2015 | Beack | .................... | G10L 19/22 704/219 |

(Continued)

FOREIGN PATENT DOCUMENTS

| | | |
|---|---|---|
| ES | 2328187 T3 | 11/2009 |
| JP | 2010-515106 A | 5/2010 |

(Continued)

OTHER PUBLICATIONS

Princen et al "Subband/transform coding using filter bank designs based on time domain aliasing cancellation." 1987, ICASSP'87. IEEE International Conference on Acoustics, Speech, and Signal Processing. vol. 12. IEEE, 1987.*
(Continued)

*Primary Examiner* — Olujimi A Adesanya
(74) *Attorney, Agent, or Firm* — Haynes and Boone, LLP

(57) ABSTRACT

A decoder for decoding a plurality of spectral-domain audio samples is provided. The decoder includes a first decoding module for generating a first group and a second group of time-domain intermediate audio samples from the spectral-domain audio samples. Moreover, the decoder includes an overlap-adder for overlap-adding the first group of time-domain intermediate audio samples with an overlap of more than 5% and at most 50% with the second group of time-domain intermediate audio samples. Furthermore, the decoder includes a second decoding module for generating a third group and a fourth group of time-domain interme-
(Continued)

diate audio samples from the spectral-domain audio samples. Moreover, the decoder includes an output interface.

58 Claims, 16 Drawing Sheets

Related U.S. Application Data is a continuation of application No. PCT/EP2015/072186, filed on Sep. 25, 2015.

(51) Int. Cl.
| | |
|---|---|
| G10L 21/04 | (2013.01) |
| G10L 19/022 | (2013.01) |
| G10L 19/02 | (2013.01) |
| G06F 17/11 | (2006.01) |
| G06F 17/14 | (2006.01) |
| G10L 19/032 | (2013.01) |
| G10L 19/24 | (2013.01) |
| G10L 19/22 | (2013.01) |

(52) U.S. Cl.
CPC ........ *G10L 19/0212* (2013.01); *G10L 19/032* (2013.01); *G10L 19/24* (2013.01); *G10L 19/22* (2013.01)

(56) References Cited

U.S. PATENT DOCUMENTS

| | | | |
|---|---|---|---|
| 2002/0176353 A1* | 11/2002 | Atlas | G10L 19/02 370/203 |
| 2006/0173675 A1* | 8/2006 | Ojanpera | G10L 19/022 704/203 |
| 2009/0076829 A1 | 3/2009 | Ragot et al. | |
| 2010/0076754 A1 | 3/2010 | Kovesi et al. | |
| 2010/0138218 A1* | 6/2010 | Geiger | G10L 19/032 704/205 |
| 2011/0087494 A1* | 4/2011 | Kim | G10L 19/0212 704/500 |
| 2011/0173008 A1* | 7/2011 | Lecomte | G10L 19/20 704/500 |
| 2011/0202355 A1* | 8/2011 | Grill | G10L 19/18 704/500 |
| 2011/0238425 A1 | 9/2011 | Neuendorf et al. | |
| 2012/0239408 A1* | 9/2012 | Oh | G10L 19/18 704/500 |
| 2012/0245947 A1* | 9/2012 | Neuendorf | G10L 19/20 704/500 |
| 2012/0265540 A1* | 10/2012 | Fuchs | G10L 19/008 704/500 |
| 2013/0090929 A1 | 4/2013 | Ishikawa et al. | |
| 2013/0096930 A1* | 4/2013 | Neuendorf | G10L 19/173 704/500 |
| 2014/0058737 A1 | 2/2014 | Ishikawa et al. | |
| 2014/0142958 A1 | 5/2014 | Sharma et al. | |
| 2014/0372107 A1* | 12/2014 | Vilermo | G10L 19/265 704/205 |
| 2015/0110292 A1* | 4/2015 | Nagel | H03G 3/00 381/98 |
| 2015/0332698 A1* | 11/2015 | Ravelli | G10L 19/125 704/500 |
| 2016/0050420 A1* | 2/2016 | Helmrich | G10L 19/022 375/240.24 |
| 2017/0061976 A1* | 3/2017 | Sung | G10L 19/22 |
| 2018/0190303 A1* | 7/2018 | Ghido | H03G 5/005 |

FOREIGN PATENT DOCUMENTS

| | | |
|---|---|---|
| RU | 2413312 C2 | 2/2011 |
| RU | 2418324 C2 | 5/2011 |
| WO | WO 2011/048117 A1 | 4/2011 |
| WO | WO 2011/158485 A2 | 12/2011 |
| WO | WO 2013/061584 A1 | 5/2013 |

OTHER PUBLICATIONS

Moreau et al "Low delay coder (< 25 ms) of wideband audio (20 Hz-15 kHz) scalable from 64 to 32 kbit/s", 2000, in Annales des télécommunications (vol. 55, No. 9-10, pp. 493-506). Springer-Verlag.*
D. Virette: "Low Delay Transform for High Quality Low Delay Audio Coding"; Dec. 10, 2012; pp. 1-195, XP055261425, Universite de Rennes; Retrieved from the Internet: URL:https://hal.inria.fr/tel-01205674/document [retrieved on Mar. 30, 2016] (198 pages).
R. L. De Queiroz et al.: "Time-Varying Lapped Transforms and Wavelet Packets"; IEEE Transactions on Signal Processing; vol. 41; No. 12; Dec. 1993; pp. 3293-3305; XP000426647 (14 pages).
H. S. Malvar: "Extended lapped transforms: properties, applications, and fast algorithms"; IEEE Transactions on Signal Processing; vol. 40; No. 11; Nov. 1992; pp. 2703-2714; XP011328523 (12 pages).
J. P. Princen et al.: "Analysis/Synthesis Filter Bank Design Based on Time Domain Aliasing Cancellation"; IEEE Trans. Acoustics, Speech, and Signal Processing; vol. 34; No. 5; pp. 1153-1161; Oct. 1986 (9 pages).
J. P. Princen et al.: "Subband/transform coding using filter bank design based on time domain aliasing cancellation"; Proc. of IEEE ICASSP '87; Apr. 1987; vol. 12; pp. 2161-2164 (4 pages).
H. S. Malvar: "Lapped Transforms for Efficient Transform/ Subband Coding"; IEEE Trans. Acoustics, Speech, and Signal Proc.; vol. 38; No. 6; pp. 969-978; Jun. 1990 (10 pages).
M. Bosi et al.: "ISO/IEC MPEG-2 Advanced Audio Coding"; J. Audio Eng. Soc.; vol. 45; No. 10; pp. 789-814; Oct. 1997 (26 pages).
ISO/IEC MPEG-2 13818-3: "Information technology—Generic coding of moving pictures and associated audio information—Part 3: Audio"; Apr. 1998 (132 pages).
J. Herre et al.: "MPEG-H Audio—the New Standard for Universal Spatial/3D Audio Coding"; J. Audio Eng. Soc.; vol. 62; No. 12; pp. 821-830; Dec. 2014 (12 pages).
ISO/IEC MPEG-H 23008-3: "Information technology—High efficiency coding and media delivery in heterogeneous environments—Part 3: 3D audio"; Mar. 2015 (438 pages).
C. R. Helmrich et al.: "Low-complexity semi-parametric joint-stereo audio transform coding"; Proc. of EUSIPCO '15; Sep. 2015 (5 pages).
C. R. Helmrich et al.: "Signal-adaptive transform kernel switching for stereo audio coding"; Proc. of IEEE WASPAA '15; New Paltz; Oct. 2015; pp. 1-5 (5 pages).
C. R. Helmrich et al.: "Spectral envelope reconstruction via IGF for audio transform coding"; Proc. of IEEE ICASSP '15; Apr. 2015; pp. 389-393 (5 pages).
H. S. Malvar: "Modulated QMF Filter Banks with Perfect Reconstruction"; Electronics Letters; vol. 26; No. 13; pp. 906-907; Jun. 1990 (5 pages).
R. L. De Queiroz et al.: "Adaptive extended lapped transforms"; Proc. of IEEE ICASSP '93; Apr. 1993; vol. 3; pp. 217-220 (4 pages).
M. Temerinac et al.: "LINC: A Common Theory of Transform and Subband Coding"; IEEE Trans. Communications; vol. 41; No. 2; pp. 266-274; Feb. 1993 (9 pages).
M. Temerinac et al.: "Overlapping Block Transform: Window Design, Fast Algorithm, and an Image Coding Experiment"; IEEE Trans. Communic.; vol. 43; No. 9; pp. 2417-2425; Sep. 1995 (9 pages).
G. D. T. Schuller et al.: "Modulated Filter Banks with Arbitrary System Delay: Efficient Implementations and the Time-Varying Case"; IEEE Trans. Signal Proc.; vol. 48; No. 3; pp. 737-748; Mar. 2000 (12 pages).
H. S. Malvar: "A modulated complex lapped transform and its applications to audio processing"; Proc. of IEEE ICASSP '99; May 1999; vol. 3; pp. 1421-1424 (9 pages).

(56) References Cited

OTHER PUBLICATIONS

B. Edler: "Äquivalenz von Transformation and Teilbandzerlegung (Subband Decomposition) in der Quellencodierung", Ph.D. thesis; Univ. Hannover, Germany; 1995 (144 pages).
S. Shlien: "The Modulated Lapped Transform, Its Time-Varying Forms, and Its Applications to Audio Coding Standards"; IEEE Trans. Speech and Audio Proc.; vol. 5; No. 4; pp. 359-366; Jul. 1997 (8 pages).
M. Padmanabhan et al.: "Some further results on modulated/extended lapped transforms"; Proc. of IEEE ICASSP '92; Mar. 1992; vol. 4; pp. 265-268 (4 pages).
K. M. A. Hameed et al.: "Extended lapped transforms with linear phase basis functions and perfect reconstruction"; Proc. of IEEE ICECS '05; Dec. 2005 (4 pages).
L. D. Fielder et al.: "AC-2 and AC-3: Low-Complexity Transform-Based Audio Coding"; AES collected papers on Digital Audio Bit-Rate Reduction; pp. 54-72; 1996 (19 pages).
C. R. Helmrich: "On the Use of Sums of Sines in the Design of Signal Windows"; Proc. of DAFx-10; Sep. 2010; online at http::// dafx10.iem.at/proceedings/ (5 pages).
M. Neuendorf et al.: "The ISO/MPEG Unified Speech and Audio Coding Standard—Consistent High Quality for all Content Types and at all Bit Rates"; J. Audio Eng. Soc.; vol. 61; No. 12; pp. 956-977; Dec. 2013 (22 pages).
Recommendation ITU BS.1534-2: "Method for the subjective assessment of intermediate quality level of audio systems"; Jun. 2014 (35 pages).
K. Brandenburg et al.: "Overview of MPEG-Audio: Current and Future Standards for Low Bit-Rate Audio Coding"; Proc. of AES 99th Convention; New York; Oct. 1995; No. 4130 (30 pages).
ISO/IEC SC29/VVG11, N15399, "Text of ISO/IEC 23008-3:2015/FDAM 3, Information technology—High efficiency coding and media delivery in heterogeneous environments—Part 3: 3D audio, Amendment 3: MPEG-H 3D Audio phase 2," Jul. 2015 (453 pages).
Office Action with Search Report dated Sep. 13, 2018 issued in the parallel Russian patent application No. 2018115190 (10 pages with English translation).
Office Action (Decision to Grant) dated Jan. 7, 2020 in the parallel Japanese patent application No. 2018-515442 (6 pages).
Office Action dated May 20, 2020 issued in the parallel Indian patent application No. 201837009633 (6 pages).

* cited by examiner

ENCODER, DECODER AND METHODS FOR SIGNAL-ADAPTIVE SWITCHING OF THE OVERLAP RATIO IN AUDIO TRANSFORM CODING

CROSS-REFERENCE TO RELATED APPLICATIONS

This application is a continuation of co-pending International Application No. PCT/EP2016/072739, filed Sep. 23, 2016, which is incorporated herein by reference in its entirety, and additionally claims priority from International Applications Nos. PCT/EP2015/072186, filed Sep. 25, 2015 and PCT/EP2015/080334, filed Dec. 17, 2015, both of which are incorporated herein by reference in their entirety.

The present invention relates to audio signal encoding, processing and decoding, and, in particular, to an encoder, a decoder and methods for Signal-Adaptive Switching of the Overlap Ratio in Audio Transform Coding.

BACKGROUND OF THE INVENTION

During the last 20 years, particularly since the development of the MPEG-1 Layer 3 (MP3) and AC-2 (Dolby Digital) coders, perceptual audio coding has relied exclusively on the modified discrete cosine transform (MDCT), introduced by Princen et al. (see [1], [2]) and further investigated, under the name modulated lapped transform (MLT), by Malvar (see [3]), for waveform preserving spectral quantization. The inverse of this transform, given a length-M spectrum $X'_i$ for frame index i, can be written as $$x'_i(n) = \frac{2}{M} \sum_{k=0}^{M-1} X'_i(k) \cos\left(\frac{\pi}{M}\left(n + \frac{M+1}{2}\right)\left(k + \frac{1}{2}\right)\right), \quad (1)$$

with $0 \le n < N$ and N being the window length. Since $$M = \frac{N}{2},$$

the overlapping ratio is 50%. In recent standards based on the MPEG-2 Advanced Audio Coding (AAC) specification (see [4], [5]), this concept has been extended to also allow parametric tools such as noise filling in the MDCT domain. The MPEG-H 3D Audio framework (see [6], [7]), for example, offers for semi-parametric transform-domain coding for example, the functionalities of noise filling of zeroed spectral lines above some frequency; stereo filling for semi-parametric joint-stereo coding (see [8], [9]); and Intelligent Gap Filling (IGF) for bandwidth extension (see [10]).

In [9], the combination of IGF and stereo filling, entitled spectral band substitution (SBS) in [8], assisted by transform kernel switching for input with non-trivial inter-channel phase differences, was shown to deliver good audio quality for most signals. On quasi-stationary harmonic segments, however, the subjective performance was lower than that of the alternative high-delay/complexity 3D Audio configuration using spectral band replication (SBR) and "unified stereo" MPEG Surround in a pseudo-QMF domain. An explanation for this behavior is the higher frequency resolution of the MDCTs utilized in the latter configuration: at the given output sample rate of 48 kHz, the M-size core transforms operate on 24-kHz downsampled downmix and residual signals, doubling the frame length.

SBS-based 3D Audio coding, due to its delay, complexity, and temporal-resolution advantages [8], represents the variant of choice at least for mono- and stereophonic signals, and it is desirable to improve its design—while maintaining the frame length—such that its performance can match that of the QMF-based configuration even on single-instrument and other tonal recordings. A viable solution for increased spectral efficiency on quasi-stationary segments is the extended lapped transform (ELT) proposed by Malvar (see [11], [12]), whose inverse (synthesis) version is identical to (1), except that $0 \le n < L$ with $L \ge 4M$.

Thus, formula (1) indicates the inverse MLT as well as the inverse ELT. The only difference is that in case of the inverse MLT n is defined for 0 n<N, e.g., with N=2·M, and in case of the inverse ELT, n is defined for $0 \le n < L$, e.g., with $L \ge 4M$.

Unfortunately, as will be shown in below, the ELT's overlap ratio is at least 75% instead of the MDCT's 50%, which often leads to audible artifacts for transient waveform parts like drum hits or tone onsets. Moreover, practical solutions for block length switching between ELTs of different lengths—or between an ELT and MLT—similarly to the technique applied in MDCT codecs for precisely such transient frames, have not been presented and only theoretical work has been published (see, for example, [13], [14], [15], [16], [17]).

SUMMARY

According to an embodiment, a decoder for decoding a plurality of spectral-domain audio samples may have: a first decoding module for decoding a first group of the spectral-domain audio samples by generating a first group of time-domain intermediate audio samples from the spectral-domain audio samples of the first group of the spectral-domain audio samples, and for decoding a second group of the spectral-domain audio samples by generating a second group of time-domain intermediate audio samples from the spectral-domain audio samples of the second group of the spectral-domain audio samples, an overlap-adder, wherein the overlap-adder is configured to conduct overlap-adding of exactly two groups of time-domain intermediate audio samples, said exactly two groups being the first group and the second group of time-domain intermediate audio samples, wherein the overlap-adder is configured to overlap-add said exactly two groups with an overlap of more than 5% and at most 50%, wherein said overlap-add of said exactly two groups results in generating a first plurality of time-domain audio output samples of an audio signal, a second decoding module for decoding a third group of the spectral-domain audio samples by generating a third group of time-domain intermediate audio samples from the spectral-domain audio samples of the third group of the spectral-domain audio samples, and for decoding a fourth group of the spectral-domain audio samples by generating a fourth group of time-domain intermediate audio samples from the spectral-domain audio samples of the fourth group of the spectral-domain audio samples, and an output interface for outputting the first plurality of time-domain audio output samples of the audio signal, a second plurality of time-domain audio output samples of the audio signal and a third plurality of time-domain audio output samples of the audio signal, wherein the overlap-adder is configured to obtain the second plurality of time-domain audio output samples using overlap-adding at least the third group of time-domain intermediate audio samples with an overlap of more than 60% and less than 100% with the fourth group of time-domain intermediate audio samples, and wherein the overlap-adder is configured to obtain the third plurality of time-domain audio output samples using overlap-adding of at least the second group of time-domain intermediate audio samples with the third group of time-domain intermediate audio samples, or wherein the overlap-adder is configured to obtain the third plurality of time-domain audio output samples using overlap-adding of at least the fourth group of time-domain intermediate audio samples with the first group of time-domain intermediate audio samples.

According to another embodiment, an encoder for encoding a plurality of time-domain audio samples of an audio signal by generating a plurality of groups of spectral domain-audio samples from a plurality of groups of the time-domain audio samples may have: a first encoding module for generating a first group of the groups of spectral-domain audio samples from a first group of the groups of the time-domain audio samples, and for generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples includes more than 5% and at most 50% of the audio samples of the second group of the time-domain audio samples, and wherein the second group of the time-domain audio samples includes more than 5% and at most 50 of the audio samples of the first group of the time-domain audio samples, and a second encoding module for generating a third group of the groups of spectral-domain audio samples from a third group of the groups of the time-domain audio samples, and for generating a fourth group of the groups of spectral-domain audio samples from a fourth group of the groups of the time-domain audio samples, wherein the third group of the time-domain audio samples includes more than 60% and less than 100% of the audio samples of the fourth group of the time-domain audio samples, and wherein the fourth group of the time-domain audio samples includes more than 60% and less than 100% of the audio samples of the third group of the time-domain audio samples, and an output module for outputting the first group of spectral-domain audio samples, the second group of spectral-domain audio samples, the third group of spectral-domain audio samples and the fourth group of spectral-domain audio samples, wherein the third group of the time-domain audio samples includes audio samples of the second group of the time-domain audio samples, or wherein the fourth group of the time-domain audio samples includes audio samples of the first group of the time-domain audio samples.

According to another embodiment, a system may have: an encoder for encoding a plurality of time-domain audio samples of an audio signal by generating a plurality of groups of spectral domain-audio samples from a plurality of groups of the time-domain audio samples, wherein the encoder comprises: a first encoding module for generating a first group of the groups of spectral-domain audio samples from a first group of the groups of the time-domain audio samples, and for generating a second group of the groups of spectral-domain audio samples from a second group of the groups of the time-domain audio samples, wherein the first group of time-domain audio samples and the second group of time-domain audio samples are neighbored in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5% and at most 50% of the audio samples of the first group of the time-domain audio samples, and a second encoding module for generating a third group of the groups of spectral-domain audio samples from a third group of the groups of the time-domain audio samples, and for generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples, and an output module for outputting the first group of spectral-domain audio samples, the second group of spectral-domain audio samples, the third group of spectral-domain audio samples and the fourth group of spectral-domain audio samples, wherein the third group of the time-domain audio samples comprises audio samples of the second group of the time-domain audio samples, or wherein the fourth group of the time-domain audio samples comprises audio samples of the first group of the time-domain audio samples; and an inventive decoder, wherein the encoder is configured to encode a plurality of time-domain audio samples of an audio signal by generating a plurality of spectral-domain audio samples, wherein the decoder is configured to receive a plurality of spectral-domain audio samples from the encoder, wherein the decoder is configured to decode the plurality of spectral-domain audio samples.

According to another embodiment, a method for decoding a plurality of spectral-domain audio samples may have the steps of: decoding a first group of the spectral-domain audio samples by generating a first group of time-domain intermediate audio samples from the spectral-domain audio samples of the first group of the spectral-domain audio samples, and decoding a second group of the spectral-domain audio samples by generating a second group of time-domain intermediate audio samples from the spectral-domain audio samples of the second group of the spectral-domain audio samples, overlap-adding of exactly two groups of time-domain intermediate audio samples, said exactly two groups being the first group and the second group of time-domain intermediate audio samples, wherein said exactly two groups are overlap-added with an overlap of more than 5% and at most 50%, wherein said overlap-add of said exactly two groups results in generating a first plurality of time-domain audio output samples of an audio signal, decoding a third group of the spectral-domain audio samples by generating a third group of time-domain intermediate audio samples from the spectral-domain audio samples of the third group of the spectral-domain audio samples, and decoding a fourth group of the spectral-domain audio samples by generating a fourth group of time-domain intermediate audio samples from the spectral-domain audio samples of the fourth group of the spectral-domain audio samples, outputting the first plurality of time-domain audio output samples of the audio signal, a second plurality of time-domain audio output samples of the audio signal and a third plurality of time-domain audio output samples of the audio signal, obtaining the second plurality of time-domain audio output samples using overlap-adding at least the third group of time-domain intermediate audio samples with an overlap of more than 60 and less than 100% with the fourth group of time-domain intermediate audio samples, and obtaining the third plurality of time-domain audio output samples using overlap-adding of at least the second group of time-domain intermediate audio samples with the third group of time-domain intermediate audio samples, or obtaining the third plurality of time-domain audio output samples using overlap-adding of at least the fourth group of time-domain intermediate audio samples with the first group of time-domain intermediate audio samples.

According to another embodiment, a method for encoding a plurality of time-domain audio samples of an audio signal by generating a plurality of groups of spectral domain-audio samples from a plurality of groups of the time-domain audio samples may have the steps of: generating a first group of the groups of spectral-domain audio samples from a first group of the groups of the time-domain audio samples, and generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples includes more than 5% and at most 50% of the audio samples of the second group of the time-domain audio samples, and wherein the second group of the time-domain audio samples includes more than 5% and at most 50% of the audio samples of the first group of the time-domain audio samples, generating a third group of the groups of spectral-domain audio samples from a third group of the groups of the time-domain audio samples, and generating a fourth group of the groups of spectral-domain audio samples from a fourth group of the groups of the time-domain audio samples, wherein the third group of the time-domain audio samples includes more than 60% and less than 100% of the audio samples of the fourth group of the time-domain audio samples, and wherein the fourth group of the time-domain audio samples includes more than 60% and less than 100% of the audio samples of the third group of the time-domain audio samples, and outputting the first group of spectral-domain audio samples, the second group of spectral-domain audio samples, the third group of spectral-domain audio samples and the fourth group of spectral-domain audio samples, wherein the third group of the time-domain audio samples includes audio samples of the second group of the time-domain audio samples, or wherein the fourth group of the time-domain audio samples includes audio samples of the first group of the time-domain audio samples.

Another embodiment may have a non-transitory digital storage medium having a computer program stored thereon to perform the method for decoding a plurality of spectral-domain audio samples, wherein the method includes: decoding a first group of the spectral-domain audio samples by generating a first group of time-domain intermediate audio samples from the spectral-domain audio samples of the first group of the spectral-domain audio samples, and decoding a second group of the spectral-domain audio samples by generating a second group of time-domain intermediate audio samples from the spectral-domain audio samples of the second group of the spectral-domain audio samples, overlap-adding of exactly two groups of time-domain intermediate audio samples, said exactly two groups being the first group and the second group of time-domain intermediate audio samples, wherein said exactly two groups are overlap-added with an overlap of more than 5% and at most 50%, wherein said overlap-add of said exactly two groups results in generating a first plurality of time-domain audio output samples of an audio signal, decoding a third group of the spectral-domain audio samples by generating a third group of time-domain intermediate audio samples from the spectral-domain audio samples of the third group of the spectral-domain audio samples, and decoding a fourth group of the spectral-domain audio samples by generating a fourth group of time-domain intermediate audio samples from the spectral-domain audio samples of the fourth group of the spectral-domain audio samples, outputting the first plurality of time-domain audio output samples of the audio signal, a second plurality of time-domain audio output samples of the audio signal and a third plurality of time-domain audio output samples of the audio signal, obtaining the second plurality of time-domain audio output samples using overlap-adding at least the third group of time-domain intermediate audio samples with an overlap of more than 60% and less than 100% with the fourth group of time-domain intermediate audio samples, and obtaining the third plurality of time-domain audio output samples using overlap-adding of at least the second group of time-domain intermediate audio samples with the third group of time-domain intermediate audio samples, or obtaining the third plurality of time-domain audio output samples using overlap-adding of at least the fourth group of time-domain intermediate audio samples with the first group of time-domain intermediate audio samples, when said computer program is run by a computer.

Another embodiment may have a non-transitory digital storage medium having a computer program stored thereon to perform the method for encoding a plurality of time-domain audio samples of an audio signal by generating a plurality of groups of spectral domain-audio samples from a plurality of groups of the time-domain audio samples, wherein the encoder includes: generating a first group of the groups of spectral-domain audio samples from a first group of the groups of the time-domain audio samples, and generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples includes more than 5% and at most 50% of the audio samples of the second group of the time-domain audio samples, and wherein the second group of the time-domain audio samples includes more than 5% and at most 50 of the audio samples of the first group of the time-domain audio samples, generating a third group of the groups of spectral-domain audio samples from a third group of the groups of the time-domain audio samples, and generating a fourth group of the groups of spectral-domain audio samples from a fourth group of the groups of the time-domain audio samples, wherein the third group of the time-domain audio samples includes more than 60% and less than 100% of the audio samples of the fourth group of the time-domain audio samples, and wherein the fourth group of the time-domain audio samples includes more than 60% and less than 100% of the audio samples of the third group of the time-domain audio samples, and outputting the first group of spectral-domain audio samples, the second group of spectral-domain audio samples, the third group of spectral-domain audio samples and the fourth group of spectral-domain audio samples, wherein the third group of the time-domain audio samples includes audio samples of the second group of the time-domain audio samples, or wherein the fourth group of the time-domain audio samples includes audio samples of the first group of the time-domain audio samples, when said computer program is run by a computer.

A decoder for decoding a plurality of spectral-domain audio samples is provided. The decoder comprises a first decoding module for generating a first group and a second group of time-domain intermediate audio samples from the spectral-domain audio samples. Moreover, the decoder comprises an overlap-adder for overlap-adding the first group of time-domain intermediate audio samples with an overlap of more than 5% and at most 50% with the second group of time-domain intermediate audio samples.

Furthermore, the decoder comprises a second decoding module for generating a third group and a fourth group of time-domain intermediate audio samples from the spectral-domain audio samples. Moreover, the decoder comprises an output interface. The overlap-adder is configured to overlap-add at least the third group of time-domain intermediate audio samples with an overlap of more than 60% and less than 100% with the fourth group of time-domain intermediate audio samples. Moreover, the overlap-adder is configured to overlap-add at least the second group and the third group of time-domain intermediate audio samples, or to overlap-add at least the fourth group and the first group of time-domain intermediate audio samples.

In particular, a decoder for decoding a plurality of spectral-domain audio samples is provided. The decoder comprises a first decoding module for decoding a first group of the spectral-domain audio samples by generating a first group of time-domain intermediate audio samples from the spectral-domain audio samples of the first group of the spectral-domain audio samples, and for decoding a second group of the spectral-domain audio samples by generating a second group of time-domain intermediate audio samples from the spectral-domain audio samples of the second group of the spectral-domain audio samples.

Moreover, the decoder comprises an overlap-adder, wherein the overlap-adder is configured to conduct overlap-adding of exactly two groups of time-domain intermediate audio samples, said exactly two groups being the first group and the second group of time-domain intermediate audio samples, wherein the overlap-adder is configured to overlap-add said exactly two groups with an overlap of more than 5% and at most 50%, wherein said overlap-add of said exactly two groups results in generating a first plurality of time-domain audio output samples of an audio signal.

Furthermore, the decoder comprises a second decoding module for decoding a third group of the spectral-domain audio samples by generating a third group of time-domain intermediate audio samples from the spectral-domain audio samples of the third group of the spectral-domain audio samples, and for decoding a fourth group of the spectral-domain audio samples by generating a fourth group of time-domain intermediate audio samples from the spectral-domain audio samples of the fourth group of the spectral-domain audio samples.

Moreover, the decoder comprises an output interface for outputting the first plurality of time-domain audio output samples of the audio signal, a second plurality of time-domain audio output samples of the audio signal and a third plurality of time-domain audio output samples of the audio signal, The overlap-adder is configured to obtain the second plurality of time-domain audio output samples using overlap-adding at least the third group of time-domain intermediate audio samples with an overlap of more than 60% and less than 100% with the fourth group of time-domain intermediate audio samples.

Moreover, the overlap-adder is configured to obtain the third plurality of time-domain audio output samples using overlap-adding of at least the second group of time-domain intermediate audio samples with the third group of time-domain intermediate audio samples, or wherein the overlap-adder is configured to obtain the third plurality of time-domain audio output samples using overlap-adding of at least the fourth group of time-domain intermediate audio samples with the first group of time-domain intermediate audio samples.

Moreover, an encoder for encoding a plurality of time-domain audio samples of an audio signal by generating a plurality of groups of spectral domain-audio samples from a plurality of groups of the time-domain audio samples is provided.

The encoder comprises a first encoding module for generating a first group of the groups of spectral-domain audio samples from a first group of the groups of the time-domain audio samples, and for generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5 and at most 50% of the audio samples of the first group of the time-domain audio samples.

Furthermore, the encoder comprises a second encoding module for generating a third group of the groups of spectral-domain audio samples from a third group of the groups of the time-domain audio samples, and for generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples.

Moreover, the encoder comprises an output module for outputting the first group of spectral-domain audio samples, the second group of spectral-domain audio samples, the third group of spectral-domain audio samples and the fourth group of spectral-domain audio samples.

The third group of the time-domain audio samples comprises audio samples of the second group of the time-domain audio samples, or wherein the fourth group of the time-domain audio samples comprises audio samples of the first group of the time-domain audio samples.

Furthermore, a system is provided. The system comprises an encoder according to one of the above-described embodiments, and a decoder according to one of the above-described embodiments. The encoder is configured to encode a plurality of time-domain audio samples of an audio signal by generating a plurality of spectral-domain audio samples. Moreover, the decoder is configured to receive a plurality of spectral-domain audio samples from the encoder. Furthermore, the decoder is configured to decode the plurality of spectral-domain audio samples.

Moreover, a method for decoding a plurality of spectral-domain audio samples is provided. The method comprises:

Decoding a first group of the spectral-domain audio samples by generating a first group of time-domain intermediate audio samples from the spectral-domain audio samples of the first group of the spectral-domain audio samples, and decoding a second group of the spectral-domain audio samples by generating a second group of time-domain intermediate audio samples from the spectral-domain audio samples of the second group of the spectral-domain audio samples.

Overlap-adding of exactly two groups of time-domain intermediate audio samples, said exactly two groups being the first group and the second group of time-domain intermediate audio samples, wherein said exactly two groups are overlap-added with an overlap of more than 5% and at most 50%, wherein said overlap-add of said exactly two groups results in generating a first plurality of time-domain audio output samples of an audio signal.

Decoding a third group of the spectral-domain audio samples by generating a third group of time-domain intermediate audio samples from the spectral-domain audio samples of the third group of the spectral-domain audio samples, and decoding a fourth group of the spectral-domain audio samples by generating a fourth group of time-domain intermediate audio samples from the spectral-domain audio samples of the fourth group of the spectral-domain audio samples.

Outputting the first plurality of time-domain audio output samples of the audio signal, a second plurality of time-domain audio output samples of the audio signal and a third plurality of time-domain audio output samples of the audio signal.

Obtaining the second plurality of time-domain audio output samples using overlap-adding at least the third group of time-domain intermediate audio samples with an overlap of more than 60% and less than 100% with the fourth group of time-domain intermediate audio samples. And:

Obtaining the third plurality of time-domain audio output samples using overlap-adding of at least the second group of time-domain intermediate audio samples with the third group of time-domain intermediate audio samples, or obtaining the third plurality of time-domain audio output samples using overlap-adding of at least the fourth group of time-domain intermediate audio samples with the first group of time-domain intermediate audio samples.

Furthermore, a method for encoding a plurality of time-domain audio samples of an audio signal by generating a plurality of groups of spectral domain-audio samples from a plurality of groups of the time-domain audio samples is provided. The encoder comprises:

Generating a first group of the groups of spectral-domain audio samples from a first group of the groups of the time-domain audio samples, and generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5 and at most 50% of the audio samples of the second group of the time-domain audio samples, and wherein the second group of the time-domain audio samples comprises more than 5% and at most 50% of the audio samples of the first group of the time-domain audio samples.

Generating a third group of the groups of spectral-domain audio samples from a third group of the groups of the time-domain audio samples, and generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples.

Outputting the first group of spectral-domain audio samples, the second group of spectral-domain audio samples, the third group of spectral-domain audio samples and the fourth group of spectral-domain audio samples.

The third group of the time-domain audio samples comprises audio samples of the second group of the time-domain audio samples, or wherein the fourth group of the time-domain audio samples comprises audio samples of the first group of the time-domain audio samples.

Moreover, computer programs are provided, wherein each of the computer programs is configured to implement one of the above-described methods when being executed on a computer or signal processor, so that each of the above-described methods is implemented by one of the computer programs.

Contemporary perceptual audio coders, all of which apply the modified discrete cosine transform (MDCT), with an overlap ratio of 50%, for frequency-domain quantization, provide good coding quality even at low bit-rates.

However, embodiments are based on the finding that relatively long frames are required for acceptable low-rate performance also for quasi-stationary harmonic input, leading to increased algorithmic latency and reduced temporal coding resolution.

Some embodiments extend the overlap ratio in lapped transform coding to more than the conventional 50% employed in contemporary audio codecs.

According to some embodiments the extended lapped transform (ELT) with 75% overlap ratio is employed on such input. To maintain a high time resolution for coding of transient segments, the ELT definition is modified such that frame-wise switching between ELT (for quasi-stationary) and MDCT coding (for non-stationary or non-tonal regions), with complete time-domain aliasing cancelation (TDAC) and no increase in frame length, becomes possible.

Some embodiments provide inventive modifications of the ELT concepts and inventive modifications of the ELT formulae, allowing perfectly reconstructing transitions between transforms with 50% and 75% overlap ratio. In embodiments, proper TDAC, between MDCT coding with an overlap ratio of 50 and ELT coding with a ratio of 75%, is achieved.

In some embodiments, a novel, inventive ELT window is provided. For example, in some embodiments, a new, inventive ELT window function with improved side-lobe rejection/low side-lobe levels to avoid framing artifacts is provided.

According to some embodiments, the inventive modifications of the ELT concepts and the inventive modifications of the ELT formulae may, for example, be used in combination with the novel, inventive ELT window.

Some embodiments provide a signal-adaptive coding scheme applying the switched-ratio principle. A complete coding scheme based on the MPEG-H 3D Audio specification is provided (for details on the MPEG-H 3D Audio specification, see [7]).

Embodiments provide an encoder, a decoder, a system and methods for switching signal-adaptively between MDCT, MDST, and cosine- or sine-modulated ELT coding. Embodiments realize a coding of transient input with high time resolution.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
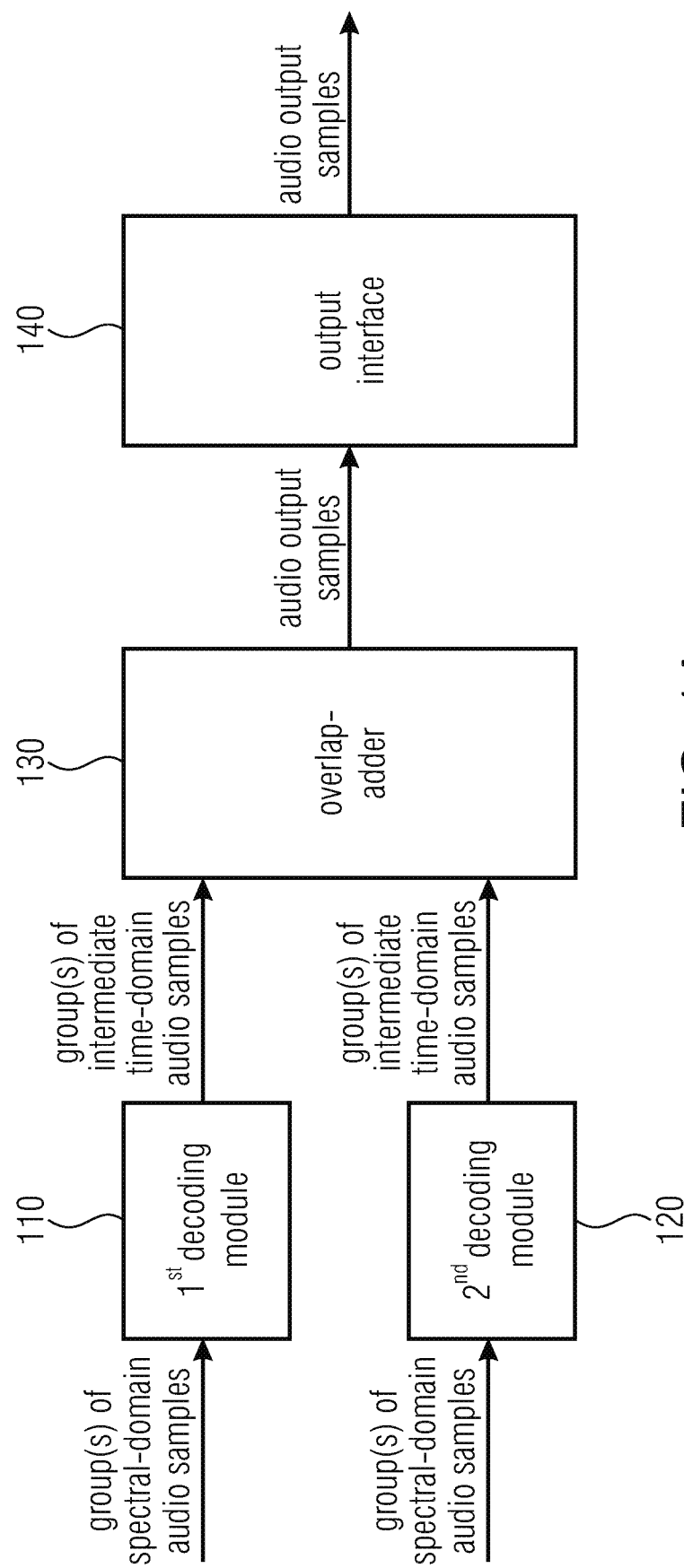
FIG. 1A illustrates a decoder according to an embodiment.

Before specific embodiments are described in detail, principles of lapped transform coding are described.

The ELT, MLT, and MDCT, as mentioned above, can be considered as specific realizations of a general lapped transform formulation, with formula (1) for determining the inverse and with $0 \leq k < M$ and $$X_i(k) = \sum_{n=0}^{L-1} x_i(n) cs\left(\frac{\pi}{M}\left(n + \frac{M+1}{2}\right)\left(k + \frac{1}{2}\right)\right) \quad (2)$$

for the forward (analysis) case.

In formula (2), the cos( ) function has been replaced by placeholder cs( ) to stress that one may also use the sin( ) function in (1, 2) to obtain sine modulated forms like the modified discrete sine transform (MDST) applied in the MCLT (Modulated Complex Lapped Transform) (see [18]) and in [8], [9].

Thus, cs( ) is a placeholder to indicate that sin( ) or cos( ) may be used.

Instead of formula (1) for the inverse MLT (implementing the synthesis of the MLT) or formula (2) for the (forward) ELT (implementing the analysis of the ELT), a plurality of other formulas are employed as lapped transform equations when MLT (for example, MDCT or MDST) or ELT is conducted. Examples of such equations are now presented as formulae (2a)-(2j).

In all formulae (2a)-(2j) and in formulae (4a)-(4h) below, $0 \leq k < M$ and $0 \leq n$ applies, where $X_i(k)$ is the frequency sample at k and $x_i(n)$ is the time sample at n.

A generalized lapped transform formulation may, for example, be formulated as in formulae (2a) and (2b):

Forward (analysis) generalized lapped transform definition:

$$X_i(k) = \sum_{n=0}^{L-1} x_i(n) cs\left(\frac{\pi}{M}(n + n_0)(k + k_0)\right) \quad (2a)$$

Inverse (synthesis) generalized lapped transform definition:

$$x'_i(n) = \frac{2}{M} \sum_{k=0}^{M-1} X'_i(k) cs\left(\frac{\pi}{M}(n+n_0)(k+k_0)\right) \quad (2b)$$

Lapped transforms with 50% overlap ratio may, for example, be formulated as in formulae (2c)-(2j):

Forward (analysis) MDCT, type 4, called MDCT-IV, $N = \frac{L}{2}$:

$$X_i(k) = \sum_{n=0}^{N-1} x_i(n)\cos\left(\frac{\pi}{M}\left(n+\frac{M+1}{2}\right)\left(k+\frac{1}{2}\right)\right) \quad (2c)$$

Inverse (synthesis) MDCT, type 4, called IMDCT-IV, $n < \frac{L}{2}$:

$$x'_i(n) = \frac{2}{M} \sum_{k=0}^{M-1} X'_i(k)\cos\left(\frac{\pi}{M}\left(n+\frac{M+1}{2}\right)\left(k+\frac{1}{2}\right)\right) \quad (2d)$$

Forward (analysis) MDCT, type 2, called MDCT-II, $N = \frac{L}{2}$:

$$X_i(k) = \sum_{n=0}^{N-1} x_i(n)\cos\left(\frac{\pi}{M}\left(n+\frac{M+1}{2}\right)k\right) \quad (2e)$$

Inverse (synthesis) MDCT, type 2, called IMDCT-II, $n < \frac{L}{2}$:

$$x'_i(n) = \frac{2}{m} \sum_{k=0}^{M-1} X'_i(k)\cos\left(\frac{\pi}{M}\left(n+\frac{M+1}{2}\right)k\right) \quad (2f)$$

Forward (analysis) MDST, type 4, called MDST-IV, $N = \frac{L}{2}$:

$$X_i(k) = \sum_{n=0}^{N-1} x_i(n)\sin\left(\frac{\pi}{M}\left(n+\frac{M+1}{2}\right)\left(k+\frac{1}{2}\right)\right) \quad (2g)$$

Inverse (synthesis) MDST, type 4, called IMDST-IV, $n < \frac{L}{2}$:

$$x'_i(n) = \frac{2}{M} \sum_{k=0}^{M-1} X'_i(k)\sin\left(\frac{\pi}{M}\left(n+\frac{M+1}{2}\right)\left(k+\frac{1}{2}\right)\right) \quad (2h)$$

Forward (analysis) MDST, type 2, called MDST-II, $N = \frac{L}{2}$:

$$X_i(k) = \sum_{n=0}^{N-1} x_i(n)\sin\left(\frac{\pi}{M}\left(n+\frac{M+1}{2}\right)(k+1)\right) \quad (2i)$$

Inverse (synthesis) MDST, type 2, called IMDST-II, $n < \frac{L}{2}$:

$$x'_i(n) = \frac{2}{M} \sum_{k=0}^{M-1} X'_i(k)\sin\left(\frac{\pi}{M}\left(n+\frac{M+1}{2}\right)(k+1)\right) \quad (2j)$$

Lapped transforms with 75% overlap ratio, for example, Malvar's forward or inverse extended lapped transform (ELT), may, for example, be formulated in the same way as formulae (2c) and (2d), but with N=L and n<L.

To attain perfect reconstruction (PR) of input signal $s_i(n)$ after subjection to analysis and synthesis transforms in formulae (1) and (2), respectively, at least in the absence of spectral distortion e.g. by quantization (indicated by a' in formula (1)), windows w(n) are used to weight the L-size analysis input $x_i(n)=w(n)\cdot\hat{s}_i(n)$ as well as the synthesis output (n)=w(n)·x'$_i$(n). Since $\hat{s}_i(n)$ exhibits time domain aliasing (TDA) due to the critical-sampling property of lapped transformation, w(n) may fulfill particular design constraints (see [1], [2], [12]). For ELTs with even $\frac{L}{M}$, assuming equal, symmetric w(n) for analysis and synthesis, these are given by $$\sum_{j=0}^{\frac{L}{M}-2l-1} w(k+jM)w(k+jM+2lM) = \delta(l), 0 \le l < \frac{L}{2M}. \quad (3)$$

For the MLT, MDCT, or MDST $$\left(\frac{L}{M} = \frac{N}{M} = 2,\right.$$

the three terms will apply interchangeably hereafter), the TDA is canceled by combining the first temporal half of s with the second half of the previous frame's $\hat{s}_{i-1}$ by means of an overlap-and-add (OLA) procedure. The resulting inter-transform overlap ratio is $$\frac{2-1}{2} = 50\%.$$

In case of the ELT with L=4M, the OLA step may combine the first quarter of s with the second quarter of $\hat{s}_{i-1}$, the third quarter of $\hat{s}'_{i-2}$, and the fourth quarter of $s'_{i-3}$ so the ratio grows to $$\frac{4-1}{4} = 75\%.$$

Figure 4:
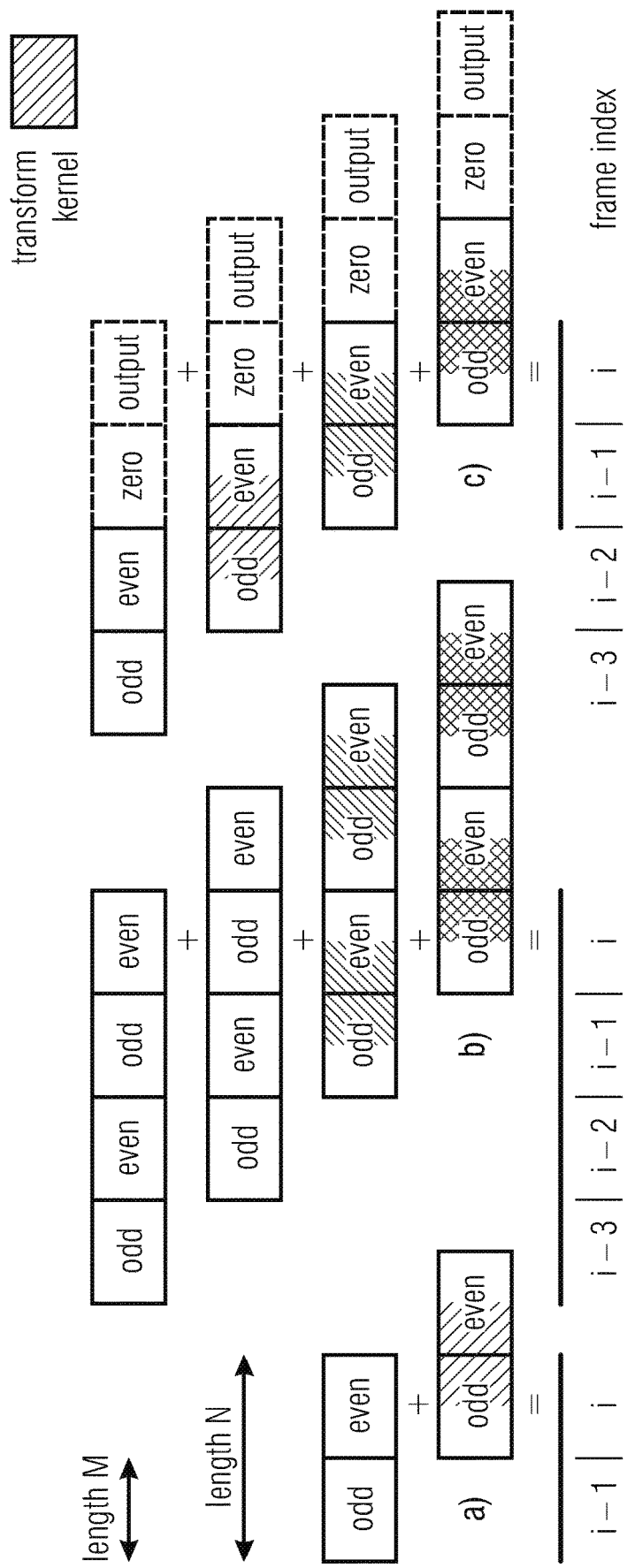
FIG. 4 illustrates TDAC during overlap-add (OLA) in lapped transformation, in FIG. 4 (a) for MLT, in FIG. 4 (b) for ELT, and in FIG. 4 (c) for MLT via ELT.

FIG. 4 illustrates this difference and the worst-case pre-echo (temporal spread of coding errors). More detailed discussions of TDA and perfect reconstruction can be found in [15], [16], [17], [18], [19] and [20].

In particular, FIG. 4 illustrates TDAC during OLA in lapped transformation, in FIG. 4 (a) for MLT, in FIG. 4 (b) for ELT, and in FIG. 4 (c) for MLT via ELT. The length of the line below the windows indicates the maximum pre-echo. It can be seen, that the maximum pre-echo in case of the ELT is longer than in case of the MLT.

It should also be noted that evenly stacked linear-phase ELTs based on the DCT-II, or odd-length ELTs with e.g. L=3M, are possible as well (see [21], [22]) and that the embodiments described below also apply to such ELTs.

Figure 5:
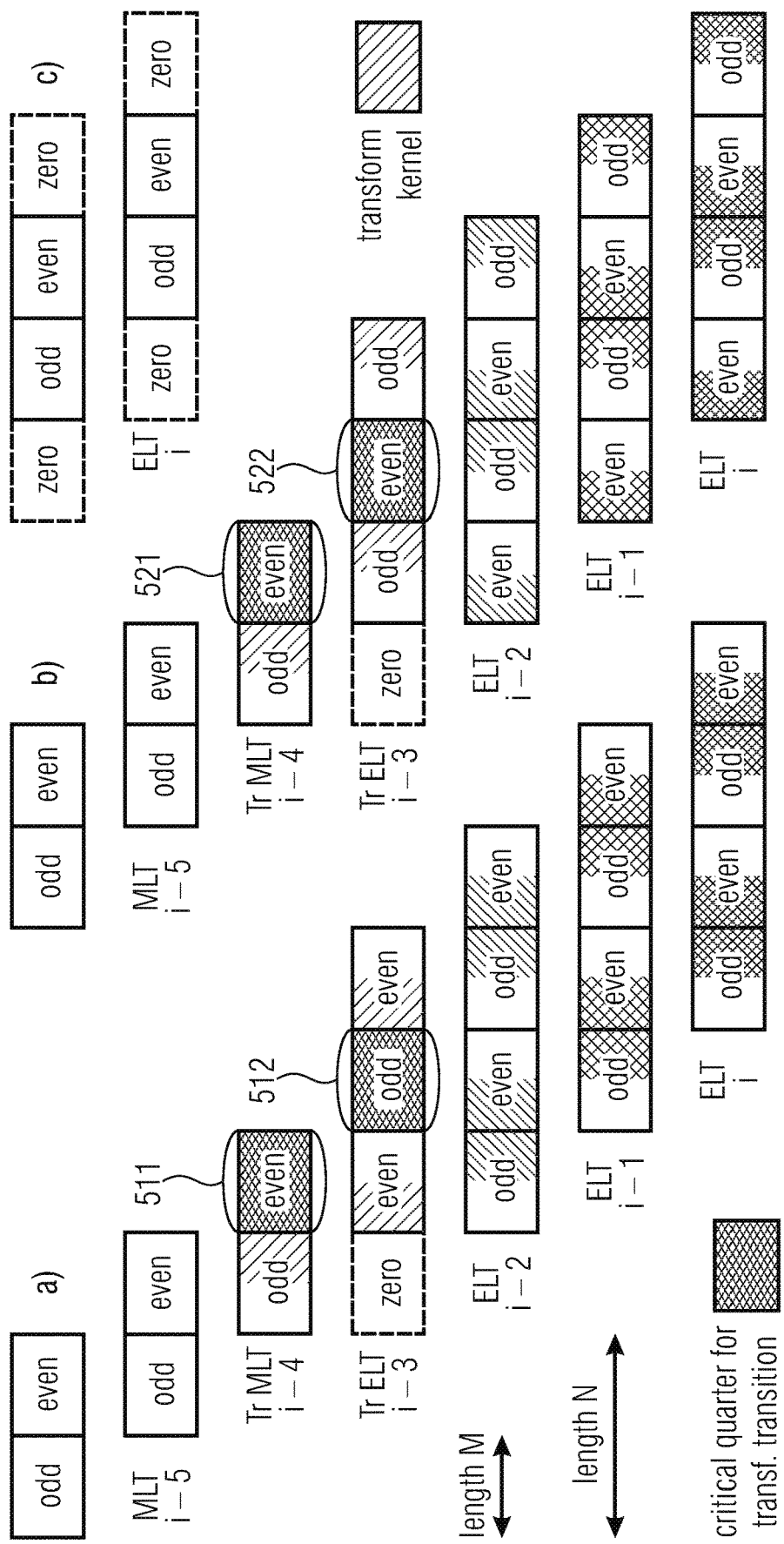
FIG. 5 illustrates the switch from MLT to ELT with transition transforms according to embodiments, wherein FIG. 5 (a) shows incorrect non-perfect reconstruction, wherein FIG. 5 (b) depicts desired perfect reconstruction, and wherein FIG. 5 (c) illustrates MLT via the desired (modified) ELT.

Focusing on the length-4M ELT $$\left(\frac{L}{M} = 4\right),$$

it can be observed that, as shown in FIG. 5 (a), perfect reconstruction is not achieved during switchovers to and from MLT coding since the TDA symmetries are incompatible. In other words, the necessity of adjacent even-odd combinations (see [9], [19]) is violated between frames i−4 and i−3.

Embodiments are now described in detail.

Figure 1B:
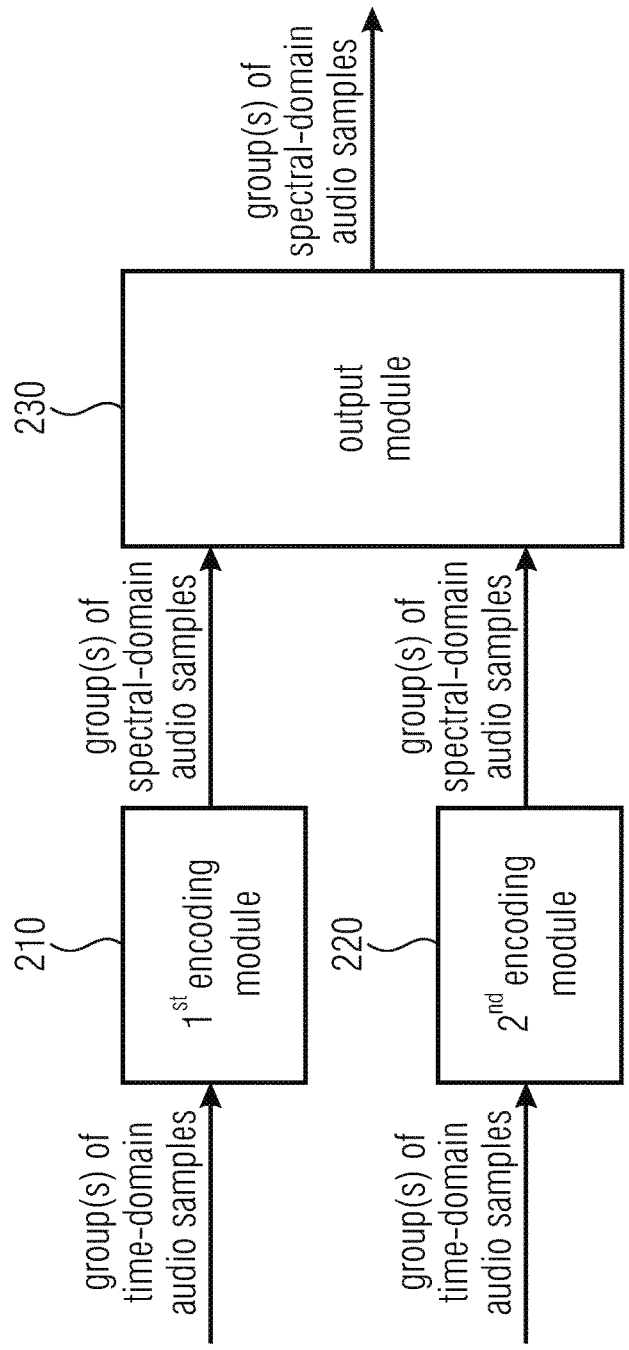
FIG. 1B illustrates an encoder according to an embodiment.

FIG. 1B illustrates an encoder for encoding a plurality of time-domain audio samples of an audio signal by generating a plurality of groups of spectral domain-audio samples from a plurality of groups of the time-domain audio samples according to an embodiment.

The encoder comprises a first encoding module 210 for generating a first group of the groups of spectral-domain audio samples from a first group of the groups of the time-domain audio samples, and for generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5% and at most 50% of the audio samples of the first group of the time-domain audio samples.

Furthermore, the encoder comprises a second encoding module 220 for generating a third group of the groups of spectral-domain audio samples from a third group of the groups of the time-domain audio samples, and for generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples.

Moreover, the encoder comprises an output module 230 for outputting the first group of spectral-domain audio samples, the second group of spectral-domain audio samples, the third group of spectral-domain audio samples and the fourth group of spectral-domain audio samples.

The third group of the time-domain audio samples comprises audio samples of the second group of the time-domain audio samples, or wherein the fourth group of the time-domain audio samples comprises audio samples of the first group of the time-domain audio samples.

Embodiments are inter alia based on the finding that, for some portions of the time-domain audio signal, longer transform windows having a higher overlap are more suitable, while for other signal groups of portions of the time-domain audio signal shorter transform windows with lower overlap are more suitable. A switch between different transform windows is therefore realized at runtime. To realize audio encoding without audible artefacts, neighbouring transform windows overlap, even when their window length changes.

In FIG. 1B, the first encoding module 210 is for encoding smaller groups of the time-domain audio samples which have a smaller overlap with other groups of the time-domain audio samples. However, as even for the first encoding module 210, at least some overlap should exist, more than 5% overlap are required.

The second encoding module 220 is for encoding larger groups of the time-domain audio samples which have a larger overlap compared to those groups processed by the first encoding module 210. A minimum overlap of more than 60% are required.

Figure 2A:
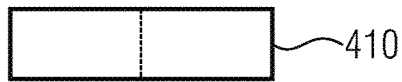
FIG. 2A illustrates the overlapping of four groups of the time-domain audio samples according to an embodiment, when a switch from short groups to long groups is conducted.
Figure 2A:
Figure 2A:
Figure 2A:

FIG. 2A illustrates the overlapping of four groups of the time-domain audio samples according to an embodiment, when a switch from short groups to long groups is conducted.

In particular, each of the first group 410 of the time-domain audio samples, the second group 420 of the time-domain audio samples, the third group 430 of the time-domain audio samples and the fourth group 440 of the time-domain audio samples is schematically depicted by a corresponding block. Dashed lines help to identify the overlap region.

As can be seen, the first group 410 of the time-domain audio samples and the second group 420 of the time-domain audio samples have a 50% overlap. Thus, the first group 410 of the time-domain audio samples comprises exactly 50% of the time-domain audio samples of the second group 420 of the time-domain audio samples, and vice versa.

Moreover, as can be seen, the third group 430 of the time-domain audio samples and the fourth group 440 of the time-domain audio samples have a 75% overlap. Thus, the third group 430 of the time-domain audio samples comprises exactly 75% of the time-domain audio samples of the fourth group 440 of the time-domain audio samples, and vice versa.

Furthermore, as can be seen, the third group 430 of the time-domain audio samples comprises audio samples of the second group 420 of the time-domain audio samples, as both groups have an overlapping range.

Summarizing the embodiment of FIG. 2A, the first group 410 of the time-domain audio samples precedes the second group 420 of the time-domain audio samples in time, the second group 420 of the time-domain audio samples precedes the third group 430 of the time-domain audio samples in time, the third group 430 of the time-domain audio samples precedes the fourth group 440 of the time-domain audio samples in time, and the third group 430 of the time-domain audio samples comprises audio samples of the second group 420 of the time-domain audio samples. The same holds true for the embodiment of FIG. 2B.

Figure 3A:
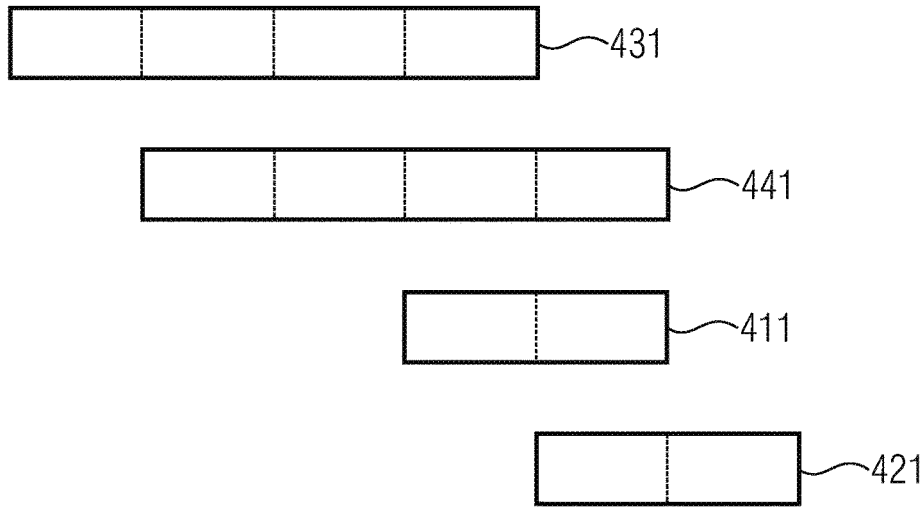
FIG. 3A illustrates the overlapping of four groups of the time-domain audio samples according to an embodiment, when a switch from long groups to short groups is conducted.

An example for a switch from long groups to short groups is provided by FIG. 3A.

FIG. 3A illustrates the overlapping of four groups of the time-domain audio samples according to an embodiment, when a switch from long groups to short groups is conducted.

In particular, again, each of the first group 411 of the time-domain audio samples, the second group 421 of the time-domain audio samples, the third group 431 of the time-domain audio samples and the fourth group 441 of the time-domain audio samples is schematically depicted by a corresponding block. Dashed lines again help to identify the overlap region.

As can be seen, the first group 411 of the time-domain audio samples and the second group 421 of the time-domain audio samples have a 50% overlap. Thus, the first group 411 of the time-domain audio samples comprises exactly 50% of the time-domain audio samples of the second group 421 of the time-domain audio samples, and vice versa.

Moreover, as can be seen, the third group 431 of the time-domain audio samples and the fourth group 441 of the time-domain audio samples have a 75% overlap. Thus, the third group 431 of the time-domain audio samples comprises exactly 75% of the time-domain audio samples of the fourth group 441 of the time-domain audio samples, and vice versa.

Furthermore, as can be seen, the fourth group 441 of the time-domain audio samples comprises audio samples of the first group 411 of the time-domain audio samples, as both groups have an overlapping range.

Summarizing the embodiment of FIG. 3A, the third group 431 of the time-domain audio samples precedes the fourth group 441 of the time-domain audio samples in time, the fourth group 441 of the time-domain audio samples precedes the first group 411 of the time-domain audio samples in time, the first group 411 of the time-domain audio samples precedes the second group 421 of the time-domain audio samples in time, and the fourth group 441 of the time-domain audio samples comprises audio samples of the first group 411 of the time-domain audio samples. The same holds true for the embodiment of FIG. 3B.

According to an embodiment, the first group 410, 411 of the time-domain audio samples may, e.g., comprise exactly 50% of the audio samples of the second group 420, 421 of the time-domain audio samples, and the second group of the time-domain audio samples may, e.g., comprise exactly 50% of the audio samples of the first group of the time-domain audio samples. FIG. 2A, FIG. 3A, FIG. 2B and FIG. 3B realize such an embodiment.

The third group 430, 431 of the time-domain audio samples may, e.g., comprise at least 75% and less than 100% of the audio samples of the fourth group 440, 441 of the time-domain audio samples, and the fourth group 440, 441 of the time-domain audio samples may, e.g., comprise at least 75% and less than 100% of the audio samples of the third group 430, 431 of the time-domain audio samples. FIG. 2A, FIG. 3A, FIG. 2B and FIG. 3B also realize such an embodiment.

In an embodiment, the first encoding module 210 may, e.g., be configured to conduct a Modified Discrete Cosine Transform or a Modified Discrete Sine Transform, and the second encoding module 220 may, e.g., be configured to conduct an Extended Lapped Transform or a Modified Extended Lapped Transform.

According to an embodiment, the third group 430, 431 of the time-domain audio samples may, e.g., comprise exactly 75% of the audio samples of the fourth group 440, 441 of the time-domain audio samples, and the fourth group 440, 441 of the time-domain audio samples may, e.g., comprise exactly 75% of the audio samples of the third group 430, 431 of the time-domain audio samples.

In an embodiment, a first number of time-domain audio samples of the first group of the time-domain audio samples may, e.g., be equal to a second number of time-domain audio samples of the second group of the time-domain audio samples. A third number of time-domain audio samples of the third group of the time-domain audio samples may, e.g., be equal to a fourth number of time-domain audio samples of the fourth group of the time-domain audio samples. The second number may, e.g., be equal to the third number divided by 2, and wherein the first number may, e.g., be equal to the fourth number divided by 2.

E.g., a particular example of such an embodiment is that all groups encoded by the second encoding module 220 have exactly twice the samples of all groups encoded by the first encoding module 210.

According to an embodiment of the encoder of FIG. 1B, the second encoding module 220 is configured to generate a fifth group of spectral-domain audio samples from a fifth group of the time-domain audio samples, and wherein the second encoding module 220 is configured to generate a sixth group of spectral-domain audio samples from a sixth group of the time-domain audio samples. The third or the fourth group of the time-domain audio samples comprises at least 75% and less than 100% of the audio samples of the fifth group of the time-domain audio samples, wherein the fifth group of the time-domain audio samples comprises at least 75% and less than 100% of the audio samples of the third or the fourth group of the time-domain audio samples, wherein the fifth group of the time-domain audio samples comprises at least 75% and less than 100% of the audio samples of the sixth group of the time-domain audio samples, wherein the sixth group of the time-domain audio samples comprises at least 75% and less than 100% of the audio samples of the fifth group of the time-domain audio samples. The output module 230 is configured to further output the fifth group of spectral-domain audio samples, and the sixth group of spectral-domain audio samples.

Figure 2B:
FIG. 2B illustrates the overlapping of six groups of the time-domain audio samples according to an embodiment, when a switch from short groups to long groups is conducted.
Figure 2B:
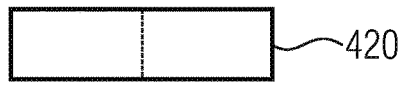
Figure 2B:
Figure 2B:
Figure 2B:
Figure 2B:
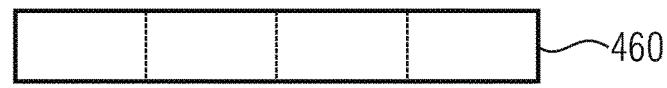

FIG. 2B illustrates the overlapping of six groups of the time-domain audio samples according to an embodiment, when a switch from short groups to long groups is conducted.

As can be seen, the fourth group 440 of the time-domain audio samples and the fifth group 450 of the time-domain audio samples have a 75% overlap. Thus, the fifth group 450 of the time-domain audio samples comprises exactly 75% of the time-domain audio samples of the fourth group 440 of the time-domain audio samples, and vice versa.

Moreover, as can be seen, the fifth group 450 of the time-domain audio samples and the fifth group 460 of the time-domain audio samples have a 75% overlap. Thus, the sixth group 460 of the time-domain audio samples comprises exactly 75% of the time-domain audio samples of the fifth group 450 of the time-domain audio samples, and vice versa.

According to embodiment, the first group 410, 411 of time-domain audio samples and the second group of time-domain audio samples 420, 421 are neighboured in time. For example, in FIG. 2B six groups of the time-domain audio samples are illustrated, namely 410, 420, 430, 440, 450, 460. A sequence in time can be defined for these six groups.

For example, the first sample of the first group 410 of time-domain audio samples relates to a point in time earlier (more in the past), than the first sample of the second group 420 of time-domain audio samples.

The first sample of the second group 420 of time-domain audio samples relates to the same point in time as the first sample of the third group 430 of time-domain audio samples. However, the last sample of the second group 420 of time-domain audio samples relates to a point in time earlier than the last sample of the third group 430 of time-domain audio samples.

The first sample of the third group 430 of time-domain audio samples relates to a point in time earlier than the first sample of fourth group 440 of time-domain audio samples.

The first sample of the fourth group 440 of time-domain audio samples relates to a point in time earlier than the first sample of fifth group 450 of time-domain audio samples.

The first sample of the fifth group 450 of time-domain audio samples relates to a point in time earlier than the first sample of sixth group 460 of time-domain audio samples.

The resulting sequence in time for FIG. 2B is 410, 420, 430, 440, 450, 460.

Figure 3B:
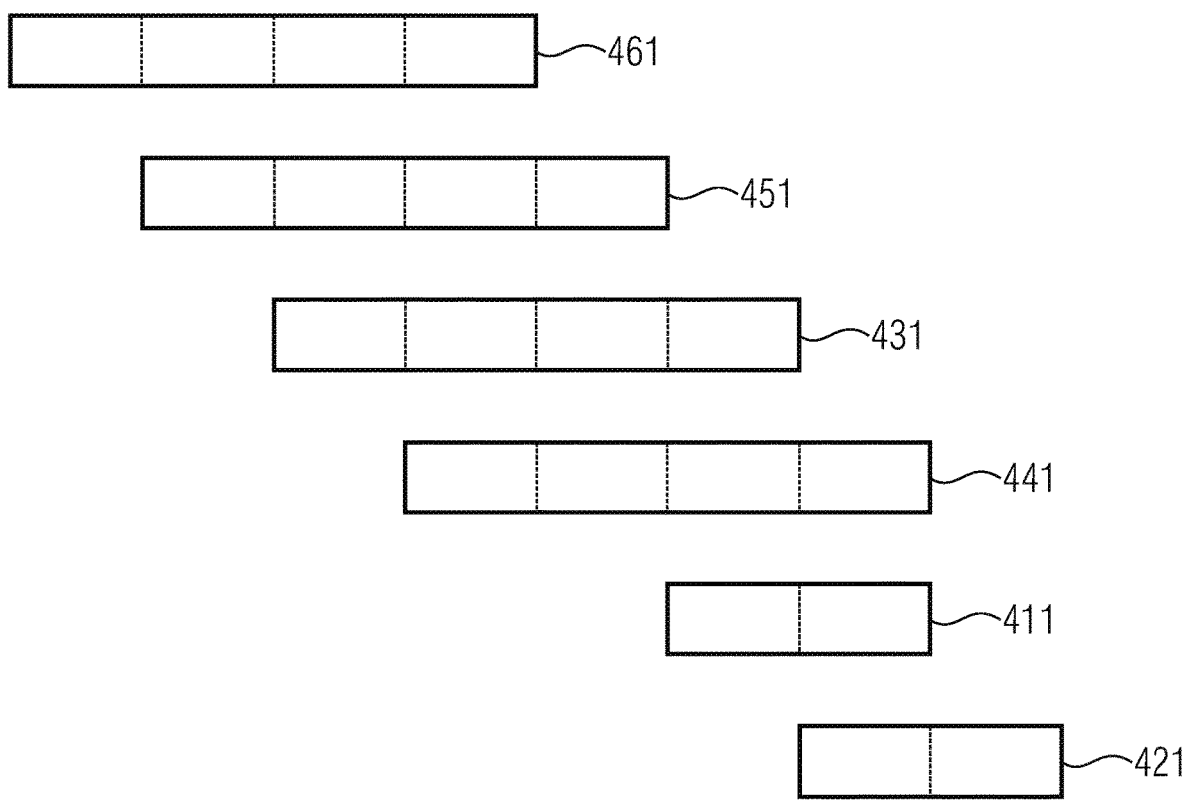
FIG. 3B illustrates the overlapping of six groups of the time-domain audio samples according to an embodiment, when a switch from long groups to short groups is conducted.

Applying the same reasoning for FIG. 3B relates to the sequence in time for FIG. 3B: 461, 451, 431, 441, 411, 421.

The reasoning for determining a sequence in time is:

If the first sample of a group A of time-domain audio samples relates to a point-in time earlier than the first sample of a group B of time-domain audio samples, then group A appears earlier in the sequence of time then group B.

If the first sample of a group A of time-domain audio samples relates to the same point-in time line the first sample of a group B, then group A appears earlier in the sequence of time then group B, if the last sample of group A of time-domain audio samples relates to a point-in time earlier than the last sample of group B.

Two groups of the time-domain audio samples are neighboured in time, if they are (immediate) neighbours in the sequence in time of groups of the time-domain audio samples.

For example, consider the sequence in time for FIG. 2B: 410, 420, 430, 440, 450, 460. There, groups 410 and 420 are neighboured in time, groups 420 and 430 are neighboured in time, groups 430 and 440 are neighboured in time, groups 440 and 450 are neighboured in time and groups 450 and 460 are neighboured in time, but no other pairs of two groups are neighboured in time.

For example, consider the sequence in time for FIG. 3B: 461, 451, 431, 441, 411, 421. There, groups 461 and 451 are neighboured in time, groups 451 and 431 are neighboured in time, groups 431 and 441 are neighboured in time, groups 441 and 411 are neighboured in time and groups 411 and 421 are neighboured in time, but no other pairs of two groups are neighboured in time.

Regarding FIG. 3B, FIG. 3B illustrates the overlapping of six groups of the time-domain audio samples according to an embodiment, when a switch from long groups to short groups is conducted.

As can be seen, the third group 431 of the time-domain audio samples and the fifth group 451 of the time-domain audio samples have a 75% overlap. Thus, the fifth group 451 of the time-domain audio samples comprises exactly 75% of the time-domain audio samples of the third group 431 of the time-domain audio samples, and vice versa.

Moreover, as can be seen, the fifth group 451 of the time-domain audio samples and the fifth group 461 of the time-domain audio samples have a 75% overlap. Thus, the sixth group 461 of the time-domain audio samples comprises exactly 75% of the time-domain audio samples of the fifth group 451 of the time-domain audio samples, and vice versa.

In embodiments, a window function may be applied on the time-domain audio samples by the first encoding module 210 or the second encoding module 220 to obtain weighted time-domain samples, and afterwards, the first encoding module 210 or the second encoding module 220 may generate the spectral-domain audio samples from the weighted time-domain samples.

In an embodiment, the encoder is configured to either employ the first encoding module 210 or the second encoding module 220 for generating a current group of spectral-domain audio samples depending on a signal property of a portion of the time-domain audio signal.

According to an embodiment, the encoder is configured to determine as the signal property, whether a current group of the plurality of time-domain audio samples comprises at least one of non-stationary regions and non-tonal regions. The encoder is configured to employ the first encoding module 210 to generate the current group of spectral-domain audio samples depending on the current group of the plurality of time-domain audio samples, if the current group of the plurality of time-domain audio samples comprises said at least one of the non-stationary regions and the non-tonal regions. Moreover, the encoder is configured to employ the second encoding module 220 to generate the current group of spectral-domain audio samples depending on the current group of the plurality of time-domain audio samples, if the current group of the plurality of time-domain audio samples does not comprise said at least one of the non-stationary regions and the non-tonal regions.

In an embodiment, the output module 230 is configured to output a bit having either a first bit value or a second bit value depending on the signal property. Thus, the bit may be employed on a decoder side to determine whether an encoder used the first encoding module 210 or the second encoding module 220 for encoding.

FIG. 1A illustrates a decoder for decoding a plurality of spectral-domain audio samples according to an embodiment.

The decoder comprises a first decoding module 110 for decoding a first group of the spectral-domain audio samples by generating a first group of time-domain intermediate audio samples from the spectral-domain audio samples of the first group of the spectral-domain audio samples, and for decoding a second group of the spectral-domain audio samples by generating a second group of time-domain intermediate audio samples from the spectral-domain audio samples of the second group of the spectral-domain audio samples.

Moreover, the decoder comprises an overlap-adder 130, wherein the overlap-adder 130 is configured to conduct overlap-adding of exactly two groups of time-domain intermediate audio samples, said exactly two groups being the first group and the second group of time-domain intermediate audio samples, wherein the overlap-adder 130 is configured to overlap-add said exactly two groups with an overlap of more than 5% and at most 50%, wherein said overlap-add of said exactly two groups results in generating a first plurality of time-domain audio output samples of an audio signal.

Furthermore, the decoder comprises a second decoding module 120 for decoding a third group of the spectral-domain audio samples by generating a third group of time-domain intermediate audio samples from the spectral-domain audio samples of the third group of the spectral-domain audio samples, and for decoding a fourth group of the spectral-domain audio samples by generating a fourth group of time-domain intermediate audio samples from the spectral-domain audio samples of the fourth group of the spectral-domain audio samples.

Moreover, the decoder comprises an output interface 140 for outputting the first plurality of time-domain audio output samples of the audio signal, a second plurality of time-domain audio output samples of the audio signal and a third plurality of time-domain audio output samples of the audio signal, The overlap-adder 130 is configured to obtain the second plurality of time-domain audio output samples using overlap-adding at least the third group of time-domain intermediate audio samples with an overlap of more than 60% and less than 100% with the fourth group of time-domain intermediate audio samples.

Moreover, the overlap-adder 130 is configured to obtain the third plurality of time-domain audio output samples using overlap-adding of at least the second group of time-domain intermediate audio samples with the third group of time-domain intermediate audio samples, or wherein the overlap-adder 130 is configured to obtain the third plurality of time-domain audio output samples using overlap-adding of at least the fourth group of time-domain intermediate audio samples with the first group of time-domain intermediate audio samples.

The explanations that have been provided with reference to FIG. 2A, FIG. 2B, FIG. 2C and FIG. 2D for the overlapping of the groups of the time-domain audio samples 410, 411, 420, 421, 430, 431, 440, 441, 450, 451, 460 and 461 equally apply for the groups of time-domain intermediate audio samples.

In embodiments, the first audio output samples are generated based on overlap-adding the first and the second time-domain audio output samples, the second audio output samples are generated based on overlap-adding the third and the fourth time-domain audio output samples, In the decoder embodiments corresponding to the situation in FIGS. 2A and 2B, the first plurality of time-domain audio output samples of the audio signal precedes the third plurality of time-domain audio output samples of the audio signal in time, and wherein the third plurality of time-domain audio output samples of the audio signal precedes the second plurality of time-domain audio output samples of the audio signal in time, and wherein the overlap-adder 130 is configured to obtain the third plurality of time-domain audio output samples using overlap-adding of at least the second group of time-domain intermediate audio samples with the third group of time-domain intermediate audio samples, or In the decoder embodiments corresponding to the situation in FIGS. 3A and 3B, the second plurality of time-domain audio output samples of the audio signal precedes the third plurality of time-domain audio output samples of the audio signal in time, and wherein the third plurality of time-domain audio output samples of the audio signal precedes the first plurality of time-domain audio output samples of the audio signal in time, and wherein the overlap-adder 130 is configured to obtain the third plurality of time-domain audio output samples using overlap-adding of at least the second group of time-domain intermediate audio samples with the third group of time-domain intermediate audio samples.

Moreover, it has been outlined the first group and the second group of time-domain intermediate audio samples overlap of more than 5% and at most 50%. In most embodiments, the first decoding module 110 generates groups of time-domain intermediate audio samples that have the same number of samples, in other words, the window used by the first decoding module 110 has in general the same size. Then, to determine the overlap of the first and the second group of time-domain intermediate audio samples, the number of intermediate time-domain audio samples of the first group that overlap with samples of the second group of time-domain intermediate audio samples in the overlap-add (for example, 1024 samples) is divided by the total number of samples of the first group of time-domain intermediate audio samples (for example, 2048 samples) to determine the overlap of the overlap-add (1024/2048=50%). However, in the extraordinary embodiment that the first decoding module 110 generates groups of time-domain intermediate audio samples that have a different number of samples, then the larger one of the groups of time-domain intermediate audio samples is considered and the overlap is defined as the number of time-domain intermediate audio samples of the larger group that overlap with samples of the smaller group (e.g., 768 samples) divided by the total number of samples of the larger group (e.g., 2048 samples) (overlap: 768/2048=37.5%).

Furthermore, it has been outlined that the third group and the fourth group of time-domain intermediate audio samples overlap with more than 60% and less than 100%. In most embodiments, the second decoding module 120 generates groups of time-domain intermediate audio samples that have the same number of samples, in other words, the window used by the second decoding module 120 has in general the same size (but the size of the groups/windows is often different from the size of the groups/windows that are generated/used by the first decoding module 110). Then, to determine the overlap of the third and the fourth group of time-domain intermediate audio samples, the number of intermediate time-domain audio samples of the third group that overlap with samples of the fourth group of time-domain intermediate audio samples in the overlap-add (for example, 3584 samples) is divided by the total number of samples of the first group of time-domain intermediate audio samples (for example, 4096 samples) to determine the overlap of the overlap-add (3584/4096=87.5%). However, in the extraordinary embodiment that the second decoding module 120 generates groups of time-domain intermediate audio samples that have a different number of samples, then the larger one of the groups of time-domain intermediate audio samples is considered and the overlap is defined as the number of time-domain intermediate audio samples of the larger group that overlap with samples of the smaller group (e.g., 3072 samples) divided by the total number of samples of the larger group (e.g., 4096 samples) (overlap: 3072/4096=75%).

Overlap-adding is well known by the person skilled in the art. Overlap-adding two groups of the time-domain audio samples is particularly well-known by the person skilled in the art.

One way of implementing overlap-adding of three or more groups may, e.g., be to overlap-add two of the three or more groups to obtain an intermediate overlap-add result, and then overlap-add a third group of the three or more groups to the intermediate overlap-add result, and to continue to proceed likewise, until all groups are overlapped-added with the (updated) intermediate result.

Another approach would be to at first overlap all of the three or more groups suitably and to then add corresponding samples of the groups in the overlap to obtain the result of the overlap-add.

According to an embodiment, the overlap-adder 130 may, e.g., be configured to overlap-add the first group of time-domain intermediate audio samples with an overlap of exactly 50% with the second group of time-domain intermediate audio samples. The overlap-adder 130 may, e.g., be configured to overlap-add at least the third group of time-domain intermediate audio samples with an overlap of at least 75% and less than 100% with the fourth group of time-domain intermediate audio samples.

In an embodiment, the first decoding module 110 may, e.g., be configured to conduct an inverse Modified Discrete Cosine Transform or an inverse Modified Discrete Sine Transform. The second decoding module 120 is configured to conduct an inverse Extended Lapped Transform or an inverse Modified Extended Lapped Transform.

According to an embodiment, the overlap-adder 130 may, e.g., be configured to overlap-add at least the third group of time-domain intermediate audio samples with an overlap of exactly 75% with the fourth group of time-domain intermediate audio samples.

In an embodiment, a first number of time-domain intermediate audio samples of the first group of time-domain intermediate audio samples may, e.g., be equal to a second number of time-domain intermediate audio samples of the second group of time-domain intermediate audio samples. A third number of time-domain intermediate audio samples of the third group of time-domain intermediate audio samples may, e.g., be equal to a fourth number of time-domain intermediate audio samples of the fourth group of time-domain intermediate audio samples. The second number may, e.g., be equal to the third number divided by 2, and wherein the first number is equal to the fourth number divided by 2.

According to an embodiment of the decoder of FIG. 1A, the second decoding module 120 may, e.g., be configured to decode a fifth group of the spectral-domain audio samples by generating a fifth group of time-domain intermediate audio samples from the spectral-domain audio samples of the fifth group of the spectral-domain audio samples, and for decoding a sixth group of the spectral-domain audio samples by generating a sixth group of time-domain intermediate audio samples from the spectral-domain audio samples of the sixth group of the spectral-domain audio samples. The overlap-adder 130 is configured to obtain the second plurality of time-domain audio output samples by overlap-adding the third group of time-domain intermediate audio samples and the fourth group of time-domain intermediate audio samples and the fifth group of time-domain intermediate audio samples and the sixth group of time-domain intermediate audio samples, such that the third or the fourth group of time-domain intermediate audio samples overlaps with at least 75% and less than 100% with the fifth group of time-domain intermediate audio samples, and such that the fifth group of time-domain intermediate audio samples overlaps with at least 75% and less than 100% with the sixth group of time-domain intermediate audio samples.

Reference is made to the explanations provided above with respect to the groups of the time-domain audio samples 410, 411, 420, 421, 430, 431, 440, 441, 450, 451, 460 and 461 in FIG. 2B and FIG. 3B, which explanations equally apply to groups of time-domain intermediate audio samples.

In an embodiment, the overlap-adder 130 is configured to overlap-add at least the second group of time-domain intermediate audio samples with the third group of time-domain intermediate audio samples, so that all time-domain intermediate audio samples of the second group of time-domain intermediate audio samples overlap with time-domain intermediate audio samples of the third group of time-domain intermediate audio samples.

Or, the overlap-adder 130 is configured to overlap-add at least the fourth group of time-domain intermediate audio samples with the first group of time-domain intermediate audio samples, so that all time-domain intermediate audio samples of the first group of time-domain intermediate audio samples overlap with the fourth group of time-domain intermediate audio samples.

Figure 1C:
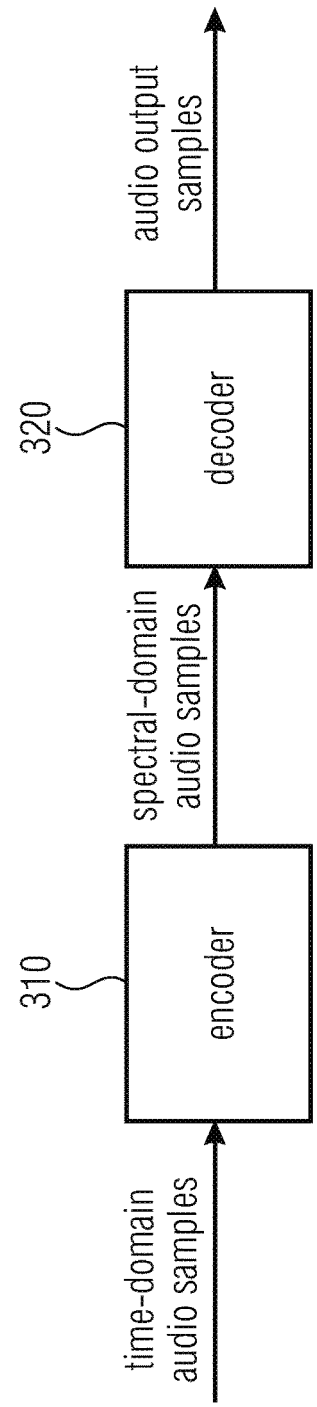
FIG. 1C illustrates a system according to an embodiment.

FIG. 1C illustrates a system according to an embodiment. The system comprises an encoder 310 according to one of the above-described embodiments, and a decoder 320 according to one of the above-described embodiments. The encoder 310 is configured to encode a plurality of time-domain audio samples of an audio signal by generating a plurality of spectral-domain audio samples. Moreover, the decoder 320 is configured to receive a plurality of spectral-domain audio samples from the encoder Furthermore, the decoder is configured to decode the plurality of spectral-domain audio samples.

To reduce or avoid time domain aliasing, regarding an embodiment of the encoder of FIG. 1B, the second encoding module 220 is configured to generate at least one of the third group and the fourth group of spectral-domain audio samples depending on $$cs(a(n+b)(k+c)),$$

wherein cs( ) is cos( ) or sin( ),
wherein n indicates a time index of one of the time-domain audio samples of the third or the fourth group of time-domain audio samples,
wherein k indicates a spectral index of one of the spectral-domain audio samples of the first or the second or the third or the fourth group of the spectral-domain audio samples,
wherein $-0.1 \leq c \leq 0.1$, or $0.4 \leq c \leq 0.6$, or $0.9 \leq c \leq 1.1$,
wherein $$a = \frac{q}{M},$$

wherein $0.9 \cdot \pi \leq q \leq 1.1 \cdot \pi$.

M indicates a number of spectral-domain audio samples of the first or the second or the third or the fourth group of the spectral-domain audio samples,
wherein $$b = \frac{s \cdot M + 1}{2},$$

and
wherein $1.5 \leq s \leq 4.5$.

In an embodiment, the first encoding module 210 is configured to generate at least one of the first group and the second group of spectral-domain audio samples depending on $$cs_1(a(n_1+b_1)(k+c_1)),$$

wherein $cs_1( )$ is $\cos( )$ or $\sin( )$,
wherein $n_1$ indicates a time index of one of the time-domain audio samples of the first or the second group of time-domain audio samples,
wherein $-0.1 \leq c_1 \leq 0.1$, or $0.4 \leq c_1 \leq 0.6$, or $0.9 \leq c_1 \leq 1.1$,
wherein $$b_1 = \frac{M+1}{2}.$$

According to an embodiment $c=0$, or $c=0.5$, or $c=1$, $q=\pi$, and $s=3$.

Setting $s=3$ achieves to optimally reduce time domain aliasing, while setting $1.5 \leq s \leq 4.5$ with $s \neq 3$ achieves some degree of time domain aliasing reduction, but, in general, not as much reduction as for $s=3$.

Particular embodiments work particularly well. See table 1 and table 2:

TABLE 1

| ss. MLT | -> tr. MLT | -> tr. MELT | -> ss. MELT | -> | ... |
|---------|-----------|------------|-------------|-----|-----|
| MDCT-IV | MDCT-IV | MECT-IV | MECT-IV | OK | |
| MDCT-IV | MDCT-IV | MEST-II | MECT-II | OK | |
| MDCT-IV | MDST-II | MEST-IV | MEST-IV | OK | |
| MDCT-IV | MDST-II | MECT-II | MEST-II | OK | |
| MDCT-II | MDCT-IV | MECT-IV | MECT-IV | OK | |
| MDCT-II | MDCT-IV | MEST-II | MECT-II | OK | |
| MDCT-II | MDST-II | MEST-IV | MEST-IV | OK | |
| MDCT-II | MDST-II | MECT-II | MEST-II | OK | |
| MDST-IV | MDST-IV | MEST-IV | MEST-IV | OK | |
| MDST-IV | MDST-IV | MECT-II | MEST-II | OK | |
| MDST-IV | MDCT-II | MECT-IV | MECT-IV | OK | |
| MDST-IV | MDCT-II | MEST-II | MECT-II | OK | |

Table 1 shows a switching from MLT to ELT. In each line, functions for four subsequent windows/corresponding groups of the time-domain audio samples are illustrated. The first two columns relate to the last two MLT windows (the last but one and the last MLT window), column 3 and 4 relates to the first and second ELT window, respectively. Each line represents a particularly good combination of functions for subsequent windows. The formulae for MDCT-II, MDST-II, MDCT-IV and MDST-IV and for MECT-II, MEST-II, MECT-IV and MEST-IV and the corresponding inverse formulae are presented with respect to formulae (2a)-(2j) and (4a)-(4h). The illustrated combinations work equally well for the inverse transformations with the inverse functions.

So, for example, in an embodiment, $q=\pi$, wherein $s=3$, wherein $cs( )$ is $\cos( )$, and $cs_1( )$ is $\cos( )$, and wherein $c=0.5$, and $c_1=0.5$.

In another embodiment, $q=\pi$, wherein $s=3$, wherein $cs( )$ is $\sin( )$, and $cs_1( )$ is $\cos( )$, and wherein $c=1$, and $c_1=0$.

In another embodiment, $q=\pi$, wherein $s=3$, wherein $cs( )$ is $\sin( )$, and $cs_1( )$ is $\sin( )$, and wherein $c=0.5$, and $c_1=1$.

In another embodiment, $q=\pi$, wherein $s=3$, wherein $cs( )$ is $\cos( )$, and $cs_1( )$ is $\sin( )$, and wherein $c=0$, and $c_1=1$.

In another embodiment, $q=\pi$, wherein $s=3$, wherein $cs( )$ is $\sin( )$, and $cs_1( )$ is $\sin( )$, and wherein $c=0.5$, and $c_1=0.5$.

In another embodiment, $q=\pi$, wherein $s=3$, wherein $cs( )$ is $\cos( )$, and $cs_1( )$ is $\sin( )$, and wherein $c=0$, and $c_1=0.5$.

In another embodiment, $q=\pi$, wherein $s=3$, wherein $cs( )$ is $\cos( )$, and $cs_1( )$ is $\cos( )$, and wherein $c=0.5$, and $c_1=0$.accor In another embodiment, $q=\pi$, wherein $s=3$, wherein $cs( )$ is $\sin( )$, and $cs_1( )$ is $\cos( )$, and wherein $c=1$, and $c_1=0$.

TABLE 2

| ss. MELT | -> tr. MELT | -> tr. MLT | -> ss. MLT | -> | ... |
|----------|------------|-----------|------------|-----|-----|
| MECT-IV | MECT-IV | MDCT-IV | MDCT-IV | | |
| MECT-IV | MECT-IV | MDCT-IV | MDST-II | | |
| MECT-IV | MECT-IV | MDST-II | MDST-IV | | |
| MECT-IV | MECT-IV | MDST-II | MDCT-II | | |
| MECT-II | MEST-II | MDST-IV | MDST-IV | | |
| MECT-II | MEST-II | MDST-IV | MDCT-II | | |
| MECT-II | MEST-II | MDCT-II | MDCT-IV | | |
| MECT-II | MEST-II | MDCT-II | MDST-II | | |
| MEST-IV | MEST-IV | MDST-IV | MDST-IV | | |
| MEST-IV | MEST-IV | MDST-IV | MDCT-II | | |
| MEST-IV | MEST-IV | MDCT-II | MDCT-IV | | |
| MEST-IV | MEST-IV | MDCT-II | MDST-II | | |

Table 2 shows a switching from ELT to MLT. In each line, functions for four subsequent windows (corresponding groups of the time-domain audio samples) are illustrated. The first two columns relate to the last two ELT windows (the last but one and the last ELT window), column 3 and 4 relates to the first and second MLT window, respectively. Each line represents a particularly good combination of functions for subsequent windows. The formulae for MDCT-II, MDST-II, MDCT-IV and MDST-IV and for MECT-II, MEST-II, MECT-IV and MEST-IV and the corresponding inverse formulae are presented with respect to formulae (2a)-(2j) and (4a)-(4h). The illustrated combinations work equally well for the inverse transformations with the inverse functions.

In an embodiment, the second encoding module 220 is configured to generate at least one of the third group and the fourth group of spectral-domain audio samples depending on $$\hat{X}_i(k) = \sum_{n=0}^{L-1} \hat{x}_i(n) \cos\left(\frac{\pi}{M}\left(n + \frac{3M+1}{2}\right)\left(k + \frac{1}{2}\right)\right),$$

or
depending on $$\hat{X}_i(k) = \sum_{n=0}^{L-1} \hat{x}_i(n) \cos\left(\frac{\pi}{M}\left(n + \frac{3M+1}{2}\right)k\right),$$

or depending on $$\hat{X}_i(k) = \sum_{n=0}^{L-1} \hat{x}_i(n)\sin\left(\frac{\pi}{M}\left(n+\frac{3M+1}{2}\right)\left(k+\frac{1}{2}\right)\right),$$

or
depending on $$\hat{X}_i(k) = \sum_{n=0}^{L-1} \hat{x}_i(n)\sin\left(\frac{\pi}{M}\left(n+\frac{3M+1}{2}\right)(k+1)\right),$$

wherein $\hat{X}_i(k)$ indicates one of the spectral-domain audio samples of the third or the fourth group of spectral-domain audio samples, and wherein $\hat{x}_i(n)$ indicates a time-domain value.

According to an embodiment, the second encoding module 220 is configured to apply a weight w(n) on a time-domain audio sample $s_i(n)$ of the third group or of the fourth group of the time-domain audio samples according to $$\hat{x}_i(n) = w(n) \cdot s_i(n)$$

to generate the time-domain value $\hat{x}_i(n)$.

In an embodiment, all time-domain audio samples of the second group of the time-domain audio samples overlap with time-domain audio samples of the third group of the time-domain audio samples, or wherein all time-domain audio samples of the first group of the time-domain audio samples overlap with the fourth group of the time-domain audio samples.

Similarly, regarding the decoder of FIG. 1A, in an embodiment, the second decoding module 120 is configured to generate at least one of the third group of time-domain intermediate audio samples and the fourth group of time-domain intermediate audio samples depending on $$cs(a(n+b)(k+c)),$$

wherein cs( ) is cos( ) or sin( ), wherein n indicates a time index of one of the time-domain intermediate audio samples of the third or fourth group of time-domain intermediate audio samples, wherein k indicates a spectral index of one of the spectral-domain audio samples of the third or fourth group of the spectral-domain audio samples,
wherein $-0.1 \leq c \leq 0.1$, or $0.4 \leq c \leq 0.6$, or $0.9 \leq c \leq 1.1$,
wherein $$a = \frac{q}{M},$$

wherein $0.9 \cdot \pi \leq q \leq 1.1 \cdot \pi$,
wherein M indicates a number of spectral-domain audio samples of the third or fourth group of the spectral-domain audio samples,
wherein $$b = \frac{s \cdot M + 1}{2},$$

and
wherein $1.5 \leq s \leq 4.5$.

In an embodiment, the first decoding module 110 is configured to generate at least one of the first group of time-domain intermediate audio samples and the second group of time-domain intermediate audio samples depending on $$cs_1(a(n_1+b_1)(1c_1+c_1)),$$

wherein $cs_1$( ) is cos( ) or sin( ),
wherein n indicates a time index of one of the time-domain intermediate audio samples of the third or the fourth group of time-domain intermediate audio samples,
wherein k indicates a spectral index of one of the spectral-domain audio samples of the first or the second or the third or the fourth group of the spectral-domain audio samples,
wherein $-0.1 \leq c \leq 0.1$, or $0.4 \leq c \leq 0.6$, or $0.9 \leq c \leq 1.1$,
wherein $$a = \frac{q}{M},$$

wherein $0.9 \cdot \pi \leq q \leq 1.1 \cdot \pi$,
wherein M indicates a number of spectral-domain audio samples of the first or the second or the third or the fourth group of the spectral-domain audio samples,
wherein $$b = \frac{s \cdot M + 1}{2},$$

and
wherein $1.5 \leq s \leq 4.5$.

In an embodiment, the first decoding module 110 is configured to generate at least one of the first group of time-domain intermediate audio samples and the second group of time-domain intermediate audio samples depending on $$cs_1(a(n_1+b_1)(k+c_1)),$$

wherein $cs_1$( ) is cos( ) or sin( ),
wherein $n_1$ indicates a time index of one of the time-domain intermediate audio samples of the first or the second group of time-domain intermediate audio samples,
wherein $-0.1 \leq c_1 \leq 0.1$, or $0.4 \leq c_1 \leq 0.6$, or $0.9 \leq c_1 \leq 1.1$,
wherein $$b_1 = \frac{M+1}{2}.$$

According to an embodiment c=0, or c=0.5, or c=1, q=π, and s=3.

Setting s=3 achieves to optimally reduce time domain aliasing, while setting $1.5 \leq s \leq 4.5$ with s≠3 achieves some degree of time domain aliasing reduction, but, in general, not as much reduction as for s=3.

In an embodiment, the second decoding module 120 is configured to generate at least one of the third group of time-domain intermediate audio samples and the fourth group of time-domain intermediate audio samples depending on $$\hat{x}_i'(n) = \frac{2}{M}\sum_{k=0}^{M-1} \hat{X}_i'(k)\cos\left(\frac{\pi}{M}\left(n+\frac{3M+1}{2}\right)\left(k+\frac{1}{2}\right)\right),$$

or
depending on $$\hat{x}'_i(n) = \frac{2}{M} \sum_{k=0}^{M-1} \hat{X}'_i(k) \cos\left(\frac{\pi}{M}\left(n + \frac{3M+1}{2}\right)k\right),$$

or
depending on $$\hat{x}'_i(n) = \frac{2}{M} \sum_{k=0}^{M-1} \hat{X}'_i(k) \sin\left(\frac{\pi}{M}\left(n + \frac{3M+1}{2}\right)\left(k + \frac{1}{2}\right)\right),$$

or
depending on $$\hat{x}'_i(n) = \frac{2}{M} \sum_{k=0}^{M-1} \hat{X}'_i(k) \sin\left(\frac{\pi}{M}\left(n + \frac{3M+1}{2}\right)(k+1)\right),$$

wherein $\hat{X}'_i(k)$ indicates one of the spectral-domain audio samples of the third or the fourth group of the spectral-domain audio samples, and wherein $\hat{x}'_i(n)$ indicates a time-domain value.

According to an embodiment, the second decoding module 120 is configured to apply a weight w(n) on the time-domain value $\hat{x}'_i(n)$ according to $$\hat{s}_i(n) = w(n) \cdot \hat{x}'_i(n)$$

to generate a time-domain intermediate audio sample $\hat{s}_i(n)$ of the third or fourth group of time-domain intermediate audio samples.

Regarding the encoder of FIG. 1B, according to an embodiment, $w_{elt}$ is a first window function, wherein $w_{tr}$ is a second window function, wherein a portion of the second window function $w_{tr}$ is defined according to $$w_{tr}(t) = d\sqrt{1 - w_{elt}(k)^2 - w_{elt}(M+k)^2},$$

wherein M indicates a number of spectral-domain audio samples of the first or the second or the third or the fourth group of spectral-domain audio samples,
wherein k is a number with 0≤k<M,
wherein d is a real number,
wherein $$t = \frac{L}{2} + k,$$

or wherein $$t = \frac{L}{2} - 1 - k.$$

L indicates a number of samples of the third group or of the fourth group of time-domain audio samples.

The third group of the time-domain audio samples comprises audio samples of the second group of the time-domain audio samples, and wherein the second encoding module 220 is configured to apply the first window function $w_{elt}$ on the fourth group of time-domain audio samples, and wherein the second encoding module 220 is configured to apply the second window function $w_{tr}$ on the third group of time-domain audio samples. Or, the fourth group of the time-domain audio samples comprises audio samples of the first group of the time-domain audio samples, and wherein the second encoding module 220 is configured to apply the first window function $w_{elt}$ on the third group of time-domain audio samples, and wherein the second encoding module 220 is configured to the second window function $w_{tr}$ on the fourth group of time-domain audio samples.

According to an embodiment, $w_{tr1}$ is a third window function, wherein a portion of the third window function is defined according to $$w_{tr1}(t_1) = d\sqrt{1 - w_{elt}(k)^2 - w_{elt}(M+k)^2},$$

wherein $$t_1 = \frac{N}{2} + k,$$

or wherein $$t_1 = \frac{N}{2} - 1 - k,$$

wherein N indicates a number of time-domain audio samples of the first group or of the second group of time-domain audio samples.

The third group of the time-domain audio samples comprises audio samples of the second group of the time-domain audio samples, and wherein the second encoding module (220) is configured to apply the third window function $w_{tr1}$ on the second group of time-domain audio samples. Or, the fourth group of the time-domain audio samples comprises audio samples of the first group of the time-domain audio samples, and wherein the second encoding module (220) is configured to the third window function $w_{tr1}$ on the first group of time-domain audio samples.

In an embodiment, the first window function $w_{elt}$ is defined according to $$w_{elt}(t) = w_{3\text{-}term}(t) - \sum_{k=1}^{K} c_k \cos\left(8k\pi \cdot \frac{t+0.5}{L}\right),$$

wherein $$w_{3\text{-}term}(t) = \sum_{k=0}^{2} b_k \cos\left(2k\pi \cdot \frac{t+0.5}{L}\right),$$

wherein $b_0$, $b_1$ and $b_2$ are real numbers.
wherein 0≤t<L, and wherein K is a positive integer and wherein $c_k$ indicates a real number.

According to an embodiment, K=3;

$$0.3 \leq b_0 \leq 0.4;\ -0.6 \leq b_1 \leq -0.4;\ 0.01 \leq b_2 \leq 0.2;$$

$$0.001 \leq c_1 \leq 0.03;\ 0.000001 \leq c_2 \leq 0.0005;$$
$$0.000001 \leq c_3 \leq 0.00002.$$

According to an embodiment, $$0.8 \leq d \leq 1.25.$$

In a particular embodiment, $$d = \frac{4096}{4061}.$$

According to an alternative embodiment, d=1.

Similarly, regarding the decoder of FIG. 1A, according to an embodiment, $w_{elt}$ is a first window function, wherein $w_{tr}$ is a second window function, wherein a portion of the second window function is defined according to $$w_{tr}(t) = d\sqrt{1 - w_{elt}(k)^2 - w_{elt}(M+k)^2},$$

wherein M indicates a number of spectral-domain audio samples of the first or the second or the third or the fourth group of the spectral-domain audio samples, wherein k is a number with 0≤k<M, wherein d is a real number, wherein $$t = \frac{L}{2} + k,$$

or wherein $$t = \frac{L}{2} - 1 - k.$$

L indicates a number of samples of the third group or of the fourth group of time-domain intermediate audio samples.

The overlap-adder 130 is configured to overlap-add at least the second group of time-domain intermediate audio samples with the third group of time-domain intermediate audio samples, wherein the second decoding module 120 is configured to generate the fourth group of time-domain intermediate audio samples depending on the first window function $w_{elt}$, and wherein the second decoding module 120 is configured to generate the third group of time-domain intermediate audio samples depending on the second window function $w_{tr}$. Or, the overlap-adder 130 is configured to overlap-add at least the fourth group of time-domain intermediate audio samples with the first group of time-domain intermediate audio samples, wherein the second decoding module 120 is configured to generate the third group of time-domain intermediate audio samples depending on the first window function $w_{elt}$, and wherein the second decoding module 120 is configured to generate the fourth group of time-domain intermediate audio samples depending on the second window function $w_{tr}$.

According to an embodiment, wherein $w_{tr1}$ is a third window function, wherein a portion of the third window function is defined according to $$w_{tr1}(t_1) = d\sqrt{1 - w_{elt}(k)^2 - w_{elt}(M+k)^2},$$

wherein $$t_1 = \frac{N}{2} + k,$$

or wherein $$t_1 = \frac{N}{2} - 1 - k,$$

wherein N indicates a number of time-domain intermediate audio samples of the first group or of the second group of time-domain intermediate audio samples.

The overlap-adder is configured to overlap-add at least the second group of time-domain intermediate audio samples with the third group of time-domain intermediate audio samples, and wherein the first decoding module (110) is configured to generate the second group of time-domain intermediate audio samples depending on the third window function $w_{tr1}$. The overlap-adder is configured to overlap-add at least the fourth group of time-domain intermediate audio samples with the first group of time-domain intermediate audio samples, and wherein the first decoding module (110) is configured to generate the first group of time-domain intermediate audio samples depending on the third window function $w_{tr1}$.

In an embodiment, the first window function $w_{elt}$ is defined according to $$w_{elt}(t) = w_{3\text{-}term}(t) - \sum_{k=1}^{K} c_k \cos\left(8k\pi \cdot \frac{t+0.5}{L}\right),$$

wherein $$w_{3\text{-}term}(t) = \sum_{k=0}^{2} b_k \cos\left(2k\pi \cdot \frac{t+0.5}{L}\right),$$

wherein $b_0$, $b_1$ and $b_2$ are real numbers, wherein 0≤t<L, and wherein K is a positive integer, and wherein $c_k$ indicates a real number.

According to an embodiment, K=3;

0.3≤$b_0$≤0.4; −0.6≤$b_1$≤−0.4; 0.01≤$b_2$≤0.2;

0.001≤$c_1$≤0.03; 0.000001≤$c_2$≤0.0005; 0.000001≤$c_3$≤0.00002.

In an embodiment, 0.8≤d≤1.25.

According to an embodiment, $$d = \frac{4061}{4096}.$$

In an alternative embodiment, d=1.

Regarding the system of FIG. 1c, according to an embodiment, the decoder 320 of the system uses a transition window function $$w_{tr}(t) = d\sqrt{1 - w_{elt}(k)^2 - w_{elt}(M+k)^2} \text{ with } \frac{4061}{4097} \leq d \leq \frac{4061}{4095},$$

and
the encoder 310 of the system uses a transition window function $$w_{tr}(t) = d\sqrt{1 - w_{elt}(k)^2 - w_{elt}(M+k)^2} \text{ with } \frac{4095}{4061} \leq d \leq \frac{4097}{4061}.$$

According to a particular embodiment, the decoder 320 of the system uses a transition window function $$w_{tr}(t) = d\sqrt{1 - w_{elt}(k)^2 - w_{elt}(M+k)^2} \text{ with } d = \frac{4061}{4096},$$

and
the encoder 310 of the system uses a transition window function $$w_{tr}(t) = d\sqrt{1 - w_{elt}(k)^2 - w_{elt}(M+k)^2} \text{ with } d = \frac{4096}{4061}.$$

According to an embodiment, the decoder of FIG. 1A is configured to receive decoding information indicating whether a portion of the plurality of spectral-domain audio samples is to be decoded by the first decoding module 110 or by the second decoding module 120. The decoder is configured to decode said portion of the plurality of spectral-domain audio samples by employing either the first decoding module 110 or the second decoding module 120 depending on the decoding information to obtain the first or the second or the third or the fourth group of time-domain intermediate audio samples.

In an embodiment, the decoder is configured to receive a first bit and a second bit, wherein the first bit and the second bit together have a first bit value combination, or a second bit value combination being different from the first bit value combination, or a third bit value combination being different from the first and the second bit value combination, or a fourth bit value combination being different from the first and the second and the third bit value combination. Moreover, the decoder is configured to decode a portion of the plurality of spectral-domain audio samples depending on a Kaiser-Bessel function by employing the first decoding module 110 to obtain the first or the second group of time-domain intermediate audio samples, if the first bit and the second bit together have the first bit value combination. Furthermore, the decoder is configured to decode a portion of the plurality of spectral-domain audio samples depending on a sine function or a cosine function by employing the first decoding module 110 to obtain the first or the second group of time-domain intermediate audio samples, if the first bit and the second bit together have the second bit value combination. The decoder is configured to decode a portion of the plurality of spectral-domain audio samples by employing the first decoding module 110 to obtain the first or the second group of time-domain intermediate audio samples, if the first bit and the second bit together have the third bit value combination. Moreover, the decoder is configured to decode said portion of the plurality of spectral-domain audio samples by employing the second decoding module 120 to obtain the third or the fourth group of time-domain intermediate audio samples, if the first bit and the second bit together have the fourth bit value combination.

Particular embodiments are now described in more detail.

Embodiments provide a modified extended lapped transform, which is described in the following.

To correct the perfect reconstruction issue in FIG. 5 (a) by achieving complete TDA cancelation (TDAC) also in the transitory 3-part OLA regions, one transform class should be redefined such that its TDA symmetries complement those of the other, e.g. as in FIG. 5 (b), and FIG. 5 (c).

In particular, FIG. 5 illustrates the switch from MLT to ELT with transition transforms, wherein FIG. 5 (a) shows incorrect non-perfect reconstruction, wherein FIG. 5 (b) depicts desired perfect reconstruction, and wherein FIG. 5 (c) illustrates MLT via desired ELT.

Figure 6:
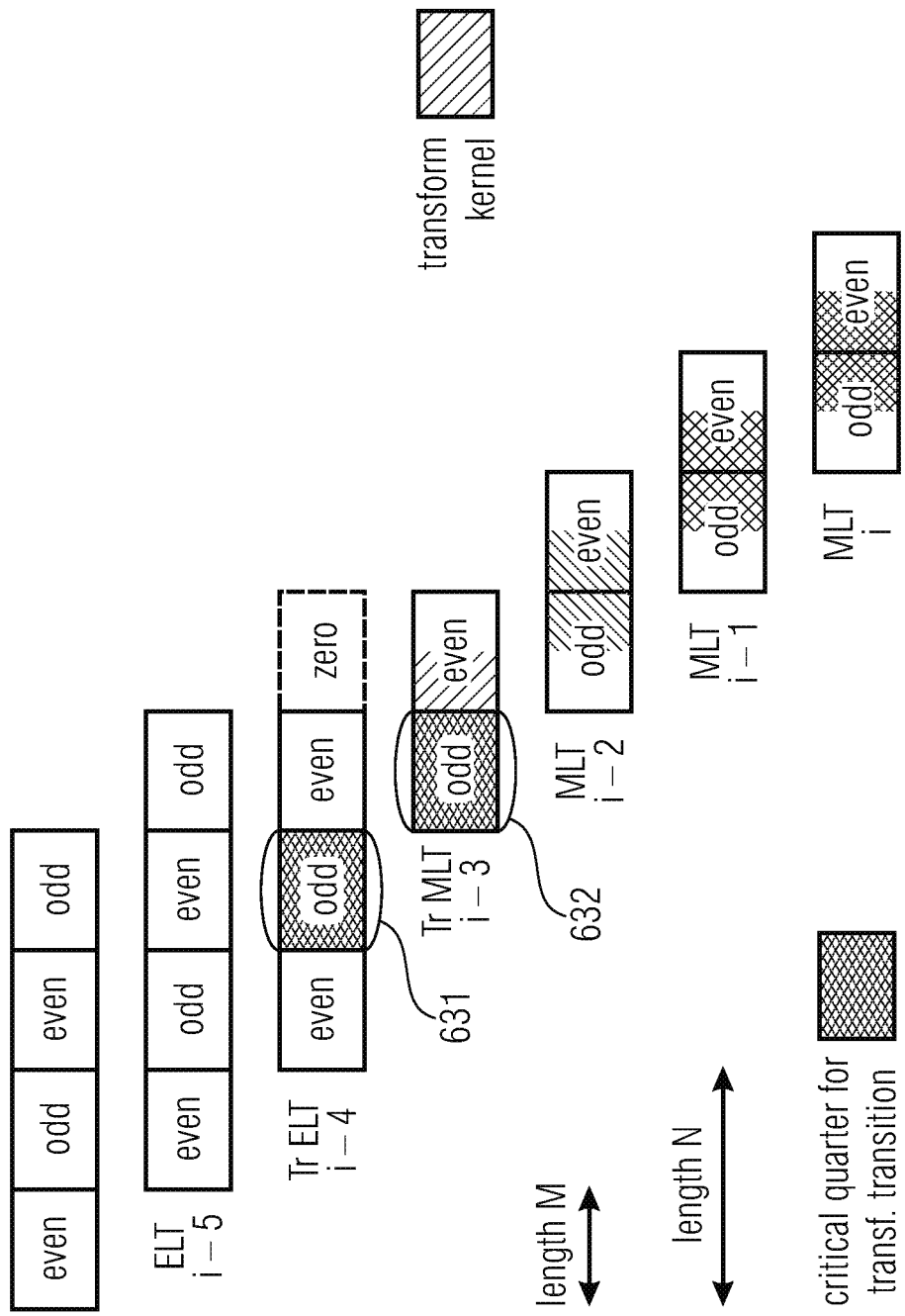
FIG. 6 illustrates the switch from ELT to MLT with transition transforms according to embodiments.

Moreover, similarly, FIG. 6 illustrates the switch from ELT to MLT with transition transforms according to embodiments.

Since it is desirable to avoid changes to existing MDCT and MDST implementations, focus is laid on the ELT. Moreover, to easily obtain perfect reconstruction transition and steady-state windows for all transforms, corresponding analytic expressions are desirable.

At first, modifications for the adaptation of the overlap ratio according to embodiments is described.

To give the ELT the desired TDA compatibility with the MLT, the temporal phase shift is altered in its base functions:

$$\hat{X}_i(k) = \sum_{n=0}^{L-1} x_i(n) \, cs\left(\frac{\pi}{M}\left(n + \frac{3M+1}{2}\right)\left(k + \frac{1}{2}\right)\right), \quad (4)$$

wherein k, cs are defined as for the formula (2) and the inverse ELT (1), using $\hat{X}'_i$, adapted accordingly. (as above cs( ) may be cos( ) or sin( )).

As explained above, e.g., by modifying formulae (2c)-(2j) by setting N=L (e.g., for the analysis formulae (2c), (2e), (2g) and (2i)) and by setting 0≤n<L (e.g., for the synthesis formulae (2d), (20, (2h) and (2j)), ELT formulae and inverse ELT formulae are obtained.

Applying the concept of formula (4) on these ELT and inverse ELT formulae results in the formulae (4a)-(4h) that represent new, inventive modified extended lapped transform (MELT) embodiments. The particular embodiments of formulae (4a)-(4h) realize lapped transforms with 75% overlap ratio:

Forward cosine-modulated MELT, type 4, now referred to as MECT-IV:

$$\hat{X}_i(k) = \sum_{n=0}^{L-1} \hat{x}_i(n) \cos\left(\frac{\pi}{M}\left(n + \frac{3M+1}{2}\right)\left(k + \frac{1}{2}\right)\right) \quad (4a)$$

Inverse cosine-modulated MELT, type 4, now referred to as IMECT-IV, n<L:

$$\hat{x}'_i(n) = \frac{2}{M}\sum_{k=0}^{M-1} \hat{X}'_i(k) \cos\left(\frac{\pi}{M}\left(n + \frac{3M+1}{2}\right)\left(k + \frac{1}{2}\right)\right) \quad (4b)$$

Forward cosine-modulated MELT, type 2, now referred to as MECT-II:

$$\hat{X}_i(k) = \sum_{n=0}^{L-1} \hat{x}_i(n) \cos\left(\frac{\pi}{M}\left(n + \frac{3M+1}{2}\right)k\right) \quad (4c)$$

Inverse cosine-modulated MELT, type 2, now referred to as IMECT-II, n<L:

$$\hat{x}'_i(n) = \frac{2}{M}\sum_{k=0}^{M-1} \hat{X}'_i(k) \cos\left(\frac{\pi}{M}\left(n + \frac{3M+1}{2}\right)k\right) \quad (4d)$$

Forward sine-modulated MELT, type 4, now referred to as MEST-IV:

$$\hat{X}_i(k) = \sum_{n=0}^{L-1} \hat{x}_i(n) \sin\left(\frac{\pi}{M}\left(n + \frac{3M+1}{2}\right)\left(k + \frac{1}{2}\right)\right) \quad (4e)$$

Inverse sine-modulated MELT, type 4, now referred to as IMEST-IV, n<L:

$$\hat{x}'_i(n) = \frac{2}{M} \sum_{k=0}^{M-1} \hat{X}'_i(k) \sin\left(\frac{\pi}{M}\left(n + \frac{3M+1}{2}\right)\left(k + \frac{1}{2}\right)\right) \quad (4f)$$

Forward sine-modulated MELT, type 2, now referred to as MEST-II:

$$\hat{X}_i(k) = \sum_{n=0}^{L-1} \hat{x}_i(n) \sin\left(\frac{\pi}{M}\left(n + \frac{3M+1}{2}\right)(k+1)\right) \quad (4g)$$

Inverse sine-modulated MELT, type 2, now referred to as IMEST-II, n<L:

$$\hat{x}'_i(n) = \frac{2}{M} \sum_{k=0}^{M-1} \hat{X}'_i(k) \sin\left(\frac{\pi}{M}\left(n + \frac{3M+1}{2}\right)(k+1)\right) \quad (4h)$$

Some embodiments provide a particular suitable window design for transitions from the MLT to the ELT and from the ELT to the MLT, which are described in the following.

It can be shown that, as FIG. 5 indicates, the 4 quarters of the transitory MLT and ELT windows are based on the respective steady-state weightings, with the first and/or fourth quarter set to zero and the critical quarters described by $$w_{tr}(t) = \sqrt{1 - w_{elt}(k)^2 - w_{elt}(M+k)^2}, \quad (5)$$

where $$t = \frac{L}{2} + k$$

for switching as in FIG. 5 or $$t = \frac{L}{2} - 1 - k$$

for the reverse ELT-to-MLT transitions. Using formula (5) to acquire the critical quarters 511, 512, 521, 522 (shown in FIG. 5) and the critical quarters 631, 632 (shown in FIG. 6) for both the ELT and MLT transition weightings completes the definition of the transitory windows, leaving just the choice of the steady-state functions.

A complete definition of the transition window for extended lapped transforms of formulae (5) would, for example, be defined as the (M)ELT window in equation (5a) for transitions from 50 to 75% overlap ratio:

$$w_{tr}(n) = \begin{cases} 0, & 0 \leq n < M \\ w_{elt}(n), & M \leq n < N \\ d\sqrt{1 - w_{elt}(k)^2 - w_{elt}(M+k)^2}, & N \leq n < 3M \\ w_{elt}(n), & 3M \leq n < L \end{cases} \quad (5a)$$

For a (M)ELT window for transitions from 75 to 50% overlap ratio the definition would be the definition of equation (5a), but $w_{tr}$ would be temporally reversed.

In equation (5a), d may, e.g., be a constant, for example, a real number.

In equations (5) and (5a) $w_{elt}(n)$ may, e.g., indicate a window for the extended lapped transform, for example, an extended lapped transform window of the state of the art (see the family of windows defined by formulae (16)-(19) in reference [11]: S. Malvar, "Modulated QMF Filter Banks with Perfect Reconstruction," Electronics Letters, vol. 26, no. 13, pp. 906-907, June 1990).

Or, in equations (5) and (5a) $w_{elt}(n)$ may, e.g., be the new, inventive, extended lapped transform window as defined in formula (8) below.

In equations (5) and (5a), L is a number, e.g., indicating the size of an ELT window. N is a number indicating the size of an MLT window. M is a number wherein, for example, $$M = \frac{N}{2}.$$

In formula (5a) n is a number, e.g., in the range $0 \leq n < L$. k is a number.

In formulae (5) and (5a), k is defined in the range $0 \leq k < M$.

In the following, steady-state perfect reconstruction lapped-transform windows according to embodiments are described with reference to FIG. 7.

Figure 7:
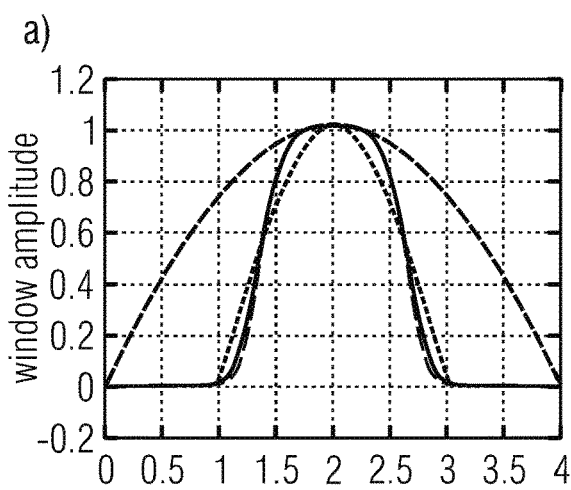
FIG. 7 illustrates perfect reconstruction window designs, in FIG. 7 (a) for MLT, in FIG. 7 (b) for ELT, and in FIG. 7 (c) for transitions according to embodiments.
Figure 7:
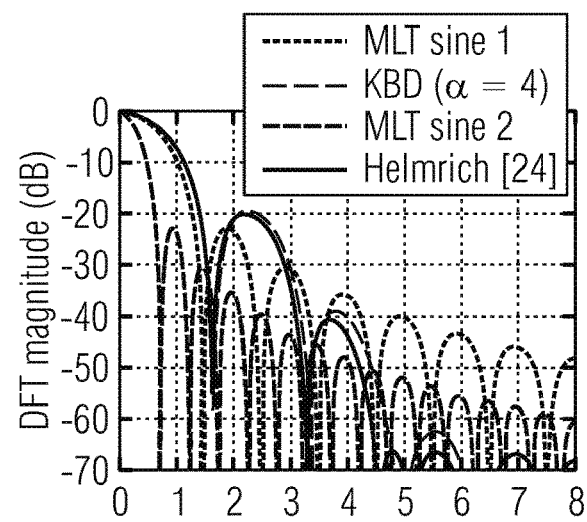
Figure 7:
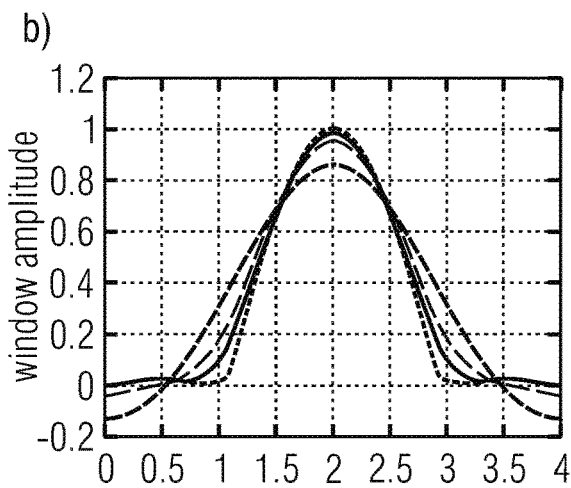
Figure 7:
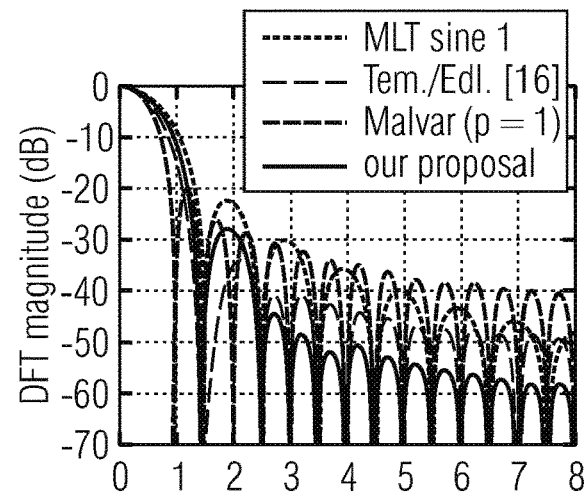
Figure 7:
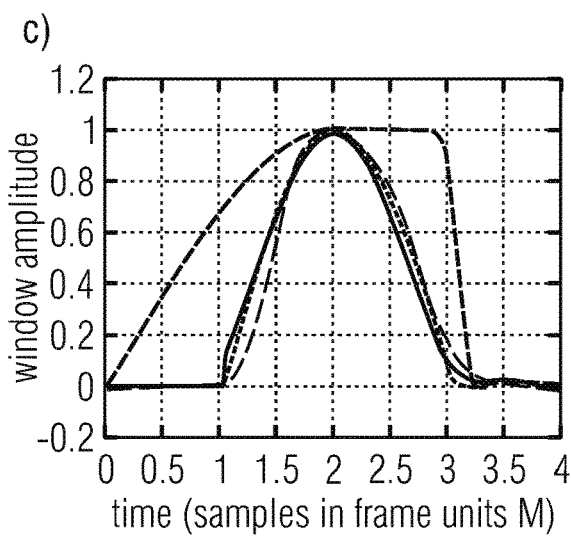
Figure 7:
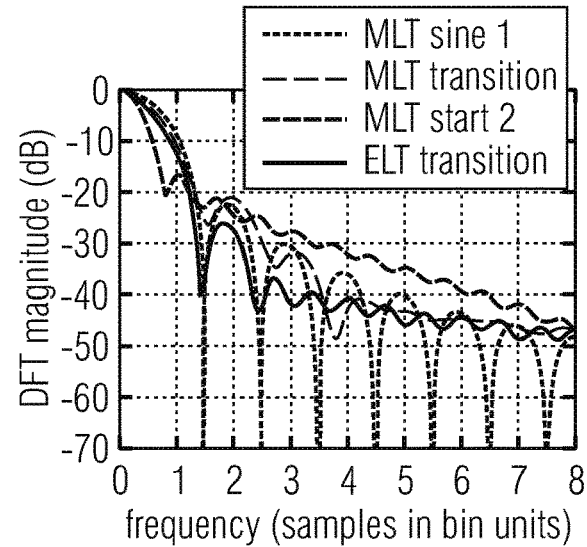

FIG. 7 illustrates perfect reconstruction window designs, in FIG. 7 (a) for MLT, in FIG. 7 (b) for ELT, and in FIG. 7 (c) for transitions according to embodiments.

Several power-complementary (PC) MLT windows enforcing the so-called Princen-Bradley condition for perfect reconstruction (see [2]) have been documented. FIG. 7 (a) depicts the shapes and corresponding oversampled transfer functions of the windows used in MPEG audio codecs (see [5], [7]), the MLT sine (see [3], [11]) and the Kaiser-Bessel derived (KBD) windows (see [23]). Also shown is the power-complementary function in [24], whose shape is similar to that of the KBD window but which, as can be noted, exhibits lower first (near-field) side-lobe levels. Finally, a sine window for a doubled frame length, as employed in case of dual-rate SBR, serves as a reference and illustrates that longer windows can notably reduce both pass-band width and stop-band level.

Ideally, an ELT window, subject to the perfect reconstruction constraints of formula (3), should exhibit a frequency response comparable to that of the double-length sine window, but it can be observed that, due to the perfect reconstruction restrictions, main-lobe width can only be minimized by allowing less side-lobe attenuation. Malvar's window [11] with p=1, for example, was found to have the lowest possible main-lobe width of all ELT designs but also undesirably high stop-band levels, as shown in FIG. 7 (b). Its temporal borders are notably discontinuous (since samples beyond the window extension are assumed to equal zero), resulting in a side-lobe decay of only −6 dB/octave (see [24]) and framing artifacts in our experiments. Temerinac and Edler (see [16]) presented a recursive design approach, which they used to obtain the ELT window also shown in FIG. 7 (it should be noted that the value −0.038411 is missing in column "L=4N" of their table 1). This window, which can be closely approximated by Malvar's equations with p=0.14, provides more but still quite weak stop-band attenuation.

It is worth noting that, for p=1, Malvar's formulation can be modified to a notation similar to that for a Hann window:

$$w_{p=1}(t) = a_0 - 0.5\cos\left(2\pi \cdot \frac{t+0.5}{L}\right), L = 4M, \tag{6}$$

with $0 \leq t < L$ denoting the temporal samples of the window and $a_0 = 2^{-3/2}$ chosen to enforce the perfect reconstruction constraints (see [11], [12], [13], [14]). Intuitively, a function with more side-lobe attenuation such as $$w_{3\text{-}term}(t) = \sum_{k=0}^{2} b_k \cos\left(2k\pi \cdot \frac{t+0.5}{L}\right), b_1 = -0.5, \tag{7}$$

with $b_2 > 0$, which can be used to derive Blackman's window (see [24]), would seem applicable as well. Unfortunately, it can be shown that perfect reconstruction cannot be achieved with such a window class regardless of the value of $b_0$.

However, according to embodiments, more terms are added.

According to embodiments, $w_{elt}(t)$ is provided:

$$w_{elt}(t) = w_{3\text{-}term}(t) - \sum_{k=1}^{K} c_k \cos\left(8k\pi \cdot \frac{t+0.5}{L}\right), \tag{8}$$

with $b_k$ as above, the resulting shape for any choice of $b_2 \lesssim 3/8$ can be corrected so that perfect reconstruction is approached arbitrarily closely. Targeting, in particular, a low stop-band level and imposing, in addition to the perfect reconstruction conditions, the restriction of an isotone left-half and, hence, antitone right-half window slope, perfect reconstruction can be approximated with an error below $4 \cdot 10^{-6}$ by using K=3, $b_2=0.176758$ and, dependent on these values, $b_0=0.3303$ and $$c_1=566\ 3,\ c_2=0.0004243,\ c_3=0.00001526, \tag{9}$$

This ELT window function, depicted in FIG. 7 (b), is less discontinuous at its borders than the proposals of [11] and [16] and, as a result, allows the same level of side-lobe rejection as the double-length sine window of FIG. 7 (a). Concurrently, its main lobe remains narrower than that of the MLT sine window. Interestingly, it also resembles the latter window in shape.

FIG. 7 (c) illustrates the spectral and temporal shapes of the MDCT/MDST and ELT transition windows, based on the power-complementary design of [24] and $w_{elt}$ using formulae (8) and (9), and, for comparison, the double-length start window of AAC.

Embodiments employ a generalized biorthogonal ELT transition windowing.

Equation (5) specified how the critical quarter of a length-4M extended lapped transform (ELT) window for transitions from either MLT to ELT coding or ELT to MLT coding can be determined.

In embodiments, equation (5) is adjusted by multiplication with a constant d (see, as an example, formula (5a)) as follows:

$$w_{tr}(t) = d\sqrt{1 - w_{elt}(k)^2 - w_{elt}(M+k)^2}, \tag{10}$$

with k=0, 1, ..., M−1 and t as defined earlier using both k and L. This allows for a so-called biorthogonal approach with regard to switched-ratio transition windowing, where different critical window quarters may be employed for the analysis and synthesis transforms. More specifically, to achieve TDAC and thus perfect reconstruction, $w_{tr}(t)$ may use d=d' on the analysis (encoder) side, and on the synthesis (decoder) side, $w_{tr}(t)$ may apply the inverse, i.e. d=1/d'. Given a particular steady-state ELT window welt, advantageously the one derived via equations (8) and (9) herein, d' may be determined based on both of the following two considerations.

For determining d', equation (10) is chosen to produce, during all ratio-switching transitions, both optimal spectral attributes of the analysis windows and maximal output attenuation upon decoding.

For achieving optimal spectral properties of the analysis windowing, some embodiments achieve the smallest possible amount of main-lobe width and the strongest possible amount of side-lobe attenuation in the analysis windows in order to maximize the spectral compaction especially of stationary, harmonic audio signals. Given that the steady state $w_{elt}$ window has already been optimized for this purpose, it can be shown that this can be achieved in $w_{tr}$, by avoiding discontinuities at the borders between the four window quarters. More precisely, by choosing d' such that the maximum value of $w_{tr}(t)$ in (10) equals the maximum value of $w_{elt}(n)$ with n=0, 1, ..., L−1, jumps in the transitory window shape are avoided completely.

Hence, in an embodiment, d' shall reflect the ratio between said two maxima, which in case of formulae (8) and (9) can be approximated by $$d'=4096/4061 \rightarrow 1/d'=4061/4096.$$

According to an embodiment, maximal output attenuation upon synthesis windowing is achieved. To suppress spectral-domain distortion in audio coding, introduced by quantization of the transform bins, as much as possible, it may be useful to attenuate the output waveform during the synthesis windowing process prior to OLA processing as much as possible. However, due to the perfect reconstruction/TDAC requirements, strong attenuation by the window is not feasible since this approach would render the complementary analysis window detrimental in terms of efficiency. It can be shown that a good trade-off between good window properties and acceptable decoder-side output attenuation can be obtained by again choosing $$1/d'=4061/4096 \rightarrow d'=4096/4061.$$

In other words, both optimization approaches for $w_{tr}$ may lead to the same value of d'.

Examples for transforms have already been provided, for example, the state of the art transforms of formulae (2a)-(2j) or the new, inventive transforms of formulae (4a)-(4h).

An example for a transition window of equation (10) according to an embodiment is, e.g., provided above by equation (5a).

Figure 10:
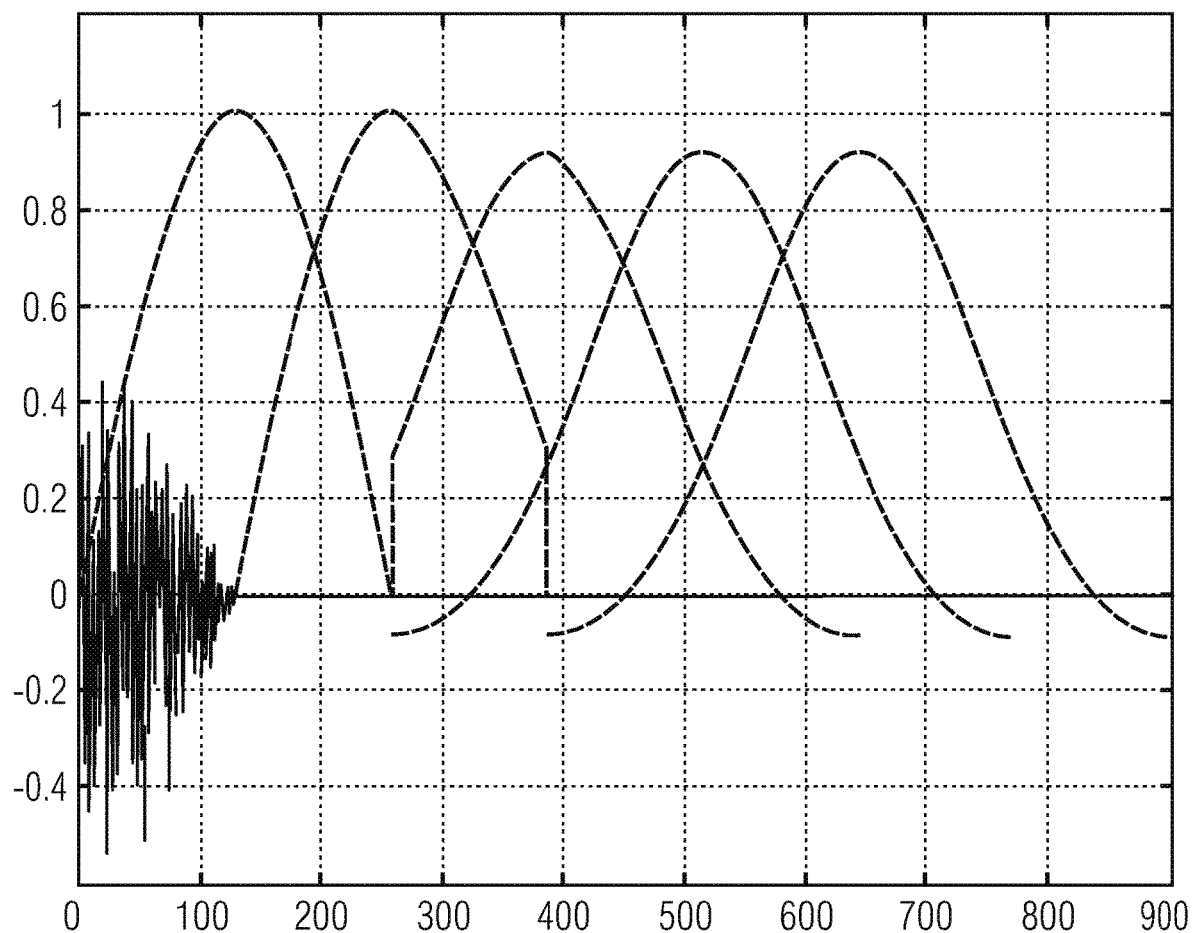
FIG. 10 illustrates a plurality of analysis windows according to an embodiment.

FIG. 10 illustrates corresponding analysis windows according to an embodiments as described above.

Figure 11:
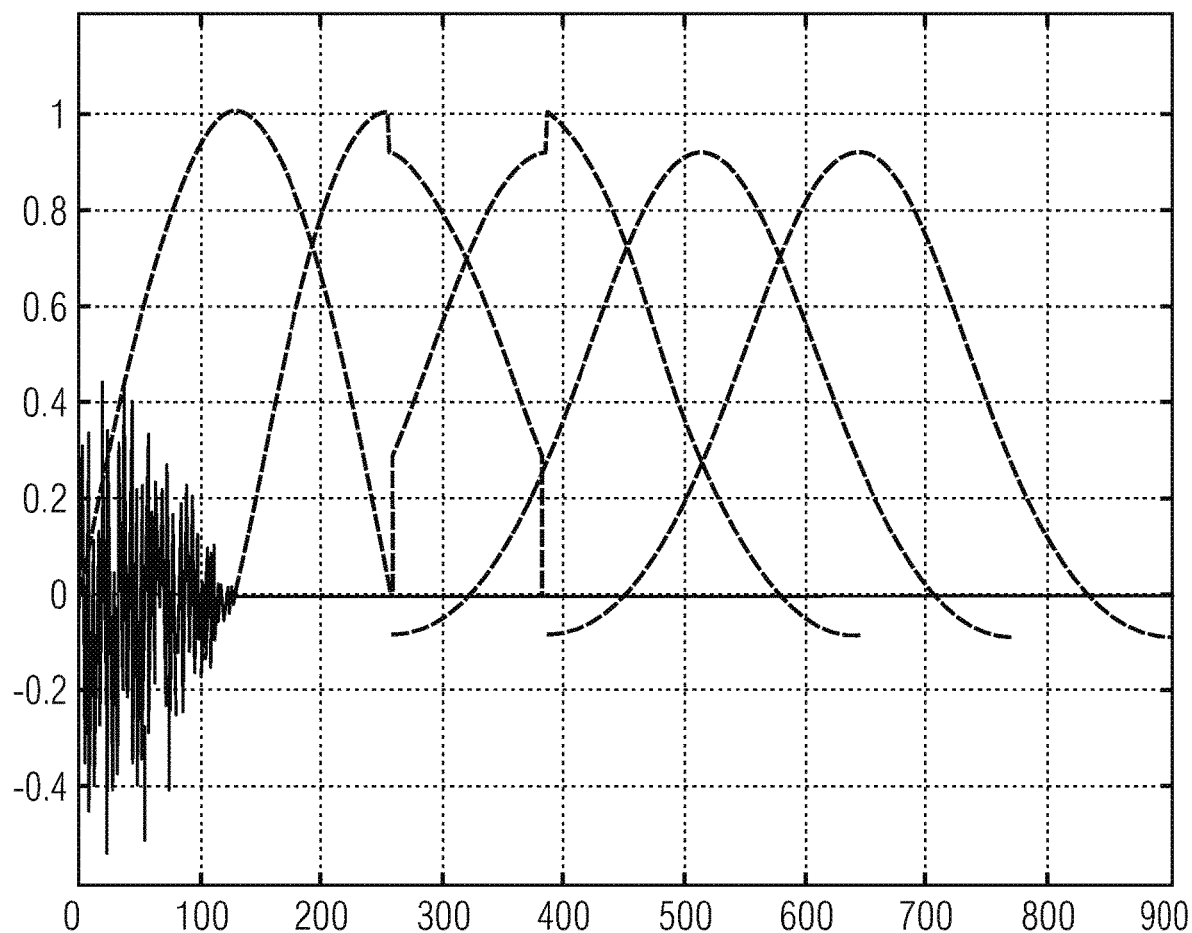
FIG. 11 illustrates a plurality of synthesis windows according to an embodiment.

Likewise, FIG. 11 illustrates corresponding synthesis windows according to an embodiments as described above.

In the following, input-adaptive overlap ratio selection is described.

The switched coding approach provided above, for example, using the windows provided above, may be integrated into a transform codec. This inter alia verifies its anticipated subjective advantage on tonal input. For reasons of brevity, only high-level aspects shall be described.

The specification and synthesis transforms of the decoder are considered.

An extra bit, signaling application of the ELT, is received per channel and/or frame in which long transformation (no block switching) has been utilized by the encoder. In case of MPEG coding the window shape bit may be re-used for this purpose (for example, "0" means: MLT using window of reference [23] or of reference [24] is employed, for example, "1" means: the ELT concepts of embodiments are employed).

Based on this bit and the window sequence (transform length and type), both for the current and last frame, the decoder can then deduce and apply the inverse lapped transform using the correct overlap ratio and window, as described above.

For example, an extra bit may indicate, whether or not the encoder may switch between the MLT and the ELT. If the extra bit indicates that the encoder may switch between the MLT and the ELT, the window shape bit is re-used for indicating whether the MLT or the ELT is used, e.g., for the current frame.

Now, the ELT detector and the analysis transforms of the encoder are considered.

The encoder, applying and transmitting the per-channel/frame MLT/ELT choice such that encoder and decoder are synchronized, can detect stationary, harmonic frames by computing a linear predictive coding (LPC, e.g. of order 16) residual of the input, as done in speech coders (see [25]).

The encoder, e.g., derives therefrom a temporal flatness $f_t$ as the ratio between the next and current frame's residual energy, with stationarity specified as $$f_t < \frac{15}{2}.$$

Moreover, the encoder, e.g., derives therefrom a spectral flatness fs, also known as Wiener entropy, obtained from the DFT power spectrum of the current and next frame's concatenated residual, with high tonality indicated by fs<⅛.

In the following, further aspects of the Modified Extended Lapped Transform (MELT) according to some embodiments are provided.

In particular, a detailed description of the implementational aspects of advantageous embodiments of integrating the switchable MELT into the MPEG-H 3D Audio core-coding system are provided.

At first, the decoder, its specification and the synthesis transform according to some embodiments is described.

A global one-bit syntax element, e.g. called use_melt_extension, is introduced into the stream configuration of the single-channel element (SCE), channel-pair element (CPE) and, optionally, low-frequency enhancement element (LFE) syntax specifications. This can be achieved by placing use_melt_extension into the mpegh3DACoreConfig( ) table of the standard text. When a given bit-stream features use_melt_extension=0, the core decoder operates in the conventional MPEG-H manner as specified in the state of the art.

This means that only MDCTs (or MDSTs, in case of activated kernel switching in a frame/channel, see [28], in particular see the end of section 4, Discrete Multi-Channel Coding Tool, of [28]) with 50% transform overlap ratio are allowed, and that there are no new restrictions regarding the window_sequence (only long, long start, eight short, long stop, stop-start) and window_shape (sine or KBD). (In [28], an adaptive spectrum-time converter switches between transform kernels of a first group of transform kernels with one or more transform kernels having different symmetries at sides of a kernel, and a second group of transform kernels comprising one or more transform kernels having the same symmetries at sides of a transform kernel).

However, when use_melt_extension=1 in the bit-stream, the meaning of the per-frame one-bit window_shape element for frames/channels with "only long" window_sequence may be modified, as described earlier (0: MDCT/MDST using the existing KBD window function with α=4 (see [23]), 1: MELT with the welt window function proposed herein).

A schematic block diagram of a decoder 2 for decoding an encoded audio signal 4 is shown. The decoder comprises an adaptive spectrum-time converter 6 and an overlap-add-processor 8. The adaptive spectrum-time converter converts successive blocks of spectral values 4' into successive blocks of time values 10, e.g. via a frequency-to-time transform. Furthermore, the adaptive spectrum-time converter 6 receives a control information 12 and switches, in response to the control information 12, between transform kernels of a first group of transform kernels comprising one or more transform kernels having different symmetries at sides of a kernel, and a second group of transform kernels comprising one or more transform kernels having the same symmetries at sides of a transform kernel. Moreover, the overlap-add-processor 8 overlaps and adds the successive blocks of time values 10 to obtain decoded audio values 14, which may be a decoded audio signal.

There are three reasons for this design. First, since there is only one desired window function for the steady-state MELT, and no ELT window derived from the Kaiser-Bessel function exists in the prior art, the window_shape bit for "only long" frames/channels and activated MELT can be considered obsolete and, thus, unnecessary since its value (when interpreted as defined in the state of the art) would need to be ignored.

Second, the usage of MELT coding in a frame/channel which is not "only long" is not supported—a sequence of eight short MELTs instead of MDCTs/MDSTs, for example, is feasible but greatly complicates the block switching technique and is counterproductive from a perceptual viewpoint, since the objective of "eight short" sequences is maximized temporal coding resolution).

Third, it was discovered by the inventors that an "only long" frame/channel for which the sine window yields better coding quality than the KBD window, on a given input signal portion, benefits even more from the proposed ELT design when activated on the same signal portion. In other words, MDCTs/MDSTs with a "sine" window_shape are matched or even outperformed subjectively by the ELT proposal on waveform segments where they, in turn, notably outperform MDCT/MDST coding with a "KBD" window_shape. Thus, by re-utilizing and re-specifying the existing window_shape bit when window_sequence is "only long" and use_melt_extension=1, redundancy is avoided entirely, and no further per-frame bits are required for signaling whether the proposed switch to or from the MELT is used in the given frame/channel.

For bit-streams with use_melt_extension=1, frequency-domain (FD) MPEG-H core decoding is performed as usual, except for the inverse transformation and overlap-and-add (OLA) processes, which are conducted as follows.

For frames/channels with window_sequence="only long" and window_shape=0 (KBD), or with window_sequence≠"only long" and any window_shape, frame-wise inverse transformation, synthesis windowing, and OLA are carried out as specified in the MPEG-H 3D Audio standard, i.e. ISO/IEC 23008-3:2015, subclause 5.5.3.5.1, and ISO/IEC 23003-3:2012, subclause 7.9.

However, to account for the increased windowing latency of the switchable MELT, the output of the per-frame waveform segment resulting from the OLA step is delayed by one frame. This means e.g. that when the given frame is the first frame in the stream, a zero-waveform is output.

For frames/channels with window_sequence="only long" and window_shape=1 (previously: sine), the inverse transformation is performed using the formula for the MELT proposed herein, which is equivalent to the equation given in ISO/IEC 23003-3:2012, subclause 7.9.3.1 except that 0 n<2N and $n_0=(3N/2+1)/2$. Note that the modifications for kernel switching, namely using the sin( ) instead of the cos( ) function and $k_0=0$ (for type-II cosine modulation) or $k_0=1$ (for type-II sine modulation) are also possible with the MELT (TDA compatible sequencing assumed). The synthesis windowing is then applied as described in sections 2 and 3 earlier, with transition windows detected as tabulated in Table 3, using the window_shape and window_sequence values, both for the current and previous frame, for the given channel. Table 3 also indicates the set of all allowed sequence/shape transitions.

It should be noted that the inverse MELT (or original ELT, for that matter) can be implemented using existing MDCT and MDST realizations which, in turn, apply fast DCT/DST implementations based on Fast Fourier Transformation (FFT). More specifically, a sine-modulated inverse MELT can be realized by negating every odd-indexed spectral sample (where indexing begins at zero), followed by the application of an inverse MDCT-IV, and completed by temporally repeating the resulting 2N output samples with negated signs.

Likewise, the cosine-modulated inverse MELT can be obtained by negating every even-indexed spectral sample, followed by the execution of an inverse MDST-IV, and, finally, the same temporal repetition with negated signs. Similar realizations can be achieved for type-II cosine- or sine-modulated inverse MELTs as utilized in case of kernel switching, as well as for forward (analysis) transformation for all of the above MELT configurations.

Therefore, the only complexity increase caused by MELT processing in comparison with traditional MDCT/MDST algorithms is due to the necessity of negated temporal repetition (expansion in the inverse case or compression in the forward case), which represents a simple copy/multiply-add operation with scaling by −1) of the 2N input or output samples, analysis or synthesis windowing of twice as many samples as for the MDCT/MDST (4N instead of 2N), and more additions during OLA in the decoder. In other words, given the O(n(log n+c)) algorithmic complexity of the transformation, only constant c increases in case of the MELT (or ELT), and since n=1024 or 768 in the present embodiment, any increase of c by a factor of approximately two to three can be considered negligible (i.e. it only amounts to less than a quarter of the total transform, windowing, and OLA/framing complexity which, in turn, is only a fraction of the entire 3D Audio decoder complexity).

Table 3 illustrates supported window sequences in case of MELT switching scheme. LONG sequence means MDCT/MDST, where only a "KBD" window shape is allowed since the LONG with "sine" window configuration is re-used for signaling the ELT-LONG sequence.

TABLE 3

| | To | | | | | |
|---|---|---|---|---|---|---|
| From | LONG | START | SHORT | STOP | STOP-START | ELT-LONG |
| LONG | ✓ KBD | ✓ KBD | x | x | x | ✓ tr->tr; KBD |
| START | x | x | ✓ | ✓ | ✓ | x |
| SHORT | x | x | ✓ | ✓ | ✓ | x |
| STOP | ✓ | ✓ | x | x | x | ✓ tr->tr; KBD |
| STOP-START | x | x | ✓ | ✓ | ✓ | x |
| ELT-LONG | ✓ tr<- tr; KBD | ✓ tr<- tr; KBD | x | x | x | ✓ |

Figure 8:
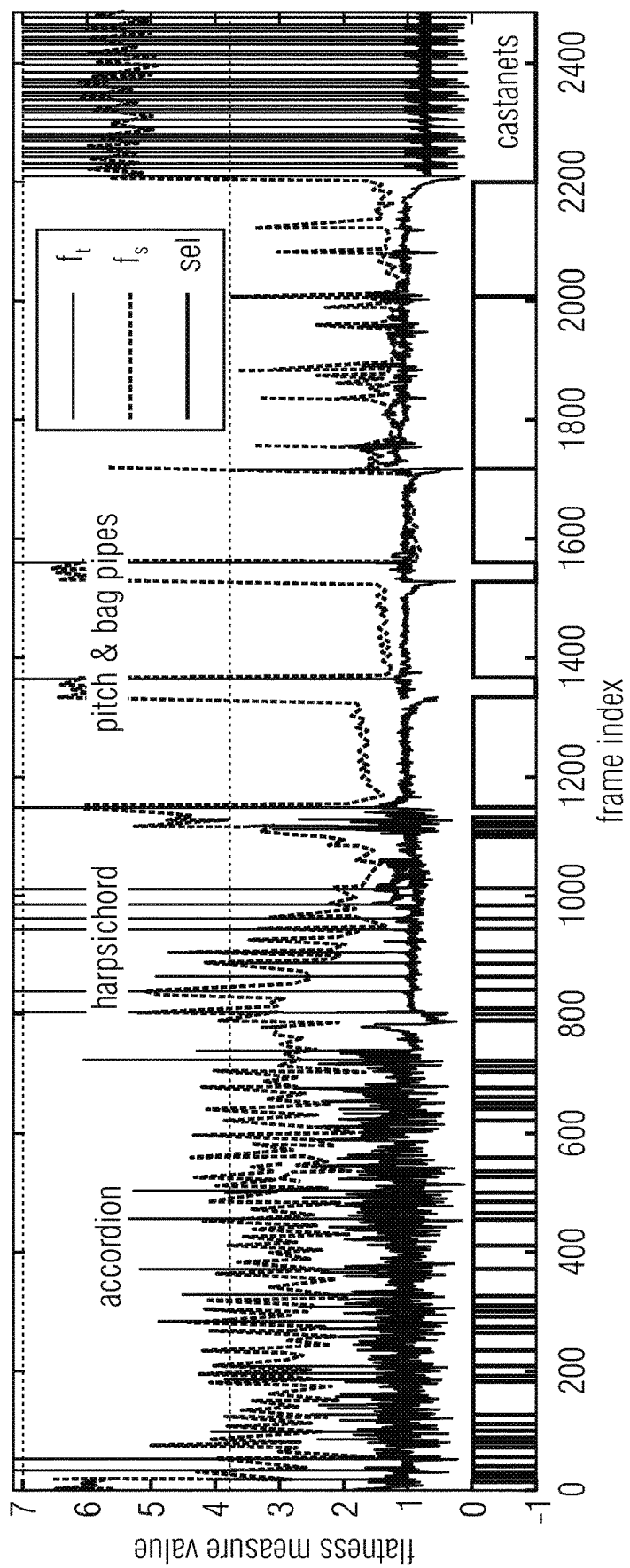
FIG. 8 illustrates the resulting frame-wise ELT and MDCT selection for four input signals according to embodiments.
Figure 9:
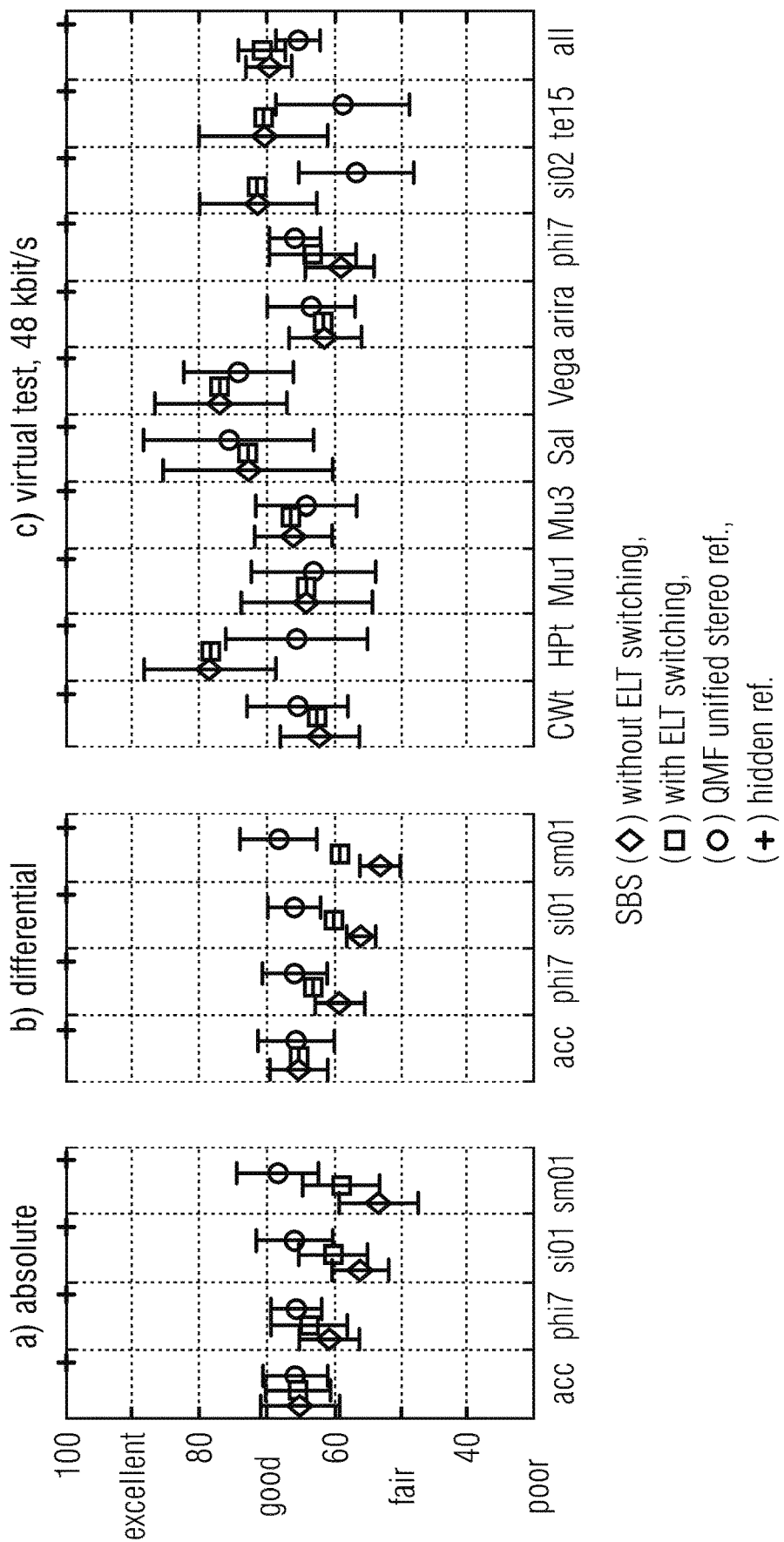
FIG. 9 illustrates a zoomed view of listening test results with 95% confidence intervals according to embodiments.

✓ = allowed;
x = not allowed
tr<- tr = transition from ELT;
tr->tr = transition to ELT;
KBD = Kaiser-Bessel derived In the following, evaluation of the codec integration that has been conducted is described. Blind subjective evaluation of the switched-ratio proposal confirmed the benefit of the signal-adaptive design. Reference is made to FIG. 8 and FIG. 9.

FIG. 8 illustrates a spectral and temporal flatness based selection of ELT. In particular, FIG. 8 illustrates the resulting frame-wise ELT and MDCT selection for four input signals (MDSTs are not used on this material). The stationary, tonal passages are detected reliably. The below (pink) "sel"-line has value "0" for MELT and value "−1" for MLT.

FIG. 9 illustrates a zoomed view of listening test results with 95% confidence intervals. 3.5-kHz anchor scores are omitted for clarity.

The designs and results of subjective tests of this scheme, integrated into the 3D Audio codec, are discussed in the following:

Two blind listening experiments according to the MUSHRA (multiple stimuli with hidden reference and anchor) principle (see [26]) were conducted to assess the subjective performance of the switched MDCT-ELT coding system in comparison with a conventional scheme employing only MDCTs (or MDSTs, as in case of the kernel switching proposal, see [9]). To this end, the switched-ratio architecture was integrated into an encoder and decoder implementation of the MPEG-H 3D Audio codec, using IGF for bandwidth extension and stereo filling (SF) for semi-parametric channel-pair coding at 48 kbit/s stereo, as described in [8], [9]. Testing was carried out by 12 experienced listeners (age 39 and younger, incl. 1 female) in a quiet room using a fanless computer and modern STAX headphones.

The first conducted experiment, a 48-kbit/s test using tonal instrumental signals, intended to quantify the advantage of ELT over traditional MDCT coding on tonal, harmonic audio material, as well as the benefit of switching from ELT to MDCT coding on transients and tone onsets, as discussed in the last section. For each of the four tonal test signals already used in past MPEG codec evaluations [25], [27]—accordion, bag/pitch pipe, and harpsichord—the 3D Audio coded stimuli with and without the switchable ELT were presented alongside a 3D Audio reference condition employing unified stereo SBR and MPEG Surround 2-1-2 (and, thus, doubled frame length).

The results of this test, along with the per-stimulus 95-% confidence intervals, are illustrated as overall mean scores in FIG. 9 (a) and as differential mean scores, relative to the ELT condition, in FIG. 9 (b). They demonstrate that for three out of the four items the quality of the SBS-based 3D Audio codec can be improved significantly by switching to the ELT during stationary signal passages. Moreover, by resorting to MDCT coding during the non-stationary tonal onsets and transients, perceptual degradations due to stronger pre-echo artifacts are avoided. Finally, the subjective performance of the 3D Audio configuration with IGF and SF can be brought closer to that of the longer-frame-size unified stereo reference for such items. All stimuli except sm01 (bag pipes) now exhibit good quality.

A second "virtual" listening test, a 48-kbit/s virtual test using various signal types, was constructed in which the results of the subjective evaluation in [9] were combined with the present data for the phi7 item (pitch pipe, the only signal in [9] for which ELTs are applied in more than a few frames).

This setup should reveal whether SBS-based 3D Audio coding, enhanced by the switchable ELT scheme, can outperform the QMF-based 3D Audio configuration on a diverse test set.

FIG. 9 (c) depicts the per-stimulus and the overall absolute mean scores, again with confidence intervals, for this test. Indeed, thanks to the ELT-induced quality gains on signals such as phi7, the average perceptual performance of the SBS+ELT configuration is rendered significantly better than that of the unified stereo reference. Given that the latter exhibits a higher algorithmic latency and complexity due to the required additional pseudo-QMF banks, this outcome is highly satisfactory.

The perceptual benefit of the switched-ELT approach was confirmed by formal subjective evaluation, which reveals no quality degradations over the 3D Audio framework and which further indicates that the inventors' long-term objective of good coding quality on every type of input signal at 48 kbit/s stereo could in fact be achieved with only a bit more encoder tuning.

Some embodiments provide improvements for quasi-stationary harmonic signal passages by the adaptive application of the modified extended lapped transform (MELT).

Figure 12:
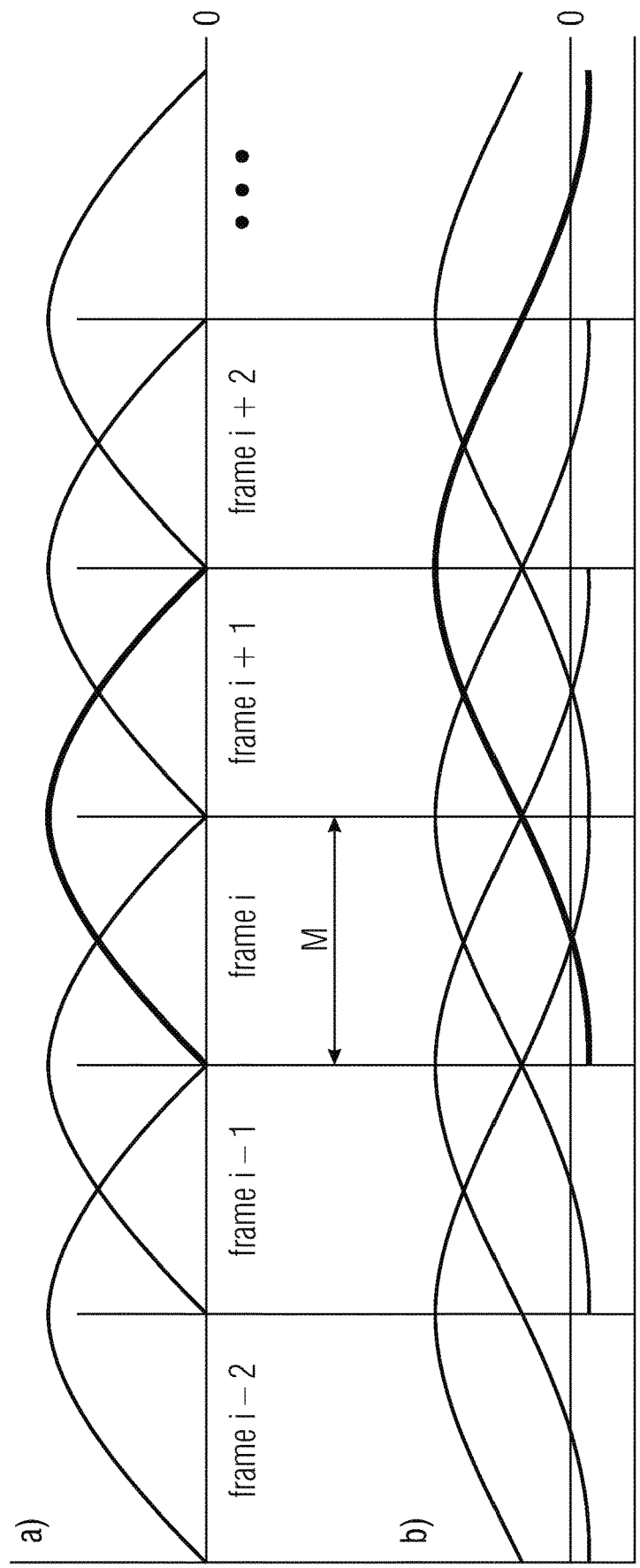
FIG. 12 illustrates basic filter-banks with lapped transforms according to some particular embodiments, wherein FIG. 12 (a) illustrates MDCT/MDST, and wherein FIG. 12 (b) illustrates ELT.

In this context, FIG. 12 illustrates basic filter-banks with lapped transforms according to some particular embodiments, wherein FIG. 12 (a) illustrates MDCT/MDST, and wherein FIG. 12 (b) illustrates ELT.

Being based on ELT, in some embodiments, the MELT constructs an oddly stacked filter-bank with 75% inter-transform overlap, as depicted in FIG. 12 (b), yielding greater frequency selectivity than an MDCT or MDST filter-bank with 50% overlap, as shown in FIG. 12 (a), at the same frame length M. However, unlike the ELT, the MELT allows straight-forward transitions, for example, using in some embodiments only special transitory windows, to and from MDCTs. In particular, some embodiments may, e.g., provide a respective frame-wise signal-adaptive overlap ratio switching scheme.

Particular embodiments that realize cosine- and sine-modulated MELT coding are now described.

As already explained above, the forward (analysis) MDCT for a frame at index i, given a time signal x and returning a spectrum X, may, for example, be written as $$X_i(k) = \sum_{n=0}^{N-1} x_i(n)\cos\left(\frac{\pi}{M}\left(n + \frac{M+1}{2}\right)\left(k + \frac{1}{2}\right)\right), \quad (11a)$$

where window length N=2M and 0≤k<M. Likewise, the forward MDST is defined using a sine instead of cosine term:

$$X_i(k) = \sum_{n=0}^{N-1} x_i(n)\sin\left(\frac{\pi}{M}\left(n + \frac{M+1}{2}\right)\left(k + \frac{1}{2}\right)\right). \quad (11b)$$

In embodiments, by altering the temporal length and phase offset this yields the MELT, $$X_i(k) = \sum_{n=0}^{L-1} x_i(n)\cos\left(\frac{\pi}{M}\left(n + \frac{3M+1}{2}\right)\left(k + \frac{1}{2}\right)\right) \quad (11c)$$

with increased window length L=4M and cosine modulation. Naturally, a sine-modulated counterpart may also be specified, $$X_i(k) = \sum_{n=0}^{L-1} x_i(n)\sin\left(\frac{\pi}{M}\left(n + \frac{3M+1}{2}\right)\left(k + \frac{1}{2}\right)\right), \quad (11d)$$

The inverse (synthesis) MELT variants are, for example, $$x_i'(n) = \frac{2}{M}\sum_{k=0}^{M-1} X_i'(k)\cos\left(\frac{\pi}{M}\left(n + \frac{3M+1}{2}\right)\left(k + \frac{1}{2}\right)\right) \quad (11e)$$

for cosine banks applying formula (11c) and, respectively, for sine banks, $$x_i'(n) = \frac{2}{M}\sum_{k=0}^{M-1} X_i'(k)\sin\left(\frac{\pi}{M}\left(n + \frac{3M+1}{2}\right)\left(k + \frac{1}{2}\right)\right), \quad (11f)$$

where ' denotes spectral processing, and 0≤n<L.

It should be noted that, although the employed window length may, for example, vary between formulae (11a), (11b) and formulae (11c), (11d), (11e) and (11f), the transform length M, and thereby, the inter-transform step size illustrated in FIG. 12 stays identical, which explains the difference in overlap ratio. The cosine- and sine-modulated MELT definitions of formulae (11c), (11d), (11e) and (11f) may, in some embodiments, be further improved for realizing kernel switching, and therefore, efficient coding of signals with ±90 degrees of IPD, even in case of 75% inter-transform overlap. Type-II transition transforms adopted from the evenly stacked Princen-Bradley filter-bank may, for example, be employed for time-domain aliasing cancelation (TDAC) when switching between type-IV MDCTs and MDSTs, see formulae (11a) and (11b). Specifically, a MDST-II is required during changes from MDCT-IV to MDST-IV coding in a channel, and a MDCT-II is needed when reverting to MDCT-IV coding.

Besides the abovementioned type-IV definitions (see formulae (11c), (11d), (11e) and (11D)), an ELT-based filterbank allowing fast implementations using the DCT-II can also be constructed, which proves that type-II filter-banks with more than 50% inter-transform overlap are in fact feasible. An alternative but equivalent approach following the TDAC filterbank design is to devise an evenly stacked system via alternating usage of a type-II cosine-modulated MELT version, $$X_i(k) = \frac{1}{1+\delta(k)} \sum_{n=0}^{L-1} x_i(n)\cos\left(\frac{\pi}{M}\left(n+\frac{3M+1}{2}\right)k\right) \quad (11g)$$

with Kronecker delta $\delta(0)=1$, and a type-II sine-based MELT, $$X_i(k) = \frac{1}{1+\delta(k')} \sum_{n=0}^{L-1} x_i(n)\sin\left(\frac{\pi}{M}\left(n+\frac{3M+1}{2}\right)(k+1)\right) \quad (11h)$$

with k'=M−1−k for scaling of the Nyquist coefficient.

Figure 13:
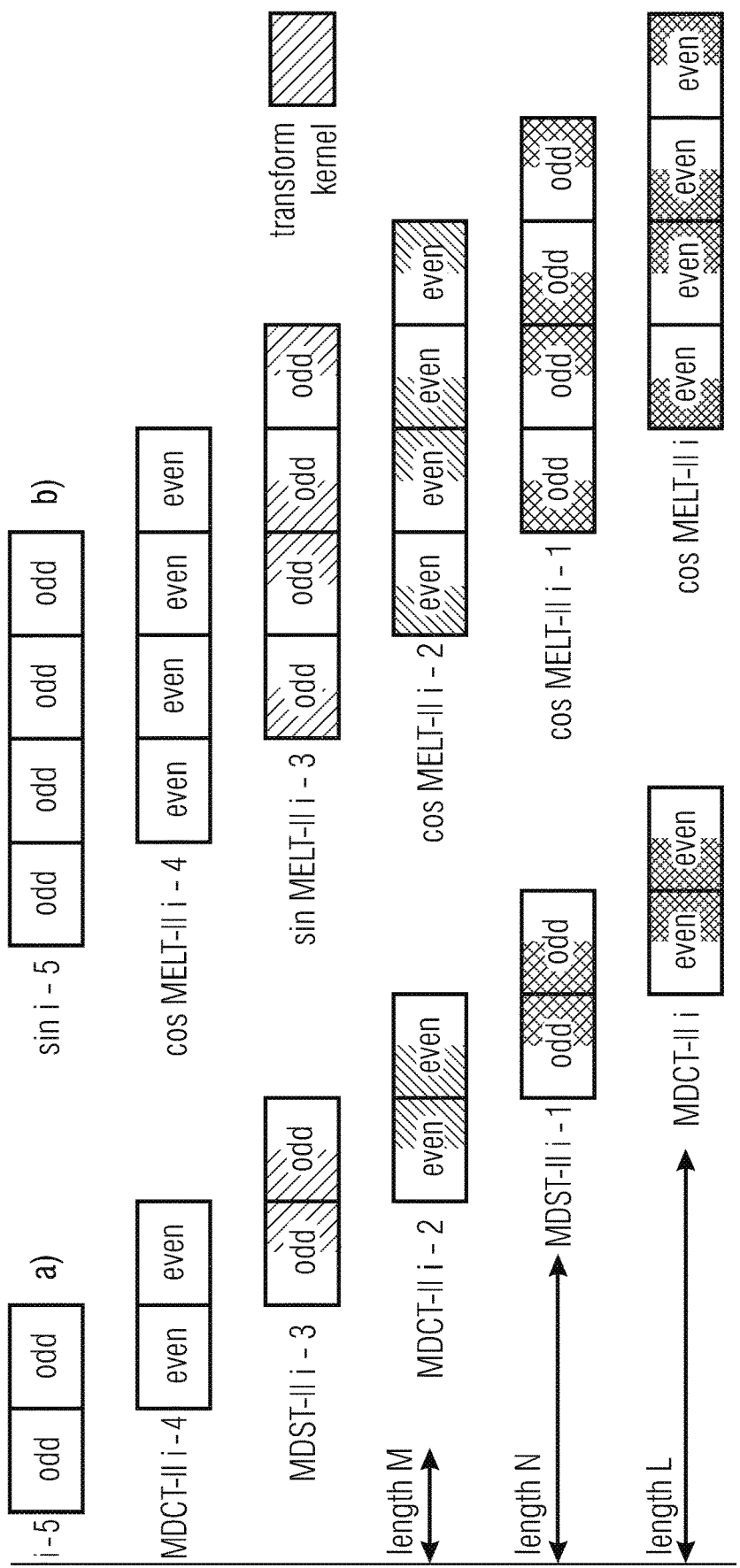
FIG. 13 illustrates TDAC in evenly stacked filter-banks according to some particular embodiments, wherein FIG. 13 (a) illustrates Princen-Bradley, and wherein FIG. 13 (b) illustrates MELT-II.

Formulae (11g) and (11h) on the analysis side and, respectively, $$x'_i(k) = \frac{2}{M} \sum_{k=0}^{M-1} X'_i(n)\cos\left(\frac{\pi}{M}\left(n+\frac{3M+1}{2}\right)k\right) \quad (11i)$$

and $$x'_i(k) = \frac{2}{M} \sum_{k=0}^{M-1} X'_i(n)\sin\left(\frac{\pi}{M}\left(n+\frac{3M+1}{2}\right)(k+1)\right) \quad (11j)$$

on the synthesis side lead to TDAC, as depicted in FIG. 13.

In particular, FIG. 13 illustrates TDAC in evenly stacked filter-banks according to some particular embodiments, wherein FIG. 13 (a) illustrates Princen-Bradley, and wherein FIG. 13 (b) illustrates MELT-II. TDAC is possible in case of even-odd or odd-even time-domain aliasing combination between adjacent transforms.

Figure 14:
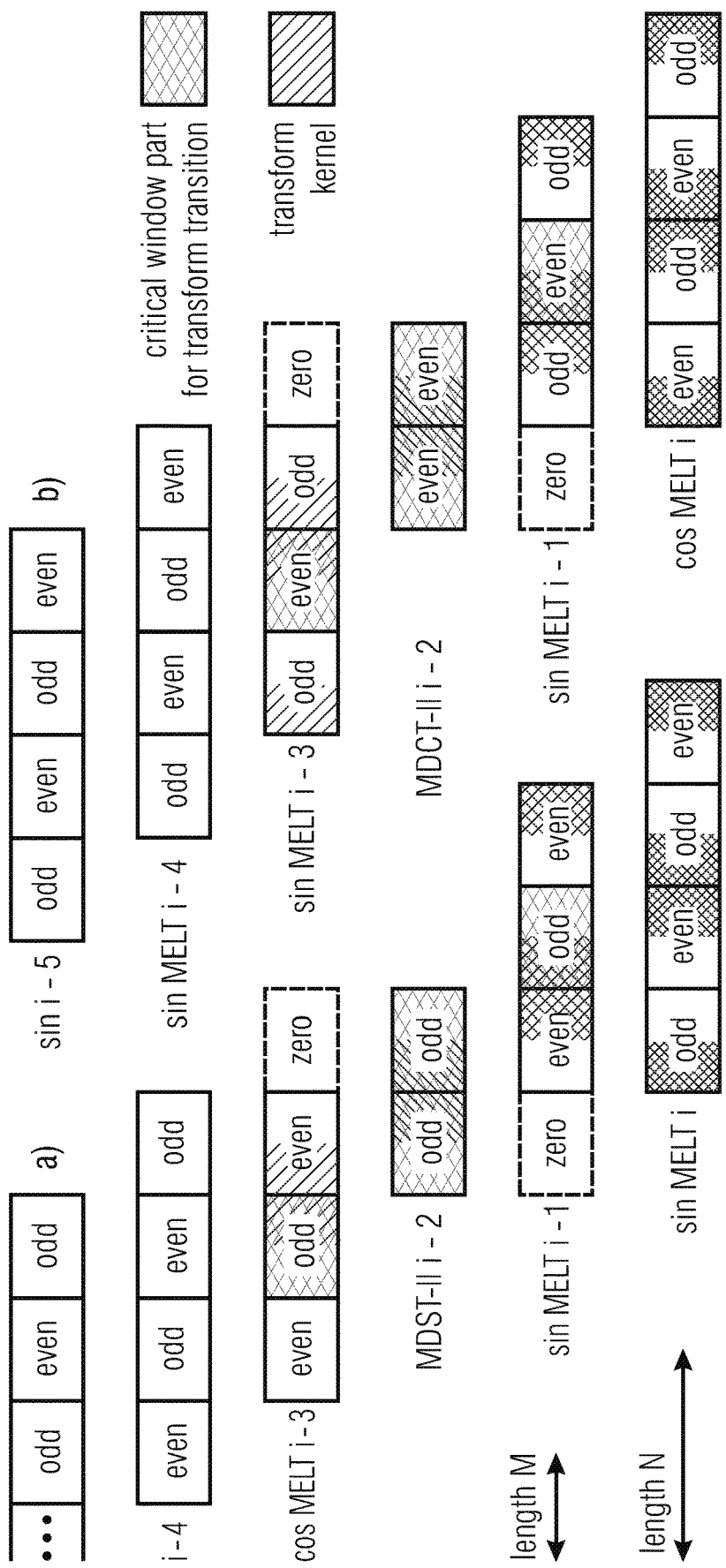
FIG. 14 illustrates particular TDAC-compliant kernel switching for MELT-IV filter-banks according to particular embodiments, wherein FIG. 14 (a) illustrates transitions from cosine to sine modulation, and wherein FIG. 14 (b) illustrates transitions from sine to cosine modulation.

Regarding the combination of MELT coding and kernel switching, it can be shown that TDAC is impossible when, analogously to the process for 50% overlap, a transitory type-II instance of formulae (11g) and (11i) or formulae (11h) and (11j) is employed when switching between type-IV cosine- and sine-modulated MELTs, see formulae (11c), (11d), (11e) and (11D). As it is desirable to keep the architectural complexity of the codec low when allowing kernel switching regardless of the instantaneous overlap ratio, the following work-around is proposed. To switch from the cosine-modulated MELT-IV (see formulae (11c) and (11e)) to the sine-modulated MELT-IV (see formulae (11d) and (11D)), a transitory MDST-II frame, combined with a temporary reduction of the overlap ratio to 50% on both analysis and synthesis side, may, for example, be employed. Likewise, an intermediate MDCT-II can be employed when reverting back from sine- to cosine-based MELT coding. FIG. 14 illustrates particular TDAC-compliant kernel switching for MELT-IV filter-banks according to particular embodiments, wherein FIG. 14 (a) illustrates transitions from cosine to sine modulation, and wherein FIG. 14 (b) illustrates transitions from sine to cosine modulation.

Full TDAC is obtained in both cases since, as is visualized in FIG. 14, the overlap length between each type-II transition and its type-IV MELT neighbors is restricted to $$M = \frac{N}{2}.$$

Figure 15:
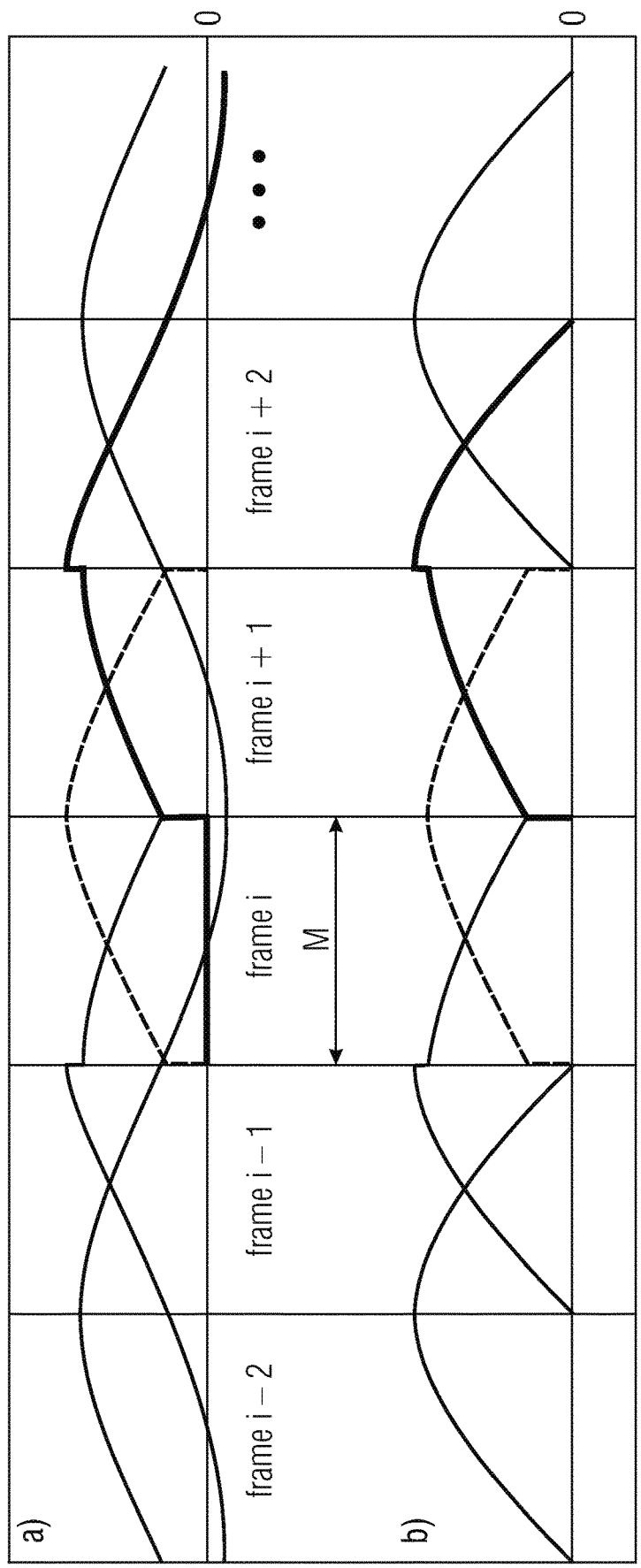
FIG. 15 illustrates an improved, correct windowing according to particular embodiments with a special "stop-start" shape, indicated by dashes, during temporary transitions, wherein FIG. 15 (a) illustrates temporary transitions from a 75 to a 50% overlap ratio, and wherein FIG. 15 (b) illustrates temporary transitions from a 50 to a 75% overlap ratio.

Hence, there is no temporal-aliasing bound overlap between a cosine- and a sine-modulated MELT-IV which requires TDAC. To realize proper windowing, in embodiments, a special "stop-start" window should be applied to the type-II transforms, as shown in FIG. 15 (a). Such a, for example, symmetric, window, which is based on the asymmetric transitory weightings, is, according to some embodiments, described in more detail below.

In particular, FIG. 15 illustrates an improved windowing according to particular embodiments with a special "stop-start" shape, indicated by dashes, during temporary transitions, wherein FIG. 15 (a) illustrates temporary transitions from a 75 to a 50% overlap ratio, and wherein FIG. 15 (b) illustrates temporary transitions from a 50 to a 75% overlap ratio.

In the following, transitions from and to MELT frames according to some embodiments, are described.

According to some embodiments, frame-to-frame switches may, e.g., be realized from an MDCT-like transform with 50% to the MELT with 75% overlap ratio, and vice versa. To maintain full TDAC during the switches, dedicated asymmetric transition windows derived from the steady-state weightings applied during quasi-stationary signal passages, may, for example, be employed. These windows may, for example, be defined as $$w'_{elt}(n) = \begin{cases} 0, & 0 \le n < M \\ w_{elt}(n), & M \le n < N \\ d\sqrt{1 - w_{elt}(k)^2 - w_{elt}(M+k)^2}, & N \le n < 3M \\ w_{elt}(n), & 3M \le n < L \end{cases} \quad (12)$$

for the first MELT window upon an overlap increase from 50 to 75% (bold-lined shape depicted in FIG. 15 (a) for frame i) and $$w'_{mlt}(t) = \begin{cases} d\sqrt{1 - w_{elt}(N+k)^2 - w_{elt}(3M+k)^2}, & 0 \le n < M \\ w_{mlt}(n), & M \le n < N \end{cases} \quad (13)$$

for the first MDCT/MDST window when reducing the overlap to 50% (bold-lined shape in FIG. 15 (b) for the same frame). The complements for $w'_{elt}$ and $w'_{mlt}$, the last MELT window when switching to 50% overlap, and the last MDCT/MDST window during switch-backs to 75% overlap (frame i−2 in FIG. 15), are the temporal reversals of formulae (12) and (13), respectively. k, used in the critical window parts (see also FIG. 14), is specified as above, while $w_{elt}$ resp. $w_{mlt}$ indicate the underlying window functions for a steady-state MELT and MDCT/MDST. For the former, which is also applicable to the ELT (see [12]), an improved design preventing blocking artifacts has been provided above.

Let $w_{tr}(t)$, with t spanning a number M of time-domain samples, e.g., represent the critical window quarter, e.g., the length-M segment characterized by a square-root term scaled by a real value d, of either w'$_{elt}$ or w'$_{mlt}$ when applied on either the analysis (encoder) or synthesis (decoder) side. Employing d allows for a so-called biorthogonal approach with regard to switched-ratio transition windowing, where different critical window parts may be employed for the analysis and synthesis transforms. More specifically, to achieve TDAC and thus PR, w$_{tr}$(t) may use d=d' on the analysis (encoder) side, and on the synthesis (decoder) side, w$_{tr}$(t) may apply the inverse, e.g., $$d = \frac{1}{d'}.$$

Given a particular steady-state ELT window w$_{elt}$, d' may be determined such that, during all ratio-switching transitions, it leads to both optimal spectral attributes of the analysis windows during encoding and maximal output attenuation by the synthesis windows during decoding.

According to a decoder embodiment, w$_{elt}$ is a first window function, w$_{mlt}$ is a second window function, and w'$_{mlt}$ is a third window function, wherein the third window function is defined according to $$w'_{mlt}(n) = \begin{cases} d\sqrt{1 - w_{elt}(N+k)^2 - w_{elt}(3M+k)^2}, & 0 \le n < M \\ w_{mlt}(n), & M \le n < N \end{cases},$$

wherein M indicates a number of spectral-domain audio samples of the first or the second or the third or the fourth group of the spectral-domain audio samples, wherein k is a number with 0≤k<M, wherein d is a real number, wherein n is an integer, and wherein the overlap-adder 130 is configured to generate at least one of the first and the second and the third and the fourth group of time-domain intermediate audio samples depending on the third window function w'$_{mlt}$.

Analogously, according to an encoder embodiment, w$_{elt}$ is a first window function, w$_{mlt}$ is a second window function, and w'$_{mlt}$ is a third window function, wherein the third window function is defined according to $$w'_{mlt}(n) = \begin{cases} d\sqrt{1 - w_{elt}(N+k)^2 - w_{elt}(3M+k)^2}, & 0 \le n < M \\ w_{mlt}(n), & M \le n < N \end{cases},$$

wherein M indicates a number of spectral-domain audio samples of the first or the second or the third or the fourth group of the spectral-domain audio samples, wherein k is a number with 0≤k<M, wherein d is a real number, wherein n is an integer, and wherein at least one of the first encoding module 210 and the second encoding module 220 is configured to apply the third window function w'$_{mlt}$ on at least one of the first and the second and the third and the fourth group of time-domain audio samples.

In the following, improved, advantageously optimal, spectral properties of the analysis windowing according to some embodiments are described. Some embodiments try to achieve a small, advantageously a smallest possible, amount of mainlobe width and a strong, advantageously strongest possible, amount of side-lobe attenuation in the analysis windows in order to increase the spectral compaction especially of stationary, harmonic audio signals.

As, for some of the embodiments, the steady-state w$_{elt}$ window has already been constructed for this purpose, it can be shown that this can be achieved in w'$_{elt}$ and w'$_{mlt}$ (and, of course, their time-reversals) by avoiding discontinuities at the borders between the window parts. More precisely, by choosing d' such that the maximum value of w$_{tr}$ equals the maximum value of w$_{elt}$ (or, e.g., a value that is close to that maximum), jumps in the transitory window_shape are fully avoided. Hence, d' shall reflect the ratio between said two maxima, which in the present case can be approximated by $$d' = \frac{4096}{4061}.$$

In the following, an increased, advantageously maximal, output attenuation upon synthesis windowing is described. To better (advantageously as much as possible) suppress spectral-domain distortion in audio coding, caused by quantization of the transform bins, it may be useful to attenuate the output waveform during the synthesis windowing process prior to OLA processing, advantageously as much as possible. However, due to the PR/TDAC requirements, strong attenuation by the window is difficult, since this approach would render the complementary analysis window detrimental in terms of efficiency. According to some embodiments, a good trade-off between good window properties and acceptable decoder-side output attenuation can be obtained by choosing $$\frac{1}{d'} = \frac{4061}{4096}.$$

In other words, both optimization approaches for w$_{tr}$ may lead to the same value for d'. When employing w$_{elt}$, the discontinuities in w'$_{elt}$ and w'$_{mlt}$ are very minor (see FIG. 9), and their avoidance at least on the synthesis side is not expected to yield audible improvement. The special transitory "stop-start" window for MELT-based kernel switching described above, depicted for a particular embodiment by a dashed line in FIG. 15 (a) and denoted by w$_{ss}$ hereafter, can be derived from the critical window part of formulae (12) or (13):

$$w_{ss}(n) = \begin{cases} d\sqrt{1 - w_{elt}(N+k)^2 - w_{elt}(3M+k)^2}, & 0 \le n < M \\ d\sqrt{1 - w_{elt}(k)^2 - w_{elt}(M+k)^2}, & M \le n < N \end{cases} \quad (14)$$

In other words, w$_{ss}$ is a symmetric window with critical parts in both halves, thus allowing overlap-ratio transitions on both sides. It should be noted that w$_{ss}$ can be applied to the MDCT and MDST as well as the different MELT variants (assuming the outer quarters of the length-L weighting are set to zero). In fact, its usage for analysis-side windowing renders the MDCT and the cosine-modulated MELT-IV coefficients identical apart from sign differences, as is indicated by FIG. 5 (c)). Apart from facilitating kernel switching, w$_{ss}$ can also be utilized to make the overlap ratio switching scheme more flexible. For example, the temporary switching configuration (from 50 to 75% overlap) shown in FIG. 15 (b) can be achieved therewith.

According to a decoder embodiment, w$_{elt}$ is a first window function, w$_{ss}$ is a second window function, wherein the second window function is defined according to $$w_{ss}(n) = \begin{cases} d\sqrt{1 - w_{elt}(N+k)^2 - w_{elt}(3M+k)^2}, & 0 \le n < M \\ d\sqrt{1 - w_{elt}(k)^2 - w_{elt}(M+k)^2}, & M \le n < N \end{cases},$$

wherein M indicates a number of spectral-domain audio samples of the first or the second or the third or the fourth group of the spectral-domain audio samples, wherein k is a number with 0≤k<M, wherein d is a real number, wherein n is an integer, and wherein the overlap-adder 130 is configured to generate at least one of the first and the second and the third and the fourth group of time-domain intermediate audio samples depending on the second window function $w_{ss}$.

Analogously, according to an encoder embodiment, $w_{elt}$ is a first window function, $w_{ss}$ is a second window function, wherein the second window function is defined according to $$w_{ss}(n) = \begin{cases} d\sqrt{1 - w_{elt}(N+k)^2 - w_{elt}(3M+k)^2}, & 0 \le n < M \\ d\sqrt{1 - w_{elt}(k)^2 - w_{elt}(M+k)^2}, & M \le n < N \end{cases},$$

wherein M indicates a number of spectral-domain audio samples of the first or the second or the third or the fourth group of the spectral-domain audio samples, wherein k is a number with 0≤k<M, wherein d is a real number, wherein n is an integer, and wherein at least one of the first encoding module 210 and the second encoding module 220 is configured to apply the second window function $w_{ss}$ on at least one of the first and the second and the third and the fourth group of time-domain audio samples.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A decoder for decoding a plurality of spectral-domain audio samples, wherein the decoder comprises:
a first decoding module for decoding a first group of the spectral-domain audio samples by generating a first group of time-domain intermediate audio samples from the spectral-domain audio samples of the first group of the spectral-domain audio samples, and for decoding a second group of the spectral-domain audio samples by generating a second group of time-domain intermediate audio samples from the spectral-domain audio samples of the second group of the spectral-domain audio samples, an overlap-adder, wherein the overlap-adder is configured to conduct overlap-adding of exactly two groups of time-domain intermediate audio samples, said exactly two groups being the first group and the second group of time-domain intermediate audio samples, wherein the overlap-adder is configured to overlap-add said exactly two groups with an overlap of more than 5% and at most 50%, wherein said overlap-add of said exactly two groups results in generating a first plurality of time-domain audio output samples of an audio signal, a second decoding module for decoding a third group of the spectral-domain audio samples by generating a third group of time-domain intermediate audio samples from the spectral-domain audio samples of the third group of the spectral-domain audio samples, and for decoding a fourth group of the spectral-domain audio samples by generating a fourth group of time-domain intermediate audio samples from the spectral-domain audio samples of the fourth group of the spectral-domain audio samples, and an output interface for outputting the first plurality of time-domain audio output samples of the audio signal, a second plurality of time-domain audio output samples of the audio signal and a third plurality of time-domain audio output samples of the audio signal, wherein the overlap-adder is configured to acquire the second plurality of time-domain audio output samples using overlap-adding at least the third group of time-domain intermediate audio samples with an overlap of more than 60% and less than 100% with the fourth group of time-domain intermediate audio samples, and wherein the overlap-adder is configured to acquire the third plurality of time-domain audio output samples using overlap-adding of at least the second group of time-domain intermediate audio samples with the third group of time-domain intermediate audio samples, or wherein the overlap-adder is configured to acquire the third plurality of time-domain audio output samples using overlap-adding of at least the fourth group of time-domain intermediate audio samples with the first group of time-domain intermediate audio samples.

2. The decoder according to claim 1,
wherein the first plurality of time-domain audio output samples of the audio signal precedes the third plurality of time-domain audio output samples of the audio signal in time, and wherein the third plurality of time-domain audio output samples of the audio signal precedes the second plurality of time-domain audio output samples of the audio signal in time, and wherein the overlap-adder is configured to acquire the third plurality of time-domain audio output samples using overlap-adding of at least the second group of time-domain intermediate audio samples with the third group of time-domain intermediate audio samples, or wherein the second plurality of time-domain audio output samples of the audio signal precedes the third plurality of time-domain audio output samples of the audio signal in time, and wherein the third plurality of time-domain audio output samples of the audio signal precedes the first plurality of time-domain audio output samples of the audio signal in time, and wherein the overlap-adder is configured to acquire the third plurality of time-domain audio output samples using overlap-adding of at least the second group of time-domain intermediate audio samples with the third group of time-domain intermediate audio samples.

3. The decoder according to claim 1,
wherein the overlap-adder is configured to overlap-add the first group of time-domain intermediate audio samples with an overlap of exactly 50% with the second group of time-domain intermediate audio samples, and wherein the overlap-adder is configured to overlap-add at least the third group of time-domain intermediate audio samples with an overlap of at least 75% and less than 100% with the fourth group of time-domain intermediate audio samples.

4. The decoder according to claim 3,
wherein the first decoding module is configured to conduct an inverse Modified Discrete Cosine Transform or an inverse Modified Discrete Sine Transform, and
wherein the second decoding module is configured to conduct an inverse Extended Lapped Transform or an inverse Modified Extended Lapped Transform.

5. The decoder according to claim 3, wherein the overlap-adder is configured to overlap-add at least the third group of time-domain intermediate audio samples with an overlap of exactly 75% with the fourth group of time-domain intermediate audio samples.

6. The decoder according to claim 1,
wherein a first number of time-domain intermediate audio samples of the first group of time-domain intermediate audio samples is equal to a second number of time-domain intermediate audio samples of the second group of time-domain intermediate audio samples,
wherein a third number of time-domain intermediate audio samples of the third group of time-domain intermediate audio samples is equal to a fourth number of time-domain intermediate audio samples of the fourth group of time-domain intermediate audio samples,
wherein the second number is equal to the third number divided by 2, and wherein the first number is equal to the fourth number divided by 2.

7. The decoder according to claim 1,
wherein the second decoding module is configured to decode a fifth group of the spectral-domain audio samples by generating a fifth group of time-domain intermediate audio samples from the spectral-domain audio samples of the fifth group of the spectral-domain audio samples, and for decoding a sixth group of the spectral-domain audio samples by generating a sixth group of time-domain intermediate audio samples from the spectral-domain audio samples of the sixth group of the spectral-domain audio samples, and wherein the overlap-adder is configured to acquire the second plurality of time-domain audio output samples by overlap-adding the third group of time-domain intermediate audio samples and the fourth group of time-domain intermediate audio samples and the fifth group of time-domain intermediate audio samples and the sixth group of time-domain intermediate audio samples, such that the third or the fourth group of time-domain intermediate audio samples overlaps with at least 75% and less than 100% with the fifth group of time-domain intermediate audio samples, and such that the fifth group of time-domain intermediate audio samples overlaps with at least 75% and less than 100% with the sixth group of time-domain intermediate audio samples.

8. The decoder according to claim 1,
wherein the second decoding module is configured to generate at least one of the third group of time-domain intermediate audio samples and the fourth group of time-domain intermediate audio samples depending on $$cs(a(n+b)(k+c)),$$

wherein cs( ) is cos( ) or sin( ),
wherein n indicates a time index of one of the time-domain intermediate audio samples of the third or the fourth group of time-domain intermediate audio samples,
wherein k indicates a spectral index of one of the spectral-domain audio samples of the first or the second or the third or the fourth group of the spectral-domain audio samples,
wherein $-0.1 \leq c \leq 0.1$, or $0.4 \leq c \leq 0.6$, or $0.9 \leq c \leq 1.1$, wherein $$a = \frac{q}{M},$$

wherein $0.9 \cdot \pi \leq q \leq 1.1 \cdot \pi$,
wherein M indicates a number of spectral-domain audio samples of the first or the second or the third or the fourth group of the spectral-domain audio samples, $$b = \frac{s \cdot M + 1}{2},$$

wherein and
wherein $1.5 \leq s \leq 4.5$.

9. The decoder according to claim 1,
wherein the first decoding module is configured to generate at least one of the first group of time-domain intermediate audio samples and the second group of time-domain intermediate audio samples depending on $$cs_1(a(n_1+b_1)(k+c_1)),$$

wherein $cs_1$ ( ) is cos( ) or sin( ),
wherein $n_1$ indicates a time index of one of the time-domain intermediate audio samples of the first or the second group of time-domain intermediate audio samples,
wherein $-0.1 \leq c_1 \leq 0.1$, or $0.4 \leq c_1 \leq 0.6$, or $0.9 \leq c_1 \leq 1.1$, wherein $$b_1 = \frac{M+1}{2}.$$

10. The decoder according to claim 8,
wherein $c=0$, or $c=0.5$, or $c=1$,
wherein $q=\pi$, and
wherein $s=3$.

11. The decoder according to claim 9,
wherein $q=\pi$, wherein $s=3$, wherein cs( ) is cos( ) and $cs_1$ ( ) is cos( ) and wherein $c=0.5$, and $c_1=0.5$, or
wherein $q=\pi$, wherein $s=3$, wherein cs( ) is sin( ) and $cs_1$ ( ) is cos( ) and wherein $c=1$, and $c_1=0$, or
wherein $q=\pi$, wherein $s=3$, wherein cs( ) is sin( ) and $cs_1$ ( ) is sin( ) and wherein $c=0.5$, and $c_1=1$, or wherein $q=\pi$, wherein $s=3$, wherein cs( ) is cos( ) and $cs_1$ ( ) is sin( ) and wherein $c=0$, and $c_1=1$, or
wherein $q=\pi$, wherein $s=3$, wherein cs( ) is sin( ) and $cs_1$ ( ) is sin( ) and wherein $c=0.5$, and $c_1=0.5$, or
wherein $q=\pi$, wherein $s=3$, wherein cs( ) is cos( ) and $cs_1$ ( ) is sin( ) and wherein $c=0$, and $c_1=0.5$, or
wherein $q=\pi$, wherein $s=3$, wherein cs( ) is cos( ) and $cs_1$ ( ) is cos( ) and wherein $c=0.5$, and $c_1=0$, or
wherein $q=\pi$, wherein $s=3$, wherein cs( ) is sin( ) and $cs_1$ ( ) is cos( ) and wherein $c=1$, and $c_1=0$.

12. The decoder according to claim 10,
wherein the second decoding module is configured to generate at least one of the third group of time-domain intermediate audio samples and the fourth group of time-domain intermediate audio samples depending on $$\hat{x}'_i(n) = \frac{2}{M} \sum_{k=0}^{M-1} \hat{X}'_i(k) \cos\left(\frac{\pi}{M}\left(n + \frac{3M+1}{2}\right)\left(k + \frac{1}{2}\right)\right),$$

or
depending on $$\hat{x}'_i(n) = \frac{2}{M} \sum_{k=0}^{M-1} \hat{X}'_i(k) \cos\left(\frac{\pi}{M}\left(n + \frac{3M+1}{2}\right)k\right),$$

or
depending on $$\hat{x}'_i(n) = \frac{2}{M} \sum_{k=0}^{M-1} \hat{X}'_k(k) \sin\left(\frac{\pi}{M}\left(n + \frac{3M+1}{2}\right)\left(k + \frac{1}{2}\right)\right),$$

or
depending on $$\hat{x}'_i(n) = \frac{2}{M} \sum_{k=0}^{M-1} \hat{X}'_i(k) \sin\left(\frac{\pi}{M}\left(n + \frac{3M+1}{2}\right)(k+1)\right),$$

wherein $\hat{X}'_i(k)$ indicates one of the spectral-domain audio samples of the third or the fourth group of the spectral-domain audio samples, and
wherein $\hat{x}'_i(n)$ indicates a time-domain value.

13. The decoder according to claim 8, wherein the second decoding module is configured to apply a weight w(n) on the time-domain value $\hat{x}'_i(n)$ according to $$\hat{s}'_i(n) = w(n) \cdot \hat{x}'_i(n)$$

to generate a time-domain intermediate audio sample $\hat{s}'_i(n)$ of the third or fourth group of time-domain intermediate audio samples.

14. The decoder according to claim 1,
wherein the overlap-adder is configured to overlap-add at least the second group of time-domain intermediate audio samples with the third group of time-domain intermediate audio samples, so that all time-domain intermediate audio samples of the second group of time-domain intermediate audio samples overlap with time-domain intermediate audio samples of the third group of time-domain intermediate audio samples, or wherein the overlap-adder is configured to overlap-add at least the fourth group of time-domain intermediate audio samples with the first group of time-domain intermediate audio samples, so that all time-domain intermediate audio samples of the first group of time-domain intermediate audio samples overlap with the fourth group of time-domain intermediate audio samples.

15. The decoder according to claim 1,
wherein $w_{elt}$ is a first window function,
wherein $w_{tr}$ is a second window function, wherein a portion of the second window function is defined according to $$w_{tr}(t) = d\sqrt{1 - w_{elt}(k)^2 - w_{elt}(M+k)^2},$$

wherein M indicates a number of spectral-domain audio samples of the first or the second or the third or the fourth group of the spectral-domain audio samples,
wherein k is a number with $0 \leq k \leq M$,
wherein d is a real number,
wherein $$t = \frac{L}{2} + k,$$

or wherein $$t = \frac{L}{2} - 1 - k,$$

wherein L indicates a number of time-domain intermediate audio samples of the third group or of the fourth group of time-domain intermediate audio samples,
wherein the overlap-adder is configured to overlap-add at least the second group of time-domain intermediate audio samples with the third group of time-domain intermediate audio samples, wherein the second decoding module is configured to generate the fourth group of time-domain intermediate audio samples depending on the first window function $w_{elt}$, and wherein the second decoding module is configured to generate the third group of time-domain intermediate audio samples depending on the second window function $w_{tr}$, or
wherein the overlap-adder is configured to overlap-add at least the fourth group of time-domain intermediate audio samples with the first group of time-domain intermediate audio samples, wherein the second decoding module is configured to generate the third group of time-domain intermediate audio samples depending on the first window function $w_{elt}$, and wherein the second decoding module is configured to generate the fourth group of time-domain intermediate audio samples depending on the second window function $w_{tr}$.

16. The decoder according to claim 15,
wherein $w_{tr1}$ is a third window function, wherein a portion of the third window function is defined according to $$w_{tr1}(t_1) = d\sqrt{1 - w_{elt}(k)^2 - w_{elt}(M+k)^2},$$

wherein $$t_1 = \frac{N}{2} + k,$$

or wherein $$t_1 = \frac{N}{2} - 1 - k,$$

wherein N indicates a number of time-domain intermediate audio samples of the first group or of the second group of time-domain intermediate audio samples,
wherein the overlap-adder is configured to overlap-add at least the second group of time-domain intermediate audio samples with the third group of time-domain intermediate audio samples, and wherein the first decoding module is configured to generate the second group of time-domain intermediate audio samples depending on the third window function $w_{tr1}$, or
wherein the overlap-adder is configured to overlap-add at least the fourth group of time-domain intermediate audio samples with the first group of time-domain intermediate audio samples, and wherein the first decoding module is configured to generate the first group of time-domain intermediate audio samples depending on the third window function $w_{tr1}$.

17. The decoder according to claim 15,
wherein the first window function $w_{elt}$ is defined according to $$w_{elt}(t) = w_{3-term}(t) - \sum_{k=1}^{K} c_k \cos\left(8k\pi \cdot \frac{t+0.5}{L}\right),$$

wherein $$w_{3-term}(t) = \sum_{k=0}^{2} b_k \cos\left(2k\pi \cdot \frac{t+0.5}{L}\right),$$

wherein $b_0$, $b_1$ and $b_2$ are real numbers,
wherein $0 \leq t < L$, and
wherein K is a positive integer and
wherein $c_k$ indicates a real number.

18. The decoder according to claim 17,
wherein K=3;
wherein $0.3 \leq b_0 \leq 0.4$,
wherein $-0.6 \leq b_1 \leq -0.4$,
wherein $0.01 \leq b_2 \leq 0.2$,
wherein $0.001 \leq c_1 \leq 0.03$,
wherein $0.000001 \leq c_2 \leq 0.0005$,
wherein $0.000001 \leq c_3 \leq 0.00002$.

19. The decoder according to claim 1,
wherein $w_{elt}$ is a first window function,
wherein $w_{mlt}$ is a second window function, and
wherein $w'_{mlt}$ is a third window function, wherein the third window function is defined according to $$w'_{mlt}(n) = \begin{cases} d\sqrt{1 - w_{elt}(N+k)^2 - w_{elt}(3M+k)^2}, & 0 \leq n < M \\ w_{mlt}(n), & M \leq n < N \end{cases},$$

wherein M indicates a number of spectral-domain audio samples of the first or the second or the third or the fourth group of the spectral-domain audio samples,
wherein k is a number with $0 \leq k \leq M$,
wherein d is a real number,
wherein n is an integer, and wherein the overlap-adder is configured to generate at least one of the first and the second and the third and the fourth group of time-domain intermediate audio samples depending on the third window function $w'_{mlt}$.

20. The decoder according to claim 1,
wherein $w_{elt}$ is a first window function,
wherein $w_{ss}$ is a second window function, wherein the second window function is defined according to $$w_{ss}(n) = \begin{cases} d\sqrt{1 - w_{elt}(N+k)^2 - w_{elt}(3M+k)^2}, & 0 \leq n < M \\ d\sqrt{1 - w_{elt}(k)^2 - w_{elt}(M+k)^2}, & M \leq n < N \end{cases},$$

wherein M indicates a number of spectral-domain audio samples of the first or the second or the third or the fourth group of the spectral-domain audio samples,
wherein k is a number with $0 \leq k \leq M$,
wherein d is a real number,
wherein n is an integer, and
wherein the overlap-adder is configured to generate at least one of the first and the second and the third and the fourth group of time-domain intermediate audio samples depending on the second window function $w_{ss}$.

21. The decoder according to claim 15, wherein $0.8 \leq d \leq 1.25$.

22. The decoder according to claim 21, wherein $$d = \frac{4061}{4096}.$$

23. The decoder according to claim 15, wherein d=1.
24. The decoder according to claim 1,
wherein the decoder is configured to receive decoding information indicating whether a portion of the plurality of spectral-domain audio samples is to be decoded by the first decoding module or by the second decoding module, and
wherein the decoder is configured to decode said portion of the plurality of spectral-domain audio samples by employing either the first decoding module or the second decoding module depending on the decoding information to acquire the first or the second or the third or the fourth group of time-domain intermediate audio samples.

25. The decoder according to claim 1,
wherein the decoder is configured to receive a first bit and a second bit, wherein the first bit and the second bit together comprise a first bit value combination, or a second bit value combination being different from the first bit value combination, or a third bit value combination being different from the first and the second bit value combination, or a fourth bit value combination being different from the first and the second and the third bit value combination,
wherein the decoder is configured to decode a portion of the plurality of spectral-domain audio samples depending on a Kaiser-Bessel function by employing the first decoding module to acquire the first or the second group of time-domain intermediate audio samples, if the first bit and the second bit together comprise the first bit value combination,
wherein the decoder is configured to decode a portion of the plurality of spectral-domain audio samples depending on a sine function or a cosine function by employing the first decoding module to acquire the first or the second group of time-domain intermediate audio samples, if the first bit and the second bit together comprise the second bit value combination,
wherein the decoder is configured to decode a portion of the plurality of spectral-domain audio samples by employing the first decoding module to acquire the first or the second group of time-domain intermediate audio samples, if the first bit and the second bit together comprise the third bit value combination, and
wherein the decoder is configured to decode said portion of the plurality of spectral-domain audio samples by employing the second decoding module to acquire the third or the fourth group of time-domain intermediate audio samples, if the first bit and the second bit together comprise the fourth bit value combination.

26. An encoder for encoding a plurality of time-domain audio samples of an audio signal by generating a plurality of groups of spectral domain-audio samples from a plurality of groups of the time-domain audio samples, wherein the encoder comprises:
a first encoding module for generating a first group of the groups of spectral-domain audio samples from a first group of the groups of the time-domain audio samples, and for generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5% and at most 50% of the audio samples of the first group of the time-domain audio samples, and
a second encoding module for generating a third group of the groups of spectral-domain audio samples from a third group of the groups of the time-domain audio samples, and for generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples, and
an output module for outputting the first group of spectral-domain audio samples, the second group of spectral-domain audio samples, the third group of spectral-domain audio samples and the fourth group of spectral-domain audio samples,
wherein the third group of the time-domain audio samples comprises audio samples of the second group of the time-domain audio samples, or wherein the fourth group of the time-domain audio samples comprises audio samples of the first group of the time-domain audio samples.

27. An encoder according to claim 26,
wherein the first group of the time-domain audio samples precedes the second group of the time-domain audio samples in time, and wherein the second group of the time-domain audio samples precedes the third group of the time-domain audio samples in time, and wherein the third group of the time-domain audio samples precedes the fourth group of the time-domain audio samples in time, and wherein the third group of the time-domain audio samples comprises audio samples of the second group of the time-domain audio samples, or wherein the third group of the time-domain audio samples precedes the fourth group of the time-domain audio samples in time, and wherein the fourth group of the time-domain audio samples precedes the first group of the time-domain audio samples in time, and wherein the first group of the time-domain audio samples precedes the second group of the time-domain audio samples in time, and wherein the fourth group of the time-domain audio samples comprises audio samples of the first group of the time-domain audio samples.

28. An encoder according to claim 26, wherein the first group of the time-domain audio samples comprises exactly 50% of the audio samples of the second group of the time-domain audio samples, and wherein the second group of the time-domain audio samples comprises exactly 50% of the audio samples of the first group of the time-domain audio samples, and wherein the third group of the time-domain audio samples comprises at least 75% and less than 100% of the audio samples of the fourth group of the time-domain audio samples, and wherein the fourth group of the time-domain audio samples comprises at least 75% and less than 100% of the audio samples of the third group of the time-domain audio samples.

29. An encoder according to claim 28, wherein the first encoding module is configured to conduct a Modified Discrete Cosine Transform or a Modified Discrete Sine Transform, and wherein the second encoding module is configured to conduct an Extended Lapped Transform or a Modified Extended Lapped Transform.

30. An encoder according to claim 28, wherein the third group of the time-domain audio samples comprises exactly 75% of the audio samples of the fourth group of the time-domain audio samples, and wherein the fourth group of the time-domain audio samples comprises exactly 75% of the audio samples of the third group of the time-domain audio samples.

31. An encoder according to claim 26, wherein a first number of time-domain audio samples of the first group of the time-domain audio samples is equal to a second number of time-domain audio samples of the second group of the time-domain audio samples, wherein a third number of time-domain audio samples of the third group of the time-domain audio samples is equal to a fourth number of time-domain audio samples of the fourth group of the time-domain audio samples, wherein the second number is equal to the third number divided by 2, and wherein the first number is equal to the fourth number divided by 2.

32. An encoder according to claim 26, wherein the second encoding module is configured to generate a fifth group of the groups of spectral-domain audio samples from a fifth group of the groups of the time-domain audio samples, and wherein the second encoding module is configured to generate a sixth group of the groups of spectral-domain audio samples from a sixth group of the groups of the time-domain audio samples, wherein the third or the fourth group of the time-domain audio samples comprises at least 75% and less than 100% of the audio samples of the fifth group of the time-domain audio samples, wherein the fifth group of the time-domain audio samples comprises at least 75% and less than 100% of the audio samples of the third or the fourth group of the time-domain audio samples, wherein the fifth group of the time-domain audio samples comprises at least 75% and less than 100% of the audio samples of the sixth group of the time-domain audio samples, wherein the sixth group of the time-domain audio samples comprises at least 75% and less than 100% of the audio samples of the fifth group of the time-domain audio samples, and wherein the output module is configured to further output the fifth group of spectral-domain audio samples, and the sixth group of spectral-domain audio samples.

33. An encoder according to claim 26, wherein the encoder is configured to either employ the first encoding module or the second encoding module for generating a current group of spectral-domain audio samples depending on a signal property of a portion of the time-domain audio signal.

34. An encoder according to claim 33, wherein the encoder is configured to determine as the signal property, whether a current group of the plurality of time-domain audio samples comprises at least one of non-stationary regions and non-tonal regions, wherein the encoder is configured to employ the first encoding module to generate the current group of spectral-domain audio samples depending on the current group of the plurality of time-domain audio samples, if the current group of the plurality of time-domain audio samples comprises said at least one of the non-stationary regions and the non-tonal regions, and wherein the encoder is configured to employ the second encoding module to generate the current group of spectral-domain audio samples depending on the current group of the plurality of time-domain audio samples, if the current group of the plurality of time-domain audio samples does not comprise said at least one of the non-stationary regions and the non-tonal regions.

35. An encoder according to claim 33, wherein the output module is configured to output a bit comprising either a first bit value or a second bit value depending on the signal property.

36. An encoder according to claim 26, wherein the second encoding module is configured to generate at least one of the third group and the fourth group of spectral-domain audio samples depending on $$cs(a(n+b)(k+c)),$$

wherein cs( ) is cos( ) or sin( ), wherein n indicates a time index of one of the time-domain audio samples of the third or the fourth group of time-domain audio samples, wherein k indicates a spectral index of one of the spectral-domain audio samples of the first or the second or the third or the fourth group of the spectral-domain audio samples, wherein $-0.1 \leq c \leq 0.1$, or $0.4 \leq c \leq 0.6$, or $0.9 \leq c \leq 1.1$, wherein $$a = \frac{q}{M},$$

wherein $0.9\cdot\pi \leq q \leq 1.1\cdot\pi$,
wherein M indicates a number of spectral-domain audio samples of the first or the second or the third or the fourth group of the spectral-domain audio samples,
wherein $$b = \frac{s \cdot M + 1}{2},$$

and
wherein $1.5 \leq s \leq 4.5$.

37. An encoder according to claim 26,
wherein the first encoding module is configured to generate at least one of the first group and the second group of spectral-domain audio samples depending on $$cs_1(a(n_1+b_1)(k+c_1)),$$

wherein $cs_1(\ )$ is $\cos(\ )$ or $\sin(\ )$,
wherein $n_1$ indicates a time index of one of the time-domain audio samples of the first or the second group of time-domain audio samples,
wherein $-0.1 \leq c_1 \leq 0.1$, or $0.4 \leq c_1 \leq 0.6$, or $0.9 \leq c_1 \leq 1.1$,
wherein $$b_1 = \frac{M+1}{2}.$$

38. An encoder according to claim 36,
wherein $c=0$, or $c=0.5$, or $c=1$,
wherein $q=\pi$, and
wherein $s=3$.

39. An encoder according to claim 37,
wherein $q=\pi$, wherein $s=3$, wherein $cs(\ )$ is $\cos(\ )$ and $cs_1(\ )$ is $\cos(\ )$ and wherein $c=0.5$, and $c_1=0.5$, or
wherein $q=\pi$, wherein $s=3$, wherein $cs(\ )$ is $\sin(\ )$ and $cs_1(\ )$ is $\cos(\ )$ and wherein $c=1$, and $c_1=0$, or
wherein $q=\pi$, wherein $s=3$, wherein $cs(\ )$ is $\sin(\ )$ and $cs_1(\ )$ is $\sin(\ )$ and wherein $c=0.5$, and $c_1=1$, or
wherein $q=\pi$, wherein $s=3$, wherein $cs(\ )$ is $\cos(\ )$ and $cs_1(\ )$ is $\sin(\ )$ and wherein $c=0$, and $c_1=1$, or
wherein $q=\pi$, wherein $s=3$, wherein $cs(\ )$ is $\sin(\ )$ and $cs_1(\ )$ is $\sin(\ )$ and wherein $c=0.5$, and $c_1=0.5$, or
wherein $q=\pi$, wherein $s=3$, wherein $cs(\ )$ is $\cos(\ )$ and $cs_1(\ )$ is $\sin(\ )$ and wherein $c=0$, and $c_1=0.5$, or
wherein $q=\pi$, wherein $s=3$, wherein $cs(\ )$ is $\cos(\ )$ and $cs_1(\ )$ is $\cos(\ )$ and wherein $c=0.5$, and $c_1=0$, or
wherein $q=\pi$, wherein $s=3$, wherein $cs(\ )$ is $\sin(\ )$ and $cs_1(\ )$ is $\cos(\ )$ and wherein $c=1$, and $c_1=0$.

40. An encoder according to claim 38,
wherein the second encoding module is configured to generate at least one of the third group and the fourth group of spectral-domain audio samples depending on $$\hat{X}_i(k) = \sum_{n=0}^{L-1} \hat{x}_i(n)\cos\left(\frac{\pi}{M}\left(n + \frac{3M+1}{2}\right)\left(k + \frac{1}{2}\right)\right),$$

or depending on $$\hat{X}_i(k) = \sum_{n=0}^{L-1} \hat{x}_i(n)\cos\left(\frac{\pi}{M}\left(n + \frac{3M+1}{2}\right)k\right),$$

or depending on $$\hat{X}_i(k) = \sum_{n=0}^{L-1} \hat{x}_i(n)\sin\left(\frac{\pi}{M}\left(n + \frac{3M+1}{2}\right)\left(k + \frac{1}{2}\right)\right),$$

or depending on $$\hat{X}_i(k) = \sum_{n=0}^{L-1} \hat{x}_i(n)\sin\left(\frac{\pi}{M}\left(n + \frac{3M+1}{2}\right)(k+1)\right),$$

wherein $\overline{X}_i(k)$ indicates one of the spectral-domain audio samples of the third or the fourth group of spectral-domain audio samples, and
wherein $\hat{x}_i(n)$ indicates a time-domain value.

41. An encoder according to claim 36, wherein the second encoding module is configured to apply a weight $w(n)$ on a time-domain audio sample $s_i(n)$ of the third group or of the fourth group of the time-domain audio samples according to $$\hat{x}_i(n)=w(n)\cdot s_i(n)$$

to generate the time-domain value $\hat{x}_i(n)$.

42. An encoder according to claim 26,
wherein all time-domain audio samples of the second group of the time-domain audio samples overlap with time-domain audio samples of the third group of the time-domain audio samples, or
wherein all time-domain audio samples of the first group of the time-domain audio samples overlap with the fourth group of the time-domain audio samples.

43. An encoder according to claim 26,
wherein $w_{elt}$ is a first window function,
wherein $w_{tr}$ is a second window function, wherein a portion of the second window function is defined according to $$w_{tr}(t) = d\sqrt{1 - w_{elt}(k)^2 - w_{elt}(M+k)^2},$$

wherein M indicates a number of spectral-domain audio samples of the first or the second or the third or the fourth group of spectral-domain audio samples,
wherein k is a number with $0 \leq k \leq M$,
wherein d is a real number,
wherein $$t = \frac{L}{2} + k,$$

or wherein $$t = \frac{L}{2} - 1 - k,$$

wherein L indicates a number of time-domain audio samples of the third group or of the fourth group of time-domain audio samples, wherein the third group of the time-domain audio samples comprises audio samples of the second group of the time-domain audio samples, and wherein the second encoding module is configured to apply the first window function $w_{elt}$ on the fourth group of time-domain audio samples, and wherein the second encoding module is configured to apply the second window function $w_{tr}$ on the third group of time-domain audio samples, or wherein the fourth group of the time-domain audio samples comprises audio samples of the first group of the time-domain audio samples, and wherein the second encoding module is configured to apply the first window function $w_{elt}$ on the third group of time-domain audio samples, and wherein the second encoding module is configured to the second window function $w_{tr}$ on the fourth group of time-domain audio samples.

44. An encoder according to claim 43,
wherein $w_{tr1}$ is a third window function, wherein a portion of the third window function is defined according to $$w_{tr1}(t_1) = d\sqrt{1 - w_{elt}(k)^2 - w_{elt}(M+k)^2},$$

wherein $$t_1 = \frac{N}{2} + k,$$

or wherein $$t_1 = \frac{N}{2} - 1 - k,$$

wherein N indicates a number of time-domain audio samples of the first group or of the second group of time-domain audio samples, wherein the third group of the time-domain audio samples comprises audio samples of the second group of the time-domain audio samples, and wherein the second encoding module is configured to apply the third window function $w_{tr1}$ on the second group of time-domain audio samples, or wherein the fourth group of the time-domain audio samples comprises audio samples of the first group of the time-domain audio samples, and wherein the second encoding module is configured to the third window function $w_{tr1}$ on the first group of time-domain audio samples.

45. An encoder according to claim 43,
wherein the first window function $w_{elt}$ is defined according to $$w_{elt}(t) = w_{3-term}(t) - \sum_{k=1}^{K} c_k \cos\left(8k\pi \cdot \frac{t+0.5}{L}\right),$$

wherein $$w_{3-term}(t) = \sum_{k=0}^{2} b_k \cos\left(2k\pi \cdot \frac{t+0.5}{L}\right),$$

wherein $b_0$, $b_1$ and $b_2$ are real numbers,
wherein $0 \le t \le L$, and wherein K is a positive integer and
wherein $c_k$ indicates a real number.

46. An encoder according to claim 45,
wherein K=3;
wherein $0.3 \le b_0 \le 0.4$,
wherein $-0.6 \le b_1 \le -0.4$,
wherein $0.01 \le b_2 \le 0.2$,
wherein $0.001 \le c_1 \le 0.03$,
wherein $0.000001 \le c_2 \le 0.0005$,
wherein $0.000001 \le c_3 \le 0.00002$.

47. An encoder according to claim 26,
wherein $w_{elt}$ is a first window function,
wherein $w_{mlt}$ is a second window function, and
wherein $w'_{mlt}$ is a third window function, wherein the third window function is defined according to $$w'_{mlt}(n) = \begin{cases} d\sqrt{1 - w_{elt}(N+k)^2 - w_{elt}(3M+k)^2}, & 0 \le n < M \\ w_{mlt}(n), & M \le n < N \end{cases},$$

wherein M indicates a number of spectral-domain audio samples of the first or the second or the third or the fourth group of the spectral-domain audio samples,
wherein k is a number with $0 \le k \le M$,
wherein d is a real number,
wherein n is an integer, and
wherein at least one of the first encoding module and the second encoding module is configured to apply the third window function $w'_{mlt}$ on at least one of the first and the second and the third and the fourth group of time-domain audio samples.

48. An encoder according to claim 26,
wherein $w_{elt}$ is a first window function,
wherein $w_{ss}$ is a second window function, wherein the second window function is defined according to $$w_{ss}(n) = \begin{cases} d\sqrt{1 - w_{elt}(N+k)^2 - w_{elt}(3M+k)^2}, & 0 \le n < M \\ d\sqrt{1 - w_{elt}(k)^2 - w_{elt}(M+k)^2}, & M \le n < N \end{cases},$$

wherein M indicates a number of spectral-domain audio samples of the first or the second or the third or the fourth group of the spectral-domain audio samples,
wherein k is a number with $0 \le k < M$,
wherein d is a real number,
wherein n is an integer, and
wherein at least one of the first encoding module and the second encoding module is configured to apply the second window function $w_{ss}$ on at least one of the first and the second and the third and the fourth group of time-domain audio samples.

49. An encoder according to claim 43, wherein $0.8 \le d \le 1.25$.

50. An encoder according to claim 49, wherein $$d = \frac{4096}{4061}.$$

51. An encoder according to claim 43, wherein d=1.

52. A system, comprising:
an encoder for encoding a plurality of time-domain audio samples of an audio signal by generating a plurality of groups of spectral domain-audio samples from a plurality of groups of the time-domain audio samples, wherein the encoder comprises:

a first encoding module for generating a first group of the groups of spectral-domain audio samples from a first group of the groups of the time-domain audio samples, and for generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5% and at most 50% of the audio samples of the first group of the time-domain audio samples, and a second encoding module for generating a third group of the groups of spectral-domain audio samples from a third group of the groups of the time-domain audio samples, and for generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples, and an output module for outputting the first group of spectral-domain audio samples, the second group of spectral-domain audio samples, the third group of spectral-domain audio samples and the fourth group of spectral-domain audio samples, wherein the third group of the time-domain audio samples comprises audio samples of the second group of the time-domain audio samples, or wherein the fourth group of the time-domain audio samples comprises audio samples of the first group of the time-domain audio samples;

a decoder according to claim 1, wherein said encoder is configured to encode a plurality of time-domain audio samples of an audio signal by generating a plurality of spectral-domain audio samples, wherein the decoder according to claim 1 is configured to receive a plurality of spectral-domain audio samples from the encoder, wherein the decoder according to claim 1 is configured to decode the plurality of spectral-domain audio samples.

53. A system according to claim 52, wherein the encoder is an encoder wherein $0.8 \leq d \leq 1.25$, wherein $w_{elt}$ is a first window function, wherein $w_{tr}$ is a second window function, wherein a portion of the second window function is defined according to $$w_{tr}(t) = d\sqrt{1 - w_{elt}(k)^2 - w_{elt}(M+k)^2},$$

wherein M indicates a number of spectral-domain audio samples of the first or the second or the third or the fourth group of spectral-domain audio samples, wherein k is a number with $0 \leq k \leq M$, wherein d is a real number, wherein $$t = \frac{L}{2} + k,$$

or wherein $$t = \frac{L}{2} - 1 - k,$$

wherein L indicates a number of time-domain audio samples of the third group or of the fourth group of time-domain audio samples, wherein the third group of the time-domain audio samples comprises audio samples of the second group of the time-domain audio samples, and wherein the second encoding module is configured to apply the first window function $w_{elt}$ on the fourth group of time-domain audio samples, and wherein the second encoding module is configured to apply the second window function $w_{tr}$ on the third group of time-domain audio samples, or wherein the fourth group of the time-domain audio samples comprises audio samples of the first group of the time-domain audio samples, and wherein the second encoding module is configured to apply the first window function $w_{elt}$ on the third group of time-domain audio samples, and wherein the second encoding module is configured to the second window function $w_{tr}$ on the fourth group of time-domain audio samples; and wherein the decoder is a decoder wherein $0.8 \leq d \leq 1.25$, wherein $w_{elt}$ is a first window function, wherein $w_{tr}$ is a second window function, wherein a portion of the second window function is defined according to $$w_{tr}(t) = d\sqrt{1 - w_{elt}(k)^2 - w_{elt}(M+k)^2},$$

wherein M indicates a number of spectral-domain audio samples of the first or the second or the third or the fourth group of the spectral-domain audio samples, wherein k is a number with $0 \leq k \leq M$, wherein d is a real number, wherein $$t = \frac{L}{2} + k,$$

or wherein $$t = \frac{L}{2} - 1 - k,$$

wherein L indicates a number of time-domain intermediate audio samples of the third group or of the fourth group of time-domain intermediate audio samples, wherein the overlap-adder is configured to overlap-add at least the second group of time-domain intermediate audio samples with the third group of time-domain intermediate audio samples, wherein the second decoding module is configured to generate the fourth group of time-domain intermediate audio samples depending on the first window function $w_{elt}$, and wherein the second decoding module is configured to generate the third group of time-domain intermediate audio samples depending on the second window function $w_{tr}$, or wherein the overlap-adder is configured to overlap-add at least the fourth group of time-domain intermediate audio samples with the first group of time-domain intermediate audio samples, wherein the second decoding module is configured to generate the third group of time-domain intermediate audio samples depending on the first window function $w_{elt}$, and wherein the second decoding module is configured to generate the fourth group of time-domain intermediate audio samples depending on the second window function $w_{tr}$.

54. A system according to claim 53,
wherein the encoder is an encoder wherein $$d = \frac{4096}{4061},$$

and
wherein the decoder is a decoder wherein $$d = \frac{4061}{4096}.$$

55. A method for decoding a plurality of spectral-domain audio samples, wherein the method comprises:
decoding a first group of the spectral-domain audio samples by generating a first group of time-domain intermediate audio samples from the spectral-domain audio samples of the first group of the spectral-domain audio samples, and decoding a second group of the spectral-domain audio samples by generating a second group of time-domain intermediate audio samples from the spectral-domain audio samples of the second group of the spectral-domain audio samples,
overlap-adding of exactly two groups of time-domain intermediate audio samples, said exactly two groups being the first group and the second group of time-domain intermediate audio samples, wherein said exactly two groups are overlap-added with an overlap of more than 5% and at most 50%, wherein said overlap-add of said exactly two groups results in generating a first plurality of time-domain audio output samples of an audio signal,
decoding a third group of the spectral-domain audio samples by generating a third group of time-domain intermediate audio samples from the spectral-domain audio samples of the third group of the spectral-domain audio samples, and decoding a fourth group of the spectral-domain audio samples by generating a fourth group of time-domain intermediate audio samples from the spectral-domain audio samples of the fourth group of the spectral-domain audio samples,
outputting the first plurality of time-domain audio output samples of the audio signal, a second plurality of time-domain audio output samples of the audio signal and a third plurality of time-domain audio output samples of the audio signal,
acquiring the second plurality of time-domain audio output samples using overlap-adding at least the third group of time-domain intermediate audio samples with an overlap of more than 60% and less than 100% with the fourth group of time-domain intermediate audio samples, and acquiring the third plurality of time-domain audio output samples using overlap-adding of at least the second group of time-domain intermediate audio samples with the third group of time-domain intermediate audio samples, or acquiring the third plurality of time-domain audio output samples using overlap-adding of at least the fourth group of time-domain intermediate audio samples with the first group of time-domain intermediate audio samples.

56. A method for encoding a plurality of time-domain audio samples of an audio signal by generating a plurality of groups of spectral domain-audio samples from a plurality of groups of the time-domain audio samples, wherein the encoder comprises:
generating a first group of the groups of spectral-domain audio samples from a first group of the groups of the time-domain audio samples, and generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5% and at most 50% of the audio samples of the first group of the time-domain audio samples,
generating a third group of the groups of spectral-domain audio samples from a third group of the groups of the time-domain audio samples, and generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples, and
outputting the first group of spectral-domain audio samples, the second group of spectral-domain audio samples, the third group of spectral-domain audio samples and the fourth group of spectral-domain audio samples,
wherein the third group of the time-domain audio samples comprises audio samples of the second group of the time-domain audio samples, or wherein the fourth group of the time-domain audio samples comprises audio samples of the first group of the time-domain audio samples.

57. A non-transitory digital storage medium having a computer program stored thereon to perform the method for decoding a plurality of spectral-domain audio samples, wherein the method comprises:
decoding a first group of the spectral-domain audio samples by generating a first group of time-domain intermediate audio samples from the spectral-domain audio samples of the first group of the spectral-domain audio samples, and decoding a second group of the spectral-domain audio samples by generating a second group of time-domain intermediate audio samples from the spectral-domain audio samples of the second group of the spectral-domain audio samples, overlap-adding of exactly two groups of time-domain intermediate audio samples, said exactly two groups being the first group and the second group of time-domain intermediate audio samples, wherein said exactly two groups are overlap-added with an overlap of more than 5% and at most 50%, wherein said overlap-add of said exactly two groups results in generating a first plurality of time-domain audio output samples of an audio signal, decoding a third group of the spectral-domain audio samples by generating a third group of time-domain intermediate audio samples from the spectral-domain audio samples of the third group of the spectral-domain audio samples, and decoding a fourth group of the spectral-domain audio samples by generating a fourth group of time-domain intermediate audio samples from the spectral-domain audio samples of the fourth group of the spectral-domain audio samples, outputting the first plurality of time-domain audio output samples of the audio signal, a second plurality of time-domain audio output samples of the audio signal and a third plurality of time-domain audio output samples of the audio signal, acquiring the second plurality of time-domain audio output samples using overlap-adding at least the third group of time-domain intermediate audio samples with an overlap of more than 60% and less than 100% with the fourth group of time-domain intermediate audio samples, and acquiring the third plurality of time-domain audio output samples using overlap-adding of at least the second group of time-domain intermediate audio samples with the third group of time-domain intermediate audio samples, or acquiring the third plurality of time-domain audio output samples using overlap-adding of at least the fourth group of time-domain intermediate audio samples with the first group of time-domain intermediate audio samples, when said computer program is run by a computer.

58. A non-transitory digital storage medium having a computer program stored thereon to perform the method for encoding a plurality of time-domain audio samples of an audio signal by generating a plurality of groups of spectral domain-audio samples from a plurality of groups of the time-domain audio samples, wherein the encoder comprises:

generating a first group of the groups of spectral-domain audio samples from a first group of the groups of the time-domain audio samples, and generating a second group of the groups of spectral-domain audio samples from a second group of the groups of the time-domain audio samples, wherein the first group of time-domain audio samples and the second group of time-domain audio samples are neighboured in time within the groups of the time-domain audio samples, wherein the first group of the time-domain audio samples comprises more than 5% and at most 50% of the audio samples of the second group of the time-domain audio samples, and wherein the second group of the time-domain audio samples comprises more than 5% and at most 50% of the audio samples of the first group of the time-domain audio samples, generating a third group of the groups of spectral-domain audio samples from a third group of the groups of the time-domain audio samples, and generating a fourth group of the groups of spectral-domain audio samples from a fourth group of the groups of the time-domain audio samples, wherein the third group of the time-domain audio samples comprises more than 60% and less than 100% of the audio samples of the fourth group of the time-domain audio samples, and wherein the fourth group of the time-domain audio samples comprises more than 60% and less than 100% of the audio samples of the third group of the time-domain audio samples, and outputting the first group of spectral-domain audio samples, the second group of spectral-domain audio samples, the third group of spectral-domain audio samples and the fourth group of spectral-domain audio samples, wherein the third group of the time-domain audio samples comprises audio samples of the second group of the time-domain audio samples, or wherein the fourth group of the time-domain audio samples comprises audio samples of the first group of the time-domain audio samples, when said computer program is run by a computer.

* * * * *